(12) United States Patent
Fenton

(10) Patent No.: US 7,918,478 B2
(45) Date of Patent: Apr. 5, 2011

(54) EQUALIZER FOR SUSPENSION SYSTEM

(75) Inventor: E. Dale Fenton, Columbia, MO (US)

(73) Assignee: Lippert Components Manufacturing, Inc., Goshen, IN (US)

( * ) Notice: Subject to any disclaimer, the term of this patent is extended or adjusted under 35 U.S.C. 154(b) by 546 days.

(21) Appl. No.: 11/505,382

(22) Filed: Aug. 17, 2006

(65) Prior Publication Data

US 2007/0040347 A1 Feb. 22, 2007

Related U.S. Application Data

(63) Continuation-in-part of application No. 11/208,963, filed on Aug. 22, 2005, now Pat. No. 7,296,821.

(51) Int. Cl.
*B60G 5/00* (2006.01)
(52) U.S. Cl. ........ 280/680; 267/260; 267/271; 280/676; 280/682; 280/686; 280/687; 280/124.175
(58) Field of Classification Search .................. 280/680, 280/682, 686, 124.174, 124.175, 687, 676; 267/229, 260, 266, 271, 47, 268
See application file for complete search history.

(56) References Cited

U.S. PATENT DOCUMENTS

| | | | | | |
|---|---|---|---|---|---|
| 380,548 | A | * | 4/1888 | Broadhurst | 267/229 |
| 2,811,213 | A | * | 10/1957 | Miller | 180/24.12 |
| 3,074,738 | A | * | 1/1963 | Ward | 280/682 |
| 3,504,929 | A | * | 4/1970 | King | 280/682 |
| 3,572,745 | A | * | 3/1971 | Willetts | 280/687 |
| 3,767,222 | A | * | 10/1973 | Willetts | 280/682 |
| 3,856,325 | A | * | 12/1974 | Willetts | 280/687 |
| 4,030,738 | A | * | 6/1977 | Willetts | 280/681 |
| 4,278,271 | A | * | 7/1981 | Raidel | 280/687 |
| 4,502,707 | A | * | 3/1985 | Jable et al. | 280/682 |
| 6,478,321 | B1 | * | 11/2002 | Heitzmann | 280/124.177 |
| 7,296,821 | B2 | * | 11/2007 | Fenton | 280/680 |
| 2004/0119260 | A1 | * | 6/2004 | Fenton | 280/124.174 |
| 2008/0036182 | A1 | * | 2/2008 | Fenton et al. | 280/682 |

* cited by examiner

*Primary Examiner* — Eric Culbreth
(74) *Attorney, Agent, or Firm* — Barnes & Thornburg LLP

(57) ABSTRACT

An equalizer for a suspension system for a trailer is configured to absorb or dampen the harsh shocks or vibrations coming off of the leaf springs proximate to a center frame hangar, thus allowing for a "softer" ride. The equalizer utilizes one or two independent equalizer arm assemblies or castings which are each rotatably secured within the equalizer. Each equalizer arm assembly or casting is operatively associated with one of the leaf springs such that upon upward movement of the leaf spring, the associated equalizer arm assembly or casting is forced to rotate within the equalizer and to deform a shock absorber provided within the equalizer. The shock absorber, upon the deformation thereof, absorbs the harsh shocks or vibrations which would otherwise normally be transferred from the leaf springs, to the equalizer, and thus to the frame of the trailer.

20 Claims, 42 Drawing Sheets

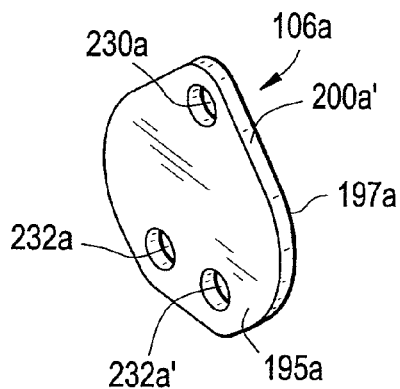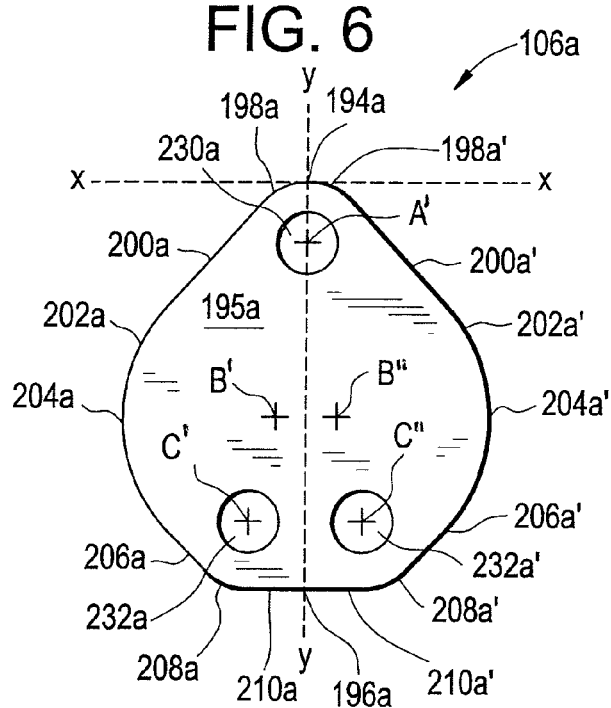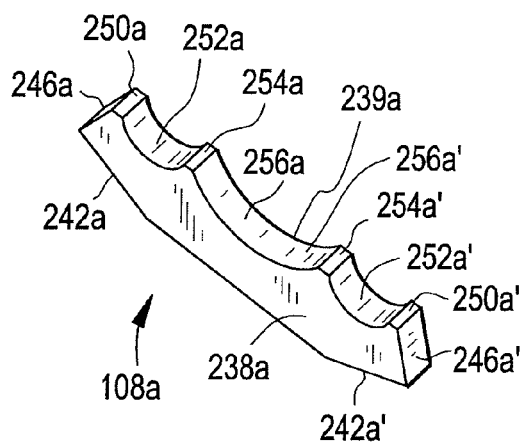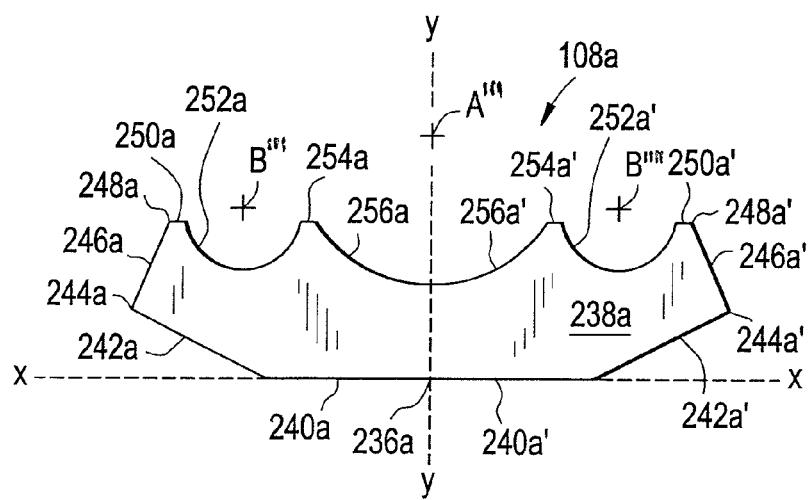

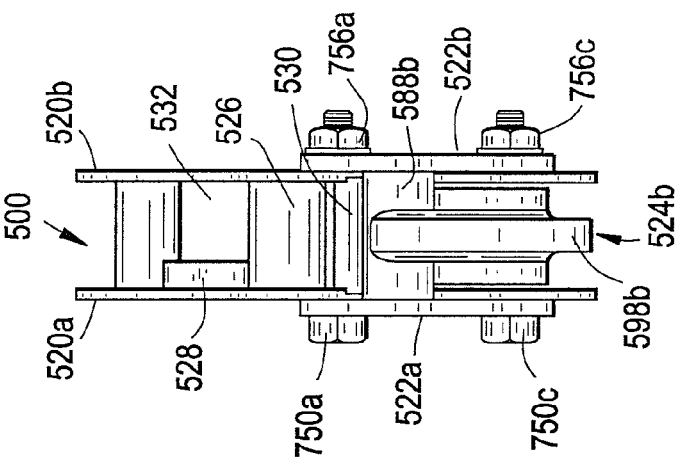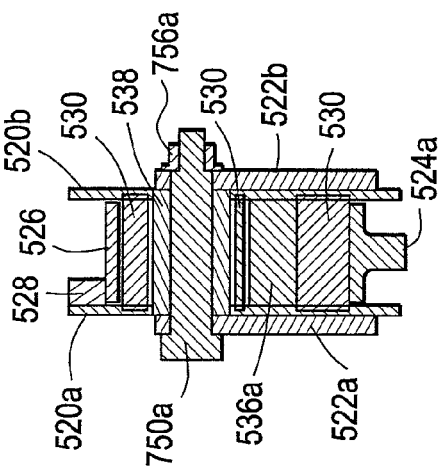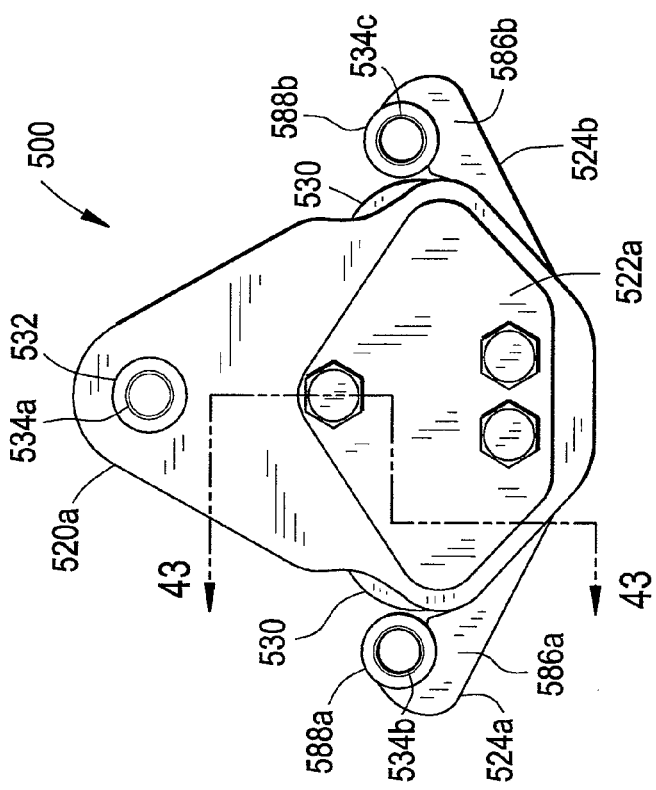

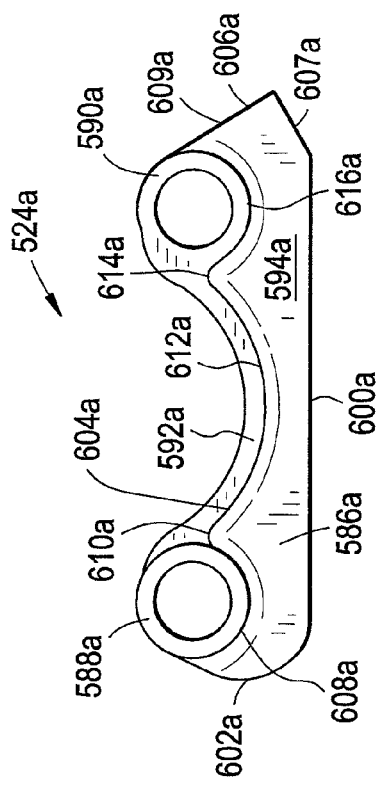
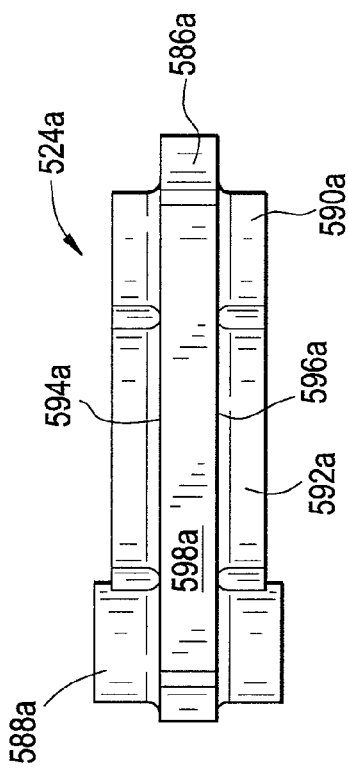
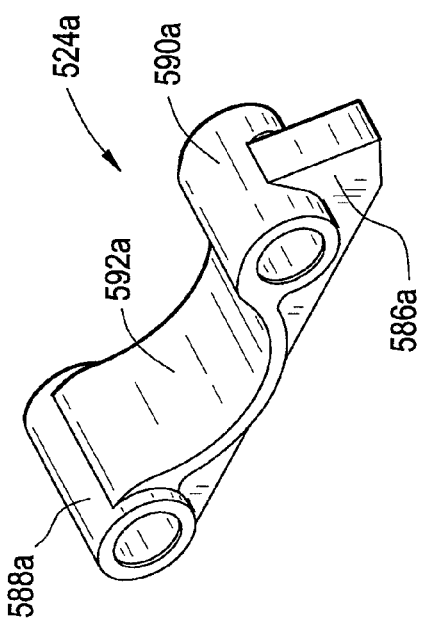
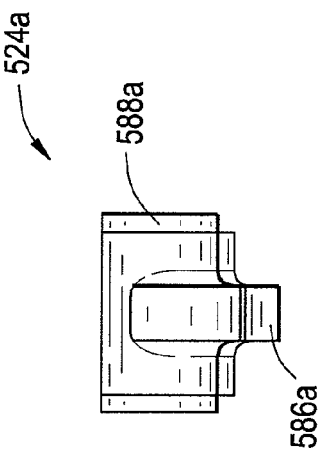

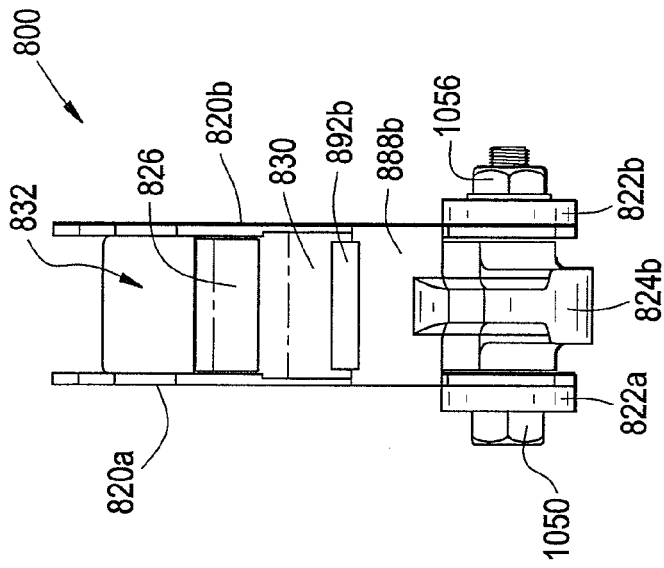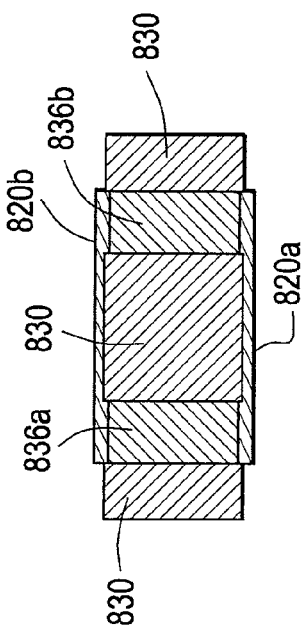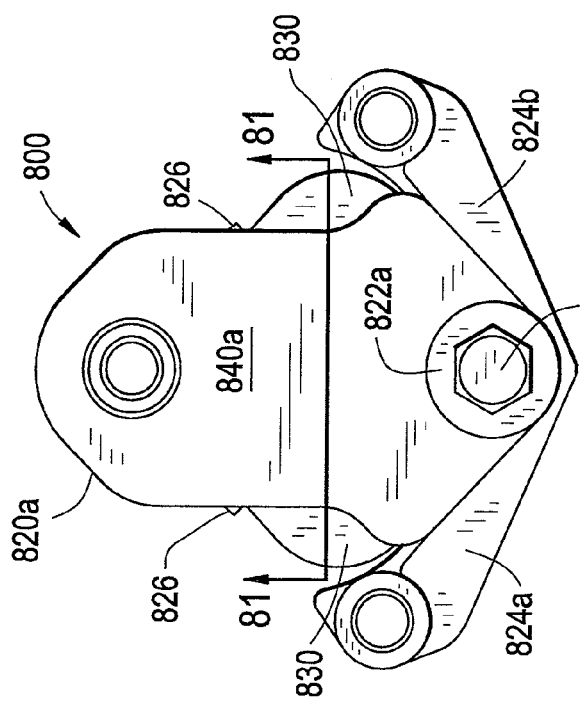

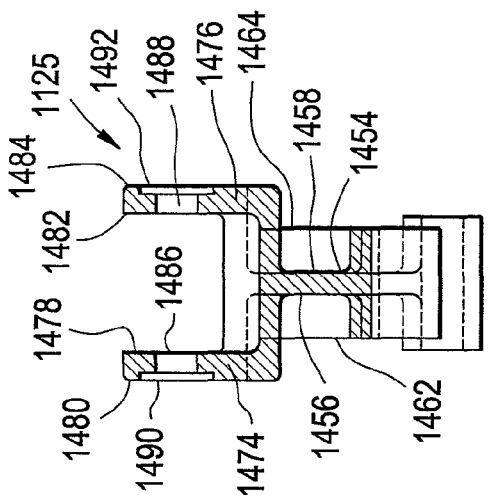
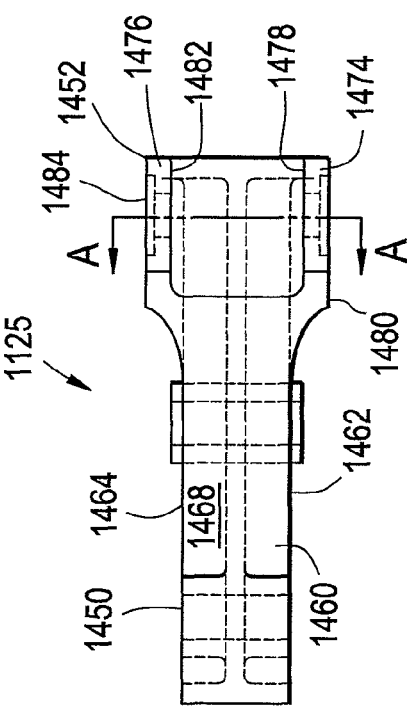
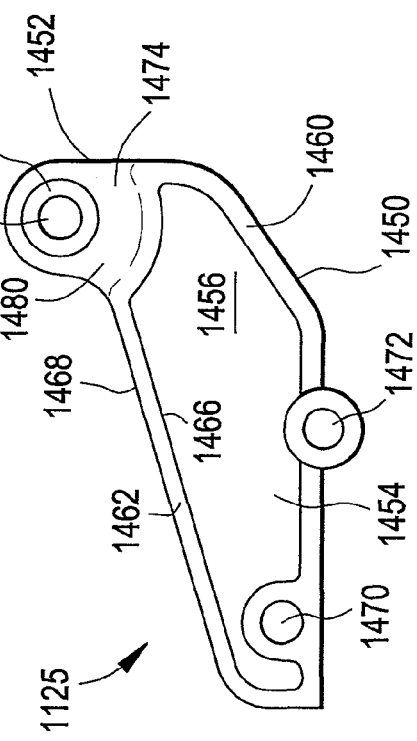

EQUALIZER FOR SUSPENSION SYSTEM

CROSS-REFERENCE AND INCORPORATION BY REFERENCE

This application is a Continuation-In-Part of U.S. patent application Ser. No. 11/208,963, entitled "Equalizer For A Suspension System" and filed on Aug. 22, 2005. The entirety of U.S. patent application Ser. No. 11/208,963 is hereby incorporated by reference.

BACKGROUND OF THE INVENTION

The invention is generally directed to an equalizer for a suspension system used in vehicles or trailers having multiple axles, e.g., tandem or tri-axles, generally between 2,000 pounds and 21,000 pounds with double eye springs, such as recreational vehicles, mobile homes and light trailers of all types.

A prior art suspension system 20 currently used on trailers incorporates an equalizer 22 such as the one shown in FIG. 1. The suspension system 20 is mounted on a frame 24 of the left side of the trailer and another, identical suspension system 20 is mounted on the frame 24 of the right side of the trailer. Only the suspension system 20 mounted on the frame 24 of the left side of the trailer is shown in FIG. 1. The suspension system 20 includes the equalizer 22, a front leaf spring 26, a rear leaf spring 28, a front shackle or link 30 and a rear shackle or link 32.

The equalizer 22 is generally triangular in shape, having a first end corner 34, a second end corner 36 and a third end corner 38. Other equalizers of the prior art may be curved rather than triangular in shape. The equalizer 22 is generally formed of cast iron and is rigid. The first end corner 34 of the equalizer 22 is attached to a center frame hangar 40, which depends from the frame 24 of the trailer, at a point A. The second end corner 36 of the equalizer 22 is pivotally mounted to a first end 42 of the front shackle 30 at a point B. The third end corner 38 of the equalizer 22 is pivotally mounted to a first end 44 of the rear shackle 32 at a point C.

A second end 46 of the front shackle 30 is pivotally mounted to a rear end 48 of the front leaf spring 26 at a point D. A front end 50 of the front leaf spring 26 is attached to the frame 24 of the trailer at a point E.

A second end 52 of the rear shackle 32 is pivotally mounted to a front end 54 of the rear leaf spring 28 at a point F. A rear end 56 of the rear leaf spring 28 is attached to the frame 24 of the trailer at a point G.

A front axle 58 is positioned on the forward leaf spring 26 generally equidistantly between point D and point E. A rear axle 60 is positioned on the rear leaf spring 28 generally equidistantly between point F and point G.

To the extent possible, road shock and vibrations from tires of the trailer are transferred to the front and rear axles 58, 60, and are absorbed by the front and rear leaf springs 26, 28, respectively. Points A, E and G are the contact points through which the road shock is passed to the frame 24. The equalizer 22 basically has only one purpose for being included in the suspension system 20, which is to equalize the weight on both the front and rear axles 58, 60 as the tires pass over uneven terrain. For example, an upward motion of the front leaf spring 26 results in a downward motion of the rear leaf spring 28.

The equalizer 22, however, is not configured to dampen or absorb the harsh shocks or vibrations coming off the rear end 48 of the front leaf spring 26 and the front end 54 of the rear leaf spring 28 proximate to the center frame hangar 40, which would thus allow for a "softer" ride. The equalizer 22 of the prior art has been in use without a single design change for at least the past forty (40) years.

Thus, there is a need for an equalizer which overcomes the aforementioned disadvantages. The present invention provides such an equalizer. Features and advantages of the present invention will become apparent upon a reading of the attached specification, in combination with a study of the drawings.

SUMMARY OF THE INVENTION

Briefly, and in accordance with the foregoing, the invention provides equalizers for a suspension system for a trailer or the like which is configured to equalize the weight on the axles of a trailer as tires of the trailer pass over uneven terrain, but which also is configured to dampen or absorb the harsh shocks or vibrations coming off of the leaf springs proximate to one or more center frame hangars, thus allowing for a "softer" ride. The equalizers utilize one or two independent equalizer arm assemblies or castings which are each rotatably secured within the equalizer. Each equalizer arm assembly or casting is operatively associated with one of the leaf springs such that upon upward movement of an associated leaf spring, the associated equalizer arm assembly or casting is forced to rotate within the equalizer and to deform a shock absorber provided within the equalizer. The shock absorber, upon the deformation thereof, absorbs the harsh shocks or vibrations which would otherwise normally be transferred from the leaf springs, to the equalizer, and thus to the frame of the trailer.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 5 is a perspective view of a secondary base plate of the first embodiment of the equalizer;

FIG. 6 is a front view of the secondary base plate illustrated in FIG. 5;

FIG. 7 is a perspective view of an equalizer arm of the first embodiment of the equalizer;

FIG. 8 is a front view of the equalizer arm illustrated in FIG. 7;

FIG. 41 is a front view of the equalizer illustrated in FIG. 40;

FIG. 42 is a side view of the equalizer illustrated in FIG. 40;

FIG. 43 is a cross-sectional view of the equalizer taken along line 43-43 of FIG. 41;

FIG. 50 is a perspective view of an equalizer arm casting of the equalizer illustrated in FIG. 40;

FIG. 51 is a front view of the equalizer arm casting illustrated in FIG. 50;

FIG. 52 is a side view of the equalizer arm casting illustrated in FIG. 50;

FIG. 53 is a bottom view of the equalizer arm casting illustrated in FIG. 50;

FIG. 79 is a front view of the equalizer illustrated in FIG. 78;

FIG. 80 is a side view of the equalizer illustrated in FIG. 78;

FIG. 81 is a cross-sectional view of the equalizer taken along line 81-81 of FIG. 79;

FIG. 103 is a top view of an alignment bracket of the equalizer illustrated in FIG. 99;

FIG. 104 is a front view of the alignment bracket illustrated in FIG. 103;

FIG. 105 is a side view of the alignment bracket illustrated in FIG. 103;

DETAILED DESCRIPTION OF THE ILLUSTRATED EMBODIMENTS

Figure 1:
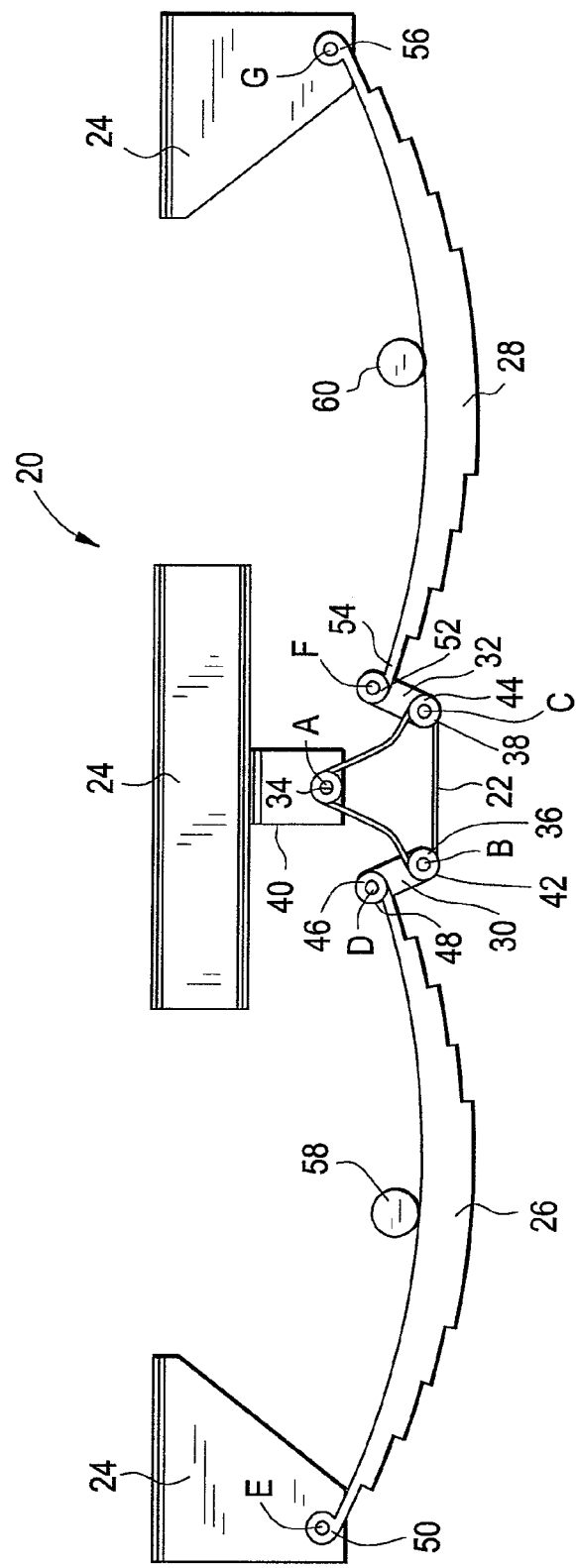
FIG. 1 is a view of a prior art equalizer incorporated into a suspension system which is mounted on a frame of a trailer.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

It is to be understood that where dimensions are used in the description of the illustrated embodiments, these dimensions are those for the preferred embodiments of the illustrated embodiments. It is to be further understood that modifications to the dimensions may be made in keeping with the spirit of the invention, and that the dimensions are not intended to limit the invention to those dimensions described. Also, it is also to be understood that the drawings may not be drawn to scale in conformance with the dimensions described herein.

Attention is now directed to the various embodiments of the invention. A first embodiment of an equalizer 100 is illustrated in FIGS. 2-38. A second embodiment of an equalizer 500 is illustrated in FIGS. 39-76. A third embodiment of an equalizer 800 is illustrated in FIGS. 77-97. A fourth embodiment of an equalizer 1100 is illustrated in FIGS. 98-113. Reference numerals of the first embodiment are in the one, two, three and four hundreds. Reference numerals of the second embodiment are in the five, six and seven hundreds. Reference numerals of the third embodiment being in the eight, nine and ten hundreds. Reference numerals of the fourth embodiment being in the eleven, twelve, thirteen and fourteen hundreds.

Figure 2:
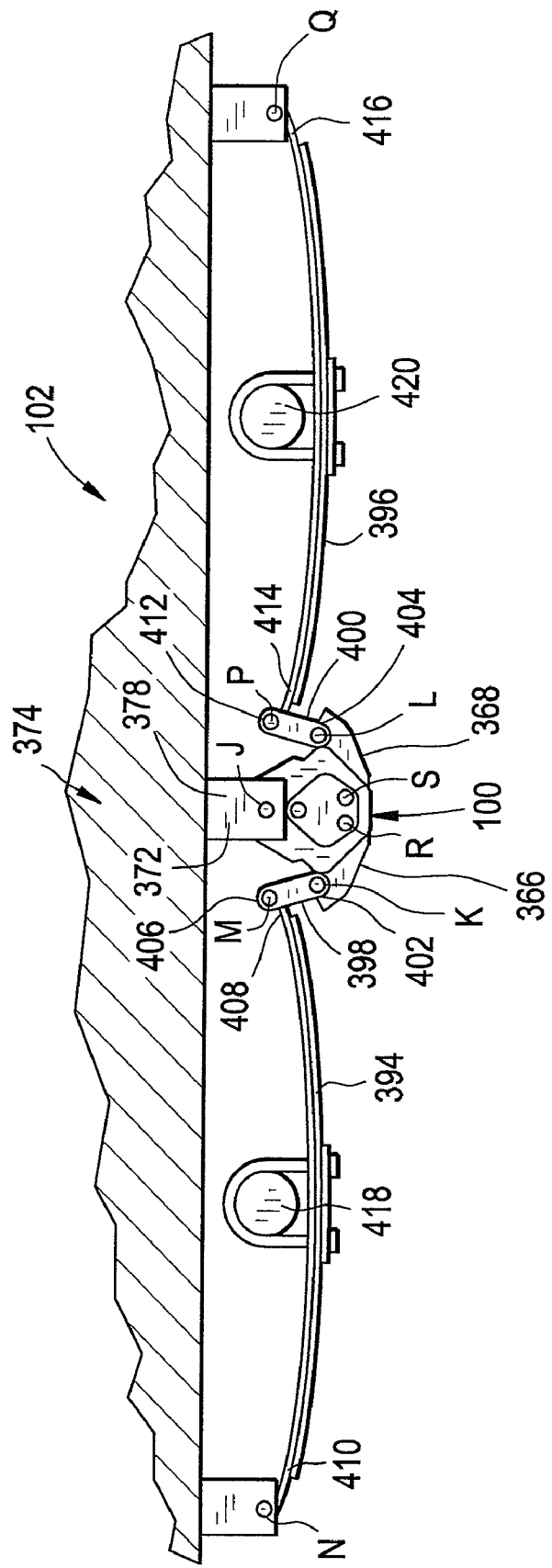
FIG. 2 is a view of a first embodiment of an equalizer which incorporates the features of the present invention incorporated into a suspension system which is mounted on a frame of a trailer.

Attention is directed to the first embodiment of the equalizer 100. The equalizer 100 is provided for use in a suspension system 102, as illustrated in FIG. 2, to equalize the weight on both the front and rear axles 418, 420 as the tires pass over uneven terrain (as does the equalizer 22 of the prior art suspension system 20), as well as to dampen or absorb the harsh shocks or vibrations coming off a rear end 408 of a front leaf spring 394 on which the front axle 418 is positioned, and a front end 414 of a rear leaf spring 396 on which the rear axle 420 is positioned, proximate to the center frame hangar 372, thus allowing for a "softer" ride. As best illustrated in FIGS. 32-36, the equalizer 100 includes first and second base plates 104a, 104b, first and second secondary base plates 106a, 106b, first and second equalizer arms 108a, 108b, first and second lower shock plates 110a, 110b, first and second upper shock plates 112a, 112b, a reinforcement plate 114, first and second shock absorbers 116a, 116b, first, second, third and fourth upper pivot tubes 119a, 119b, 119c, 119d, first and second lower pivot tubes 120a, 120b, first, second and third fastening members 122a, 122b, 122c, first, second and third securing members 124a, 124b, 124c, and a base or shock spacer 126.

Figure 3:
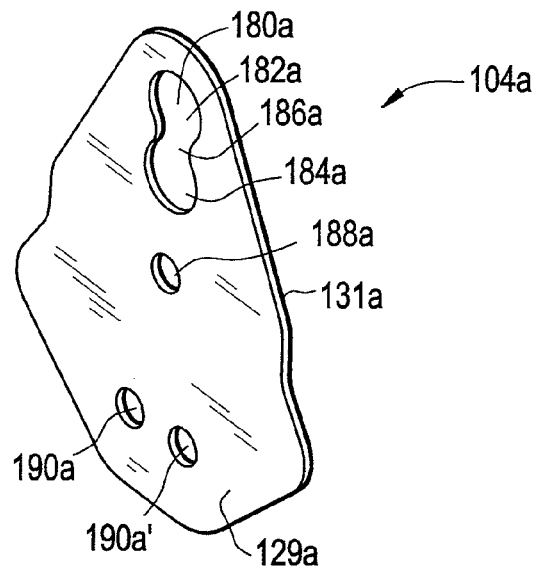
FIG. 3 is a perspective view of a base plate of the first embodiment of the equalizer.
Figure 4:
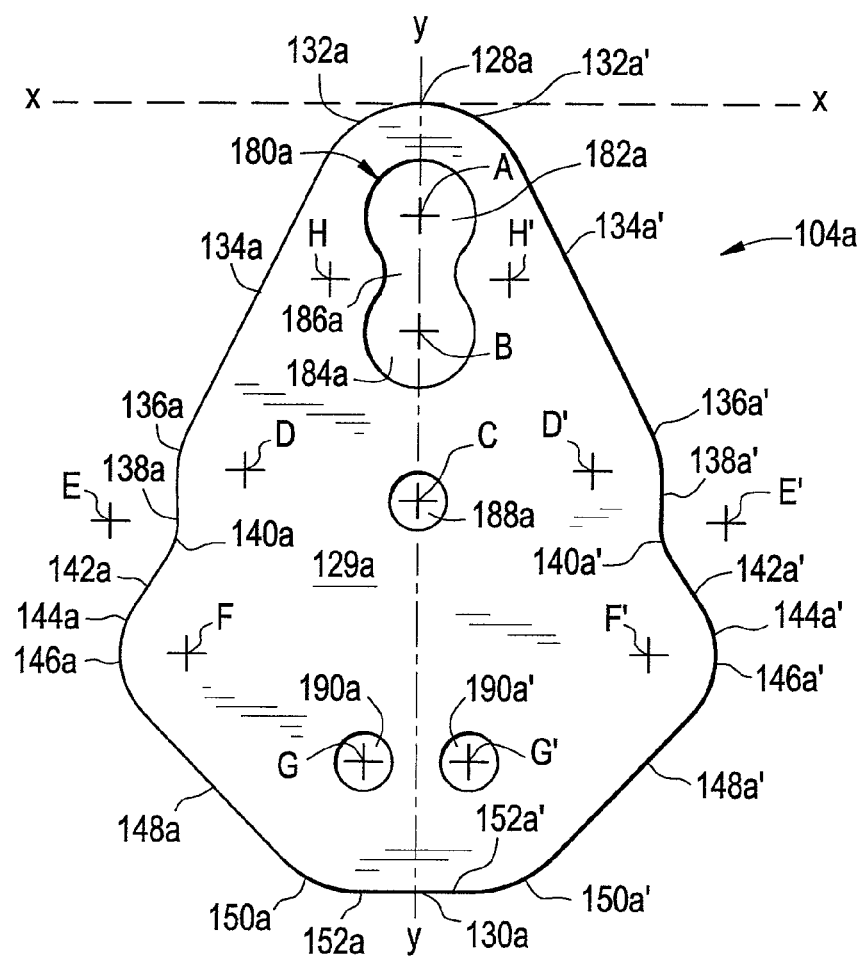
FIG. 4 is a front view of the base plate illustrated in FIG. 3.

FIGS. 3 and 4 illustrate the first base plate 104*a*, which is preferably formed of a forged, cast or fabricated metal. The first base plate 104*a* is identical in shape and configuration to the second base plate 104*b*. As such, only the first base plate 104*a* is described with the understanding that the description of the second base plate 104*b* would be identical. The elements of the first base plate 104*a* will have reference numerals ending in "a". As such, it is to be understood that the elements of the second base plate 104*b* will have like reference numerals ending in "b".

The configuration of first base plate 104*a* is defined with reference to a horizontal reference line X and a vertical center reference line Y, provided in FIG. 4. The first base plate 104*a* is a thin plate having first and second side surfaces 129*a*, 131*a* separated by an edge described herein.

A top 128*a* of the first base plate 104*a* is provided at the intersection of the horizontal reference line X and the vertical center reference line Y. A bottom 130*a* of the first base plate 104*a* is provided at a predetermined distance below the top 128*a*, for example 7.688 inches below. A first reference point A is provided at a predetermined distance below the top 128*a*, for example 1.125 inches below, along the reference line Y. A second reference point B is provided at a predetermined distance below the top 128*a*, for example 2.250 inches below, along the reference line Y, and is spaced apart from and below reference point A. A third reference point C is provided at a predetermined distance below the top 128*a*, for example 3.875 inches below, along the reference line Y, and is spaced apart from and below reference point B. A fourth reference point D is provided at a predetermined distance below the reference line X, for example 3.604 inches below, and at a predetermined distance to the left of reference line Y, for example 1.797 inches to the left. A fifth reference point E is provided at a predetermined distance below the reference line X, for example 4.104 inches below, and at a predetermined distance to the left of reference line Y, for example 3.172 inches to the left, and falls outside of the physical surface of the first base plate 104*a*. A sixth reference point F is provided at a predetermined distance below the reference line X, for example 5.409 inches below, and at a predetermined distance to the left of reference line Y, for example 2.387 inches to the left. A seventh reference point G is provided at a predetermined distance below the reference line X, for example 6.438 inches below, and at a predetermined distance to the left of reference line Y, for example 0.563 inches to the left. An eighth reference point H is provided at a predetermined distance below the reference line X, for example approximately 1.75 inches below, and at a predetermined distance to the left of reference line Y, for example approximately 0.625 inches to the left. Reference points E is provided outside of the perimeter of the first base plate 104*a*, whereas reference points A, B, C, D, F, G, H are provided inside of the perimeter of the first base plate 104*a*.

The left side of the first base plate 104*a* (everything to the left of the reference line Y as viewed in FIG. 3) is described, with the understanding that the right side of the first base plate 104*a* (everything to the right of the reference line Y as viewed in FIG. 3) is the mirror image. As such, the edges, apertures and reference points on the right side are not described and are denoted with a prime.

From the top 128*a*, a first edge portion 132*a* is formed as an arc about reference point A at a predetermined radius, for example at a radius of 1.125 inches. Thus, the first edge portion 132*a* curves downwardly and to the left of reference line Y. A third edge portion 136*a* is formed as an arc about reference point D at a predetermined radius, for example at a radius of 0.687 inches. A second edge portion 134*a* is formed as a line which is tangent to both the first edge portion 132*a* and the third edge portion 136*a*. Thus, the second edge portion 134*a* extends downwardly and to the left from the first edge portion 132*a* to the third edge portion 136*a*, and the third edge portion 136*a* curves downwardly and to the left from the second edge portion 134*a*. A fifth edge portion 140*a* is formed as an arc about reference point E at a predetermined radius, for example at a radius of 0.688 inches. A fourth edge portion 138*a* is formed as a line which is tangent to both the third edge portion 136*a* and the fifth edge portion 140*a*. Thus, the fourth edge portion 138*a* extends downwardly and to the left from the third edge portion 136*a* to the fifth edge portion 140*a*, and the fifth edge portion 140*a* curves downwardly and to the left from the fourth edge portion 138*a*. A seventh edge portion 144*a* is formed as an arc about reference point F at a predetermined radius, for example at a radius of 0.687 inches. A sixth edge portion 142*a* is formed as a line which is tangent to both the fifth edge portion 140*a* and the seventh edge portion 144*a*. Thus, the sixth edge portion 142*a* extends downwardly and to the left from the fifth edge portion 140*a* to the seventh edge portion 144*a*, and the seventh edge portion 144*a* curves downwardly and to the left from the sixth edge portion 142*a* to a left end 146*a*, which is the furthermost left point along the perimeter of the first base plate 104*a* from reference line Y, and further curves downwardly and to the right from the left end 146*a*. A ninth edge portion 150*a* is formed as an arc about reference point G at a predetermined radius, for example at a radius of 1.250 inches. An eighth edge portion 148*a* is formed as a line which is tangent to both the seventh edge portion 144*a* and the ninth edge portion 150*a*. Thus, the eighth edge portion 148*a* extends downwardly and to the right from the seventh edge portion 144*a* to the ninth edge portion 150*a*, and the ninth edge portion 150*a* curves downwardly and to the right from the eighth edge portion 148*a*. A tenth edge portion 152*a* is formed as a line which is tangent to the ninth edge portion 150*a* and which is parallel to the reference line X. Thus, the tenth edge portion 152*a* extends straight to the right from the ninth edge portion 150*a* to the bottom 130*a*.

A first aperture 180*a* is formed through the first base portion 104*a* and extends from the first surface 129*a* to the second surface 131*a*. The first aperture 180*a* is generally shaped like an hourglass and includes a first section 182*a*, a second section 184*a*, and a third connecting section 186*a* which connects the first section 182*a* to the second section 184*a*. The first, second and third sections 182*a*, 184*a*, 186*a* are all illustrated as being bisected by the reference line Y such that half of the first, second and third sections 182*a*, 184*a*, 186*a* are provided on the left side of the first base portion 104*a* and such that the other half of the first, second and third sections 182*a*, 184*a*, 186*a* are provided on the right side of the first base portion 104*a*.

The first portion 182*a* is formed by a circle with a predetermined radius defined about reference point A, for example a radius of 0.544 inches. The second portion 184*a* is formed by a circle with a predetermined radius defined about reference point B, for example a radius of 0.544 inches. The circles defining the first and second portions 182*a*, 184*a* are tangential to one another at a point which is on the same horizontal plane as reference points H and H'. The connecting portion 186*a* is defined by edges of the first aperture 180*a* formed at a predetermined radius about reference points H and H', respectively, for example at a radius of 0.375 inches, such that the first aperture 180*a* is relatively hourglass shaped.

A second aperture 188*a* is formed through the first base portion 104*a* and extends from the first surface 129*a* to the second surface 113*a*. The second aperture 188*a* is formed by a circle with a predetermined radius defined about reference point C, for example with a radius of 0.29 inches. The second aperture 188a is illustrated as being bisected by the reference line Y such that half of the second aperture 188a is provided on the left side of the first base portion 104a and such that the other half of the second aperture 188a is provided on the right side of the first base portion 104a.

A third aperture 190a is formed through the first base portion 104a and extends from the first surface 129a to the second surface 131a. The third aperture 190a is formed by a circle with a predetermined radius defined about reference point G, for example with a radius of 0.29 inches.

A fourth aperture 190a' is formed through the first base plate 104a and extends from the first surface 129a to the second surface 131a. The fourth aperture 190a' is formed on the right side of the first base plate 104a and is the mirror image of the third aperture 190a, which is formed on the left side of the first base plate 104a.

FIGS. 5 and 6 illustrate the first secondary base plate 106a, which is preferably formed of a forged, cast or fabricated metal. The first secondary base plate 106a is identical in shape and configuration to the second secondary base plate 106b. As such, only the first secondary base plate 106a is described with the understanding that the description of the second secondary base plate 106a would be identical. The elements of the first secondary base plate 106a will have reference numerals ending in "a". As such, it is to be understood that the elements of the second base plate 106b will have like reference numerals ending in "b".

The configuration of the first secondary base plate 106a is defined with reference to a horizontal reference line X and a vertical center reference line Y, provided in FIG. 6. The first secondary base plate 106a is a generally triangular thin plate having first and second side surfaces 195a, 197a separated by an edge described herein.

A top 194a of the secondary base plate 106a is provided at the intersection of the horizontal reference line X and the vertical center reference line Y. A bottom 196a of the secondary base plate 106a is provided at a predetermined distance below the top 194a, for example 3.75 inches below. A first reference point A' is provided at a predetermined distance below the top 194a, for example 0.563 inches, along the reference line Y. A second reference point B' is provided at a predetermined distance below the reference line X, for example 2.169 inches below, and at a predetermined distance to the left of reference Y, for example 0.281 inches. A third reference point C' is provided at a predetermined distance below the reference line X, for example 3.125 inches below, and at a predetermined distance to the left of reference Y, for example 0.563 inches. Reference points A', B' and C' are all provided inside the perimeter of the first secondary base plate 106a.

The left side of the first secondary base plate 106a (everything to the left of the reference line Y as viewed in FIG. 6) is described, with the understanding that the right side of the first secondary base plate 106a (everything to the right of the reference line Y as viewed in FIG. 6) is the mirror image. As such, the edges, apertures and reference points on the right side are not described and are denoted with a prime.

From the top 194a, a first edge portion 198a is formed as an arc about reference point A' at a predetermined radius, for example at a radius of 0.562 inches. Thus, the first edge portion 198a curves downwardly and to the left of reference line Y. A third edge portion 202a is formed as an arc about reference point B' at a predetermined radius, for example at a radius of 1.5 inches. A second edge portion 200a is formed as a line which is tangent to both the first edge portion 198a and the third edge portion 202a. Thus, the second edge portion 200a extends downwardly and to the left from the first edge portion 198a to the third edge portion 202a, and the third edge portion 202a curves downwardly and to the left from the second edge portion 200a to a left end 204a, which is the furthermost left point along the perimeter of the first secondary base plate 106a from reference line Y, and further curves downwardly and to the right from the left end 204a. A fifth edge portion 208a is formed as an arc about reference point C at a predetermined radius, for example at a radius of 0.625 inches. A fourth edge portion 206a is formed as a line which is tangent to both the third edge portion 202a and the fifth edge portion 208a. Thus, the fourth edge portion 206a extends downwardly and to the right from the third edge portion 202a to the fifth edge portion 208a, and the fifth edge portion 208a curves downwardly and to the right from the fourth edge portion 206a. A sixth edge portion 210a is formed as a line which is tangent to the fifth edge portion 208a and which is parallel to the reference line X. Thus, the sixth edge portion 210a extends straight to the right from the fifth edge portion 208a to the bottom 196a.

A first aperture 230a is formed through the first secondary base plate 106a and extends from the first surface 195a to the second surface 197a. The first aperture 230a is formed by a circle with a predetermined radius defined about reference point A', for example with a radius of 0.29 inches. The first aperture 230a is illustrated as being bisected by the reference line Y such that half of the first aperture 230a is provided on the left side of the first secondary base plate 106a and such that the other half of the first aperture 230a is provided on the right side of the first secondary base plate 106a.

A second aperture 232a is formed through the first secondary base plate 106a and extends from the first surface 195a to the second surface 197a. The second aperture 232a is formed by a circle with a predetermined radius defined about reference point C', for example with a radius of 0.29 inches.

A third aperture 232a' is formed through the first secondary base plate 106a and extends from the first surface 195a to the second surface 197a. The third aperture 232a' is formed on the right side of the first secondary base plate 106a and is the mirror image of the second aperture 232a, which is formed on the left side of the first secondary base plate 106a.

FIGS. 7 and 8 illustrate the first equalizer arm 108a, which is preferably formed of a forged, cast or fabricated metal. The first equalizer arm 108a is identical in shape and configuration to the second equalizer arm 108b. As such, only the first equalizer arm 108a is described with the understanding that the description of the second equalizer arm 108b would be identical. The elements of the first equalizer arm 108a will have reference numerals ending in "a". As such, it is to be understood that the elements of the second equalizer arm 108b will have like reference numerals ending in "b".

The configuration of the first equalizer arm 108a is defined with reference to a horizontal reference line X and a vertical center reference line Y, provided in FIG. 8. The first equalizer arm 108a is a thin plate having first and second side surfaces 238a, 239a separated by an edge described herein.

A bottom 236a of the first equalizer arm 108a is provided at the intersection of the horizontal reference line X and the vertical center reference line Y. A first reference point A''' is provided at a predetermined distance above the bottom 236a, for example 2.173 inches above. A second reference point B''' is provided at a predetermined distance above the reference line X, for example 1.5 inches above, and at a predetermined distance to the left of reference line Y, for example 1.75 inches. Reference points A''' and B''' are provided outside of the perimeter of the first equalizer arm 108a.

The left side of the first equalizer arm 108a (everything to the left of the reference line Y as viewed in FIG. 8) is described, with the understanding that the right side of the first equalizer arm 108a (everything to the right of the reference line Y as viewed in FIG. 8) is the mirror image. As such, the edges and reference points on the right side are not described and are denoted with a prime.

From the bottom 236a, a first edge portion 240a extends straight to the left of reference line Y, along reference line X, for a predetermined distance, for example 1.504 inches. A left end 244a of the first equalizer arm 108a, which is the furthermost left point along the perimeter of the first equalizer arm 108a from reference line Y, is provided at a predetermined distance from both the reference line X and the reference line Y, for example 0.612 inches above reference line X and 2.794 inches to the left of reference line Y. A second edge portion 242a extends straight upwardly and to the left of reference line Y from the first edge portion 240a to the left end 244a. A top left end 248a of the first equalizer arm 108a is provided at a predetermined distance from both the reference line X and the reference line Y, for example 1.375 inches above reference line X and 2.432 inches to the left of reference line Y. From the left end 244a, a third edge portion 246a extends straight upwardly and to the right to the top left end 248a. A fifth edge portion 252a is formed as an arc about reference point B at a predetermined radius, for example at a radius of 0.535 inches. From the top left end 248a, a fourth edge portion 250a extends straight to the right toward the reference line Y and parallel to the reference line X, to an end of the fifth edge portion 252a. A seventh edge portion 256a is formed as an arc about reference point A at a predetermined radius, for example at a radius of 1.338 inches. A sixth edge portion 254a extends parallel to the reference line X and is co-planar with the fourth edge portion 250a. The sixth edge portion 254a connects the fifth edge portion 252a to the seventh edge portion 256a. The fifth edge portion 252a thus curves downwardly and to the right from the fourth edge portion 250a and then upwardly and to the right to the sixth edge portion 254a. The seventh edge portion 256a thus curves downwardly and to the right from the sixth edge portion 254a to the reference line Y, to a predetermined position above the bottom 236a, for example 0.835 inches above.

Figure 9:
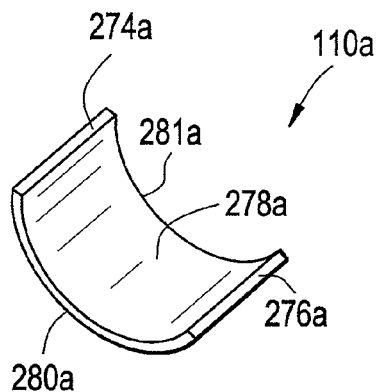
FIG. 9 is a perspective view of a lower shock plate of the first embodiment of the equalizer.
Figure 10:
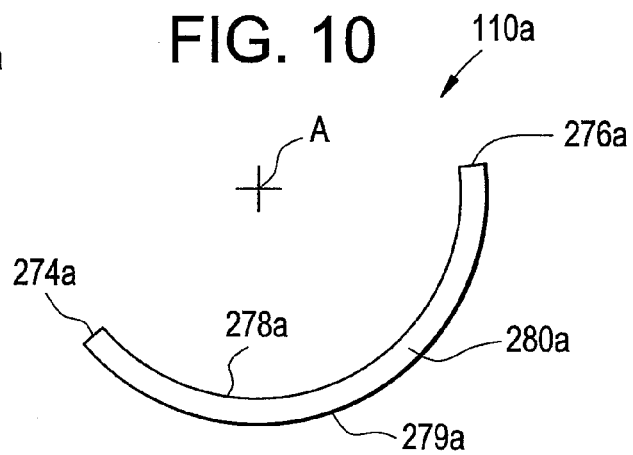
FIG. 10 is a front view of the lower shock plate illustrated in FIG. 9.

Attention is directed to FIGS. 9 and 10 which illustrate the first lower shock plate 110a, which is preferably formed of a forged, cast or fabricated metal. The first lower shock plate 110a is identical in shape and configuration to the second lower shock plate 110b. As such, only the first lower shock plate 110a is described with the understanding that the description of the second lower shock plate 100b would be identical. The elements of the first lower shock plate 110a will have reference numerals ending in "a". As such, it is to be understood that the elements of the second lower shock plate 110b will have like reference numerals ending in "b".

The first lower shock plate 110a is a thin plate which is curved from a first end 274a thereof to a second end 276a thereof. The first lower shock plate 110a has a generally uniform predetermined thickness from the first end 274a to the second end 276a, for example a thickness of 0.125 inches, such that the first lower shock plate 110a has an inner surface 278a, an outer surface 279a, a first side 280a, and a second side 281a. The inner surface 278a is formed as an arc about reference point A, as illustrated in FIG. 10, at a predetermined radius, for example at a radius of 1.188 inches. The first and second ends 274a, 276a are provided at a predetermined angle to one another relative to the reference point A, for example an angle of 145 degrees. The first and second ends 274a, 276a are provided at a predetermined linear distance to one another, for example a distance of 1.563 inches.

Figure 11:
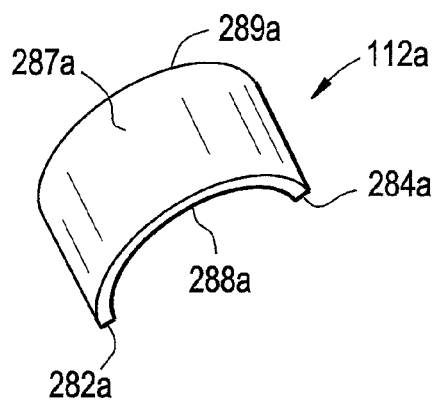
FIG. 11 is a perspective view of an upper shock plate of the first embodiment of the equalizer.
Figure 12:
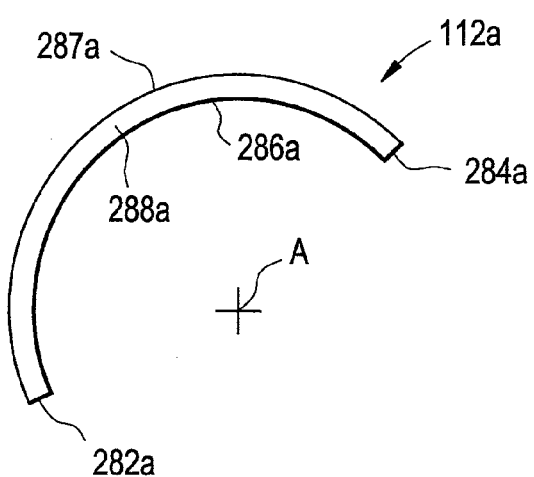
FIG. 12 is a front view of the upper shock plate illustrated in FIG. 11.

Attention is directed to FIGS. 11 and 12 which illustrate the first upper shock plate 112a, which is preferably formed of a forged, cast or fabricated metal. The first upper shock plate 112a is identical in shape and configuration to the second upper shock plate 112b. As such, only the first upper shock plate 112a is described with the understanding that the description of the second upper shock plate 112b would be identical. The elements of the first upper shock plate 112a will have reference numerals ending in "a". As such, it is to be understood that the elements of the second upper shock plate 112b will have like reference numerals ending in "b".

The first upper shock plate 112a is a thin plate which is curved from a first end 282a thereof to a second end 284a thereof. The first upper shock plate 112a has a generally uniform predetermined thickness from the first end 282a to the second end 284a, for example a thickness of 0.125 inches, such that the first upper shock plate 112a has an inner surface 286a, an outer surface 287a, a first side 288a, and a second side 289a. The inner surface 286a is formed as an arc about reference point A, as illustrated in FIG. 12, at a predetermined radius, for example at a radius of 1.188 inches. The first and second ends 282a, 284a are provided at a predetermined angle to one another relative to the reference point A, for example an angle of 160 degrees. The first and second ends 282a, 284a are provided at a predetermined linear distance to one another, for example a distance of 1.625 inches.

Figure 13:
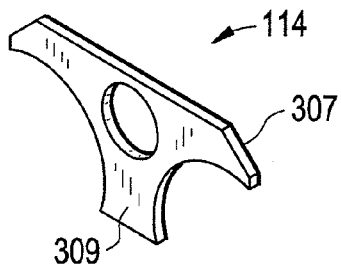
FIG. 13 is a perspective view of a reinforcement plate of the first embodiment of the equalizer.
Figure 14:
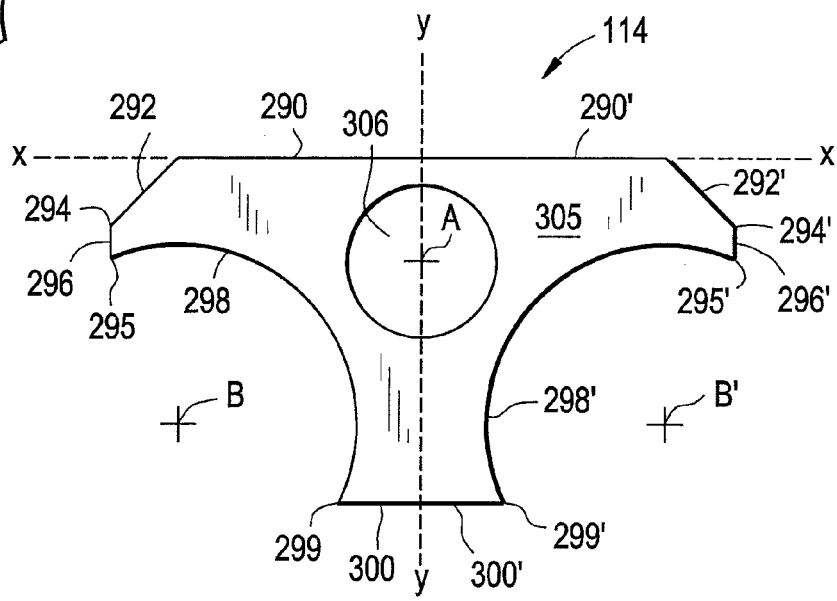
FIG. 14 is a front view of the reinforcement plate illustrated in FIG. 13.

FIGS. 13 and 14 illustrate the reinforcement plate 114, which is preferably formed of a forged, cast or fabricated metal. The configuration of the reinforcement plate 114 is defined with reference to a horizontal reference line X and a vertical center reference line Y, provided in FIG. 14. The reinforcement plate 114 is a generally T-shaped thin plate having first and second side surfaces 305, 307 separated by an edge described herein.

A first reference point A is provided at a predetermined distance below the reference line X, for example 0.75 inches below, and along the reference line Y. A second reference point B is provided at a predetermined distance below the reference line X, for example 1.954 inches below, and at a predetermined distance to the left of reference line Y, for example 4.23 inches. Reference point B is provided outside of the perimeter of the reinforcement plate 114, whereas reference point A is provided inside of the perimeter of the reinforcement plate 114.

The left side of the reinforcement plate 114 (everything to the left of the reference line Y as viewed in FIG. 14) is described, with the understanding that the right side of the reinforcement plate 114 (everything to the right of the reference line Y as viewed in FIG. 14) is the mirror image. As such, the edges and reference point on the right side are not described and are denoted with a prime.

From the intersection of the reference lines X and Y, a first edge portion 290 extends straight to the left of reference line Y, along the reference line X, for a predetermined distance, for example 1.875 inches. A second edge portion 292 extends straight downwardly and to the left from the first edge portion 290 at a predetermined angle, for instance forty-five degrees, to a top end 294 of a third edge portion 296. The third edge portion 296 is parallel to the reference line Y and is provided at a predetermined distance to the left of reference line Y, for example 2.375 inches. A fifth edge portion 300, which is parallel to the reference line X, extends straight to the left from the reference line Y and is provided at a predetermined distance below the reference line X, for example 2.5 inches below. A fourth edge portion 298 is formed as an arc about reference point B at a predetermined radius, for example 1.338 inches. The fourth edge portion 298 curves from a bottom end 295 of the third edge portion 296 to a left end 299 of the fifth edge portion 300.

An aperture 306 is formed through the reinforcement plate 114 and extends from the first side surface 305 to the second side surface 307. The aperture 306 is formed by a circle with a predetermined radius defined about reference point A, for example with a radius of 0.5625 inches. The aperture 306 is illustrated as being bisected by the reference line Y such that half of the aperture 306 is provided on the left side of the reinforcement plate 114 and such that the other half of the aperture 306 is provided on the right side of the reinforcement plate 114.

Figure 15:
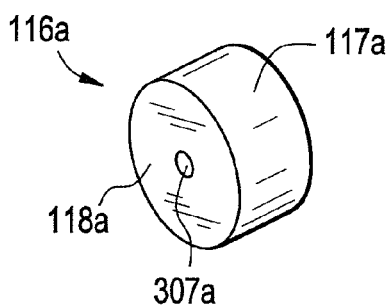
FIG. 15 is a perspective view of a shock absorber of the first embodiment of the equalizer.

FIG. 15 illustrates the first shock absorber 116a. The first shock absorber 116a is identical in shape and configuration to the second shock absorber 116b. As such, only the first shock absorber 116a is described with the understanding that the description of the second shock absorber 116b would be identical. The elements of the first shock absorber 116a will have reference numerals ending in "a". As such, it is to be understood that the elements of the second shock absorber 116b will have like reference numerals ending in "b".

The first shock absorber 116a is preferably in the form of a cylindrical puck or disk and made of TORSILASTIC® rubber. The first shock absorber 116a has a cylindrical outer surface 117a provided between a first end surface 118a and a second end surface (not shown). An aperture 307a is provided through the first shock absorber 116a from the first end surface 118a to the second end surface. In use, the outer surface 117a is positioned between the inner surfaces 278a, 286a of the first lower shock plate 110a and the first upper shock plate 112a, respectively and, therefore, has a circumference which is correspondingly shaped to the first lower and upper shock plates 110, 112. For example, the outer surface 117a is formed at a radius of approximately 1.188 inches, which is the radius at which the inner surfaces 278a, 286a of the first lower and upper shock plates 111a, 112a, respectively, are formed.

Figure 16:
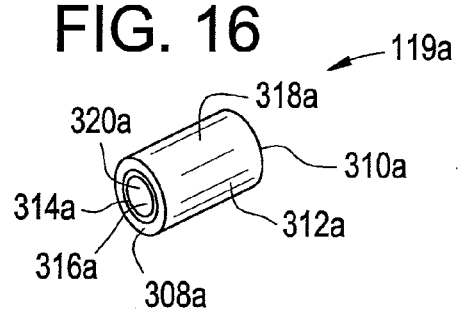
FIG. 16 is a perspective view of an upper pivot tube of the first embodiment of the equalizer.
Figure 17:
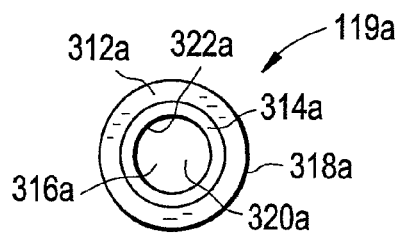
FIG. 17 is a side view of the upper pivot tube illustrated in FIG. 16.

FIGS. 16 and 17 illustrate the first upper pivot tube 119a, which is preferably formed of a forged, cast or fabricated metal. The first upper pivot tube 119a is identical in shape and configuration to the second, third and fourth upper pivot tubes 119b, 119c, 119d. As such, only the first upper pivot tube 119a is described with the understanding that the description of the second, third and fourth upper pivot tubes 119b, 119c, 119d would be identical. The elements of the first upper pivot tube 119a will have reference numerals ending in "a". As such, it is to be understood that the elements of the second upper pivot tube 119b will have like reference numerals ending in "b"; the elements of the third upper pivot tube 119c will have like reference numerals ending in "c"; and the elements of the fourth upper pivot tube 119d will have like reference numerals ending in "d".

The first upper pivot tube 119a has a first end 308a and a second end 310a. In a preferred embodiment, a distance from the first end 308a to the second end 310a is approximately 1.75 inches. The first upper pivot tube 119a is formed of an outer tube 312a and an inner tube or bushing 314a. The outer tube 312a extends from the first end 308a to the second end 310a and has an aperture 316a which extends therethrough from the first end 308a to the second end 310a. The outer tube 312a thus has an outer surface 318a and an inner surface (not shown). In a preferred embodiment, the outer tube 312a has an outer diameter of approximately 1.07 inches and an inner diameter of approximately 0.75 inches. The inner tube or bushing 314a is positioned within the aperture 316a of the outer tube 312a and extends from the first end 308a to the second end 310a. The inner tube or bushing 314a defines an aperture 320a which extends therethrough from the first end 308a to the second end 310a. The inner tube 314a thus has an outer surface (not shown) and an inner surface 322a. In a preferred embodiment, the inner tube 314a has an outer diameter of approximately 0.75 inches and an inner diameter of approximately 0.565 inches. The outer surface of the inner tube 314a is configured and sized to snugly fit against the inner surface of the outer tube 312a.

Figure 18:
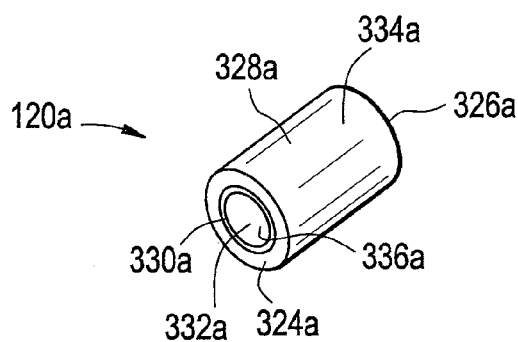
FIG. 18 is a perspective view of a lower pivot tube of the first embodiment of the equalizer.
Figure 19:
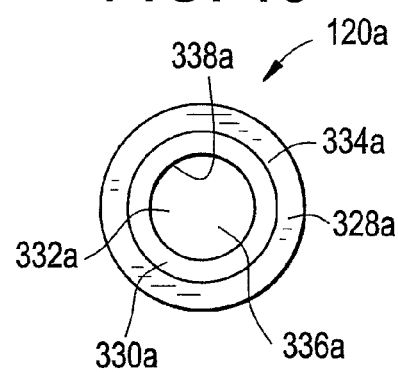
FIG. 19 is a side view of the lower pivot tube illustrated in FIG. 18.

FIGS. 18 and 19 illustrate the first lower pivot tube 120a, which is preferably formed of a forged, cast or fabricated metal. The first lower pivot tube 120a is identical in shape and configuration to the second lower pivot tube 120b. As such, only the first lower pivot tube 120a is described with the understanding that the description of the second lower pivot tube 120b would be identical. The elements of the first lower pivot tube 120a will have reference numerals ending in "a". As such, it is to be understood that the elements of the second lower pivot tube 120b will have like reference numerals ending in "b".

The first lower pivot tube 120a has a first end 324a and a second end 326a. A distance from the first end 324a to the second end 326a is predetermined, for example approximately 1.563 inches. The first lower pivot tube 120a is formed of an outer tube 328a and an inner tube or bushing 330a. The outer tube 328a extends from the first end 324a to the second end 326a and has an aperture 332a which extends therethrough from the first end 324a to the second end 326a. The outer tube 328a thus has an outer surface 334a and an inner surface (not shown). The outer tube 328a has a predetermined outer diameter, for example approximately 1.07 inches, and a predetermined inner diameter, for example approximately 0.75 inches. The inner tube or bushing 330a is positioned within the aperture 332a of the outer tube 328a and extends from the first end 324a to the second end 326a. The inner tube or bushing 330a defines an aperture 336a which extends therethrough from the first end 324a to the second end 326a. The inner tube 330a thus has an outer surface (not shown) and an inner surface 338a. The inner tube 330a has a predetermined outer diameter, for example approximately 0.75 inches, and a predetermined inner diameter, for example approximately 0.565 inches. The outer surface of the inner tube 330a is configured and sized to snugly fit against the inner surface of the outer tube 328a.

Figure 20:
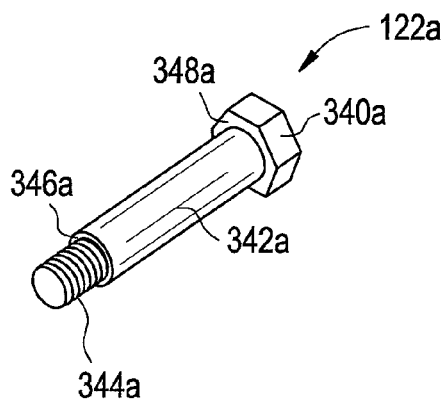
FIG. 20 is a perspective view of a fastening member of the first embodiment of the equalizer.

FIG. 20 illustrates the first fastening member 122a. The first fastening member 122a is identical in shape and configuration to the second and third fastening members 122b, 122c. As such, only the first fastening member 122a is described with the understanding that the description of the second and third fastening members 122b, 122c would be identical. The elements of the first fastening member 122a will have reference numerals ending in "a". As such, it is to be understood that the elements of the second fastening member 122b will have like reference numerals ending in "b" and the elements of the third fastening member 122c will have like reference numerals ending in "c".

The first fastening member 122a is preferably a bolt having an enlarged head portion 340a, a first shaft portion 342a, and a second shaft portion 344a. The enlarged head portion 340a preferably is a hex-head, but other shapes are within the scope of the invention. The first shaft portion 342a extends from the enlarged head portion 340a and is preferably cylindrical. The second shaft portion 344a extends from the first shaft portion 342a, such that the first shaft portion 342a is positioned between the enlarged head portion 340a and the second shaft portion 344a, and is preferably cylindrical and externally threaded. The second shaft portion 344a preferably has a predetermined outer diameter which is smaller than a predetermined outer diameter of the first shaft portion 342a such that a shoulder 346a is provided between the first and second shaft portions 342a, 344a. The predetermined outer diameter of the first shaft portion 342a is preferably smaller than a predetermined outer diameter of the enlarged head portion 340a such that a shoulder 348a is provided between the enlarged head portion 340a and the first shaft portion 342a.

Figure 21:
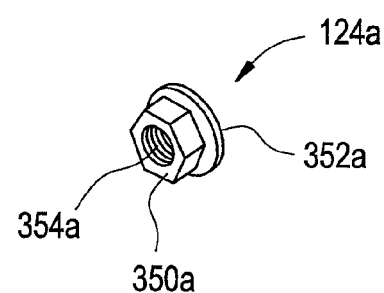
FIG. 21 is a perspective view of a securing member of the first embodiment of the equalizer.

FIG. 21 illustrates the first securing member 124a. The first securing member 124a is identical in shape and configuration to the second and third securing members 124b, 124c. As such, only the first securing member 124a is described with the understanding that the description of the second and third securing members 124b, 124c would be identical. The elements of the first securing member 124a will have reference numerals ending in "a". As such, it is to be understood that the elements of the second securing member 124b will have like reference numerals ending in "b" and the elements of the third securing member 124c will have like reference numerals ending in "c".

The first securing member 124a preferably includes a conventional nut 350a secured to a conventional washer 352a. The nut 350a preferably has a hex-head. The nut 350a and the washer 352a have an aperture 354a extending therethrough. The aperture 354a defines an aperture wall which is preferably at least partially threaded.

Figure 22:
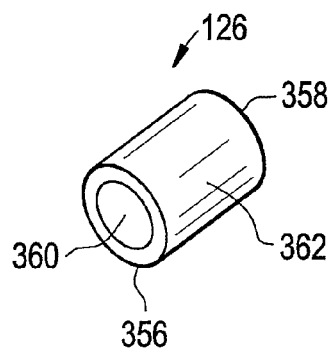
FIG. 22 is a perspective view of a shock spacer of the first embodiment of the equalizer.
Figure 23:
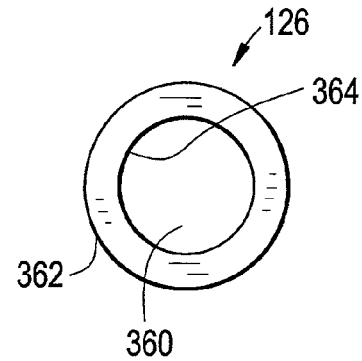
FIG. 23 is a side view of the shock spacer illustrated in FIG. 22.

FIGS. 22 and 23 illustrate the base or shock spacer 126, which is preferably formed of a forged, cast or fabricated metal. The base or shock spacer 126 has a first end 356 and a second end 358. A distance from the first end 356 to the second end 358 is predetermined, for example approximately 1.625 inches. The base or shock spacer 126 is formed as a tube and has an aperture 360 which extends therethrough from a first end 356 to a second end 358. The base or shock spacer 126 thus has an outer surface 362 and an inner surface 364. An outer diameter of the base or shock spacer 126 at the outer surface 362 thereof is predetermined, for example approximately 1.07 inches, and an inner diameter of the base or shock spacer 126 at the inner surface 364 thereof is predetermined, for example approximately 0.75 inches.

FIGS. 2 and 24-38 illustrate the construction of the equalizer 100 alone and in conjunction with the suspension system 102, as well as the function of the equalizer 100 with the suspension system 102.

Figure 24:
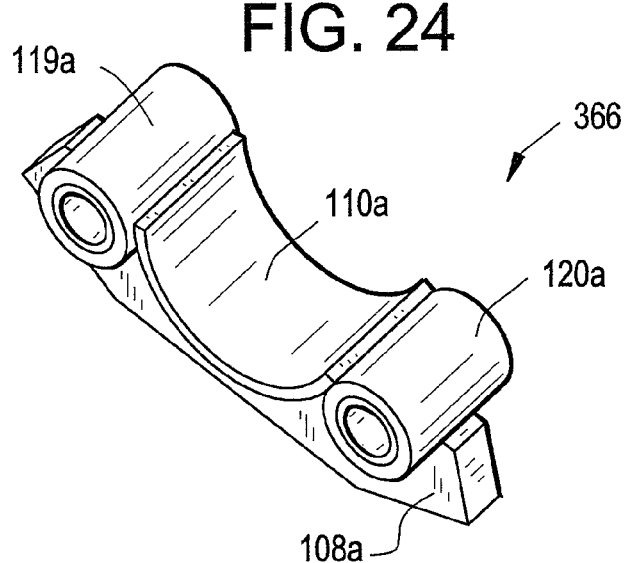
FIG. 24 is a perspective view of an equalizer arm assembly of the first embodiment of the equalizer.
Figure 25:
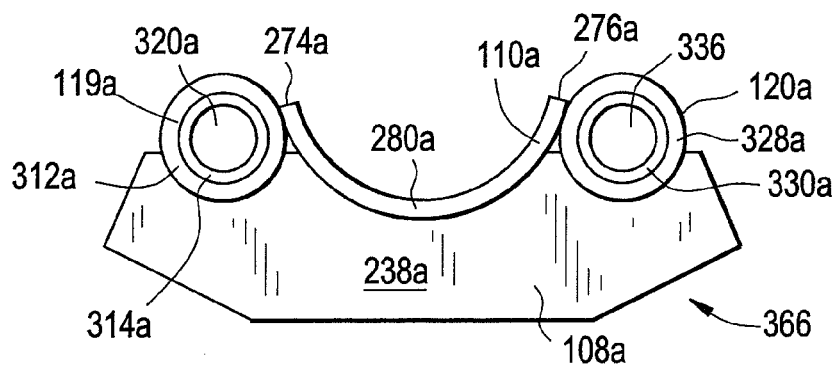
FIG. 25 is a front view of the equalizer arm assembly illustrated in FIG. 24.
Figure 26:
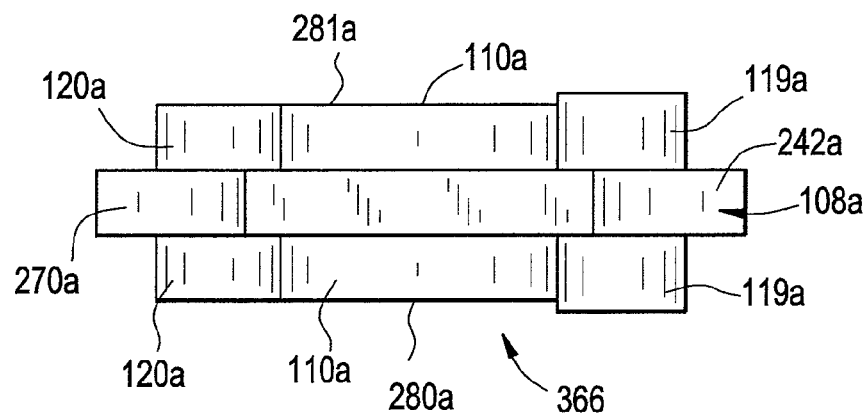
FIG. 26 is a bottom view of the equalizer arm assembly illustrated in FIG. 24.
Figure 27:
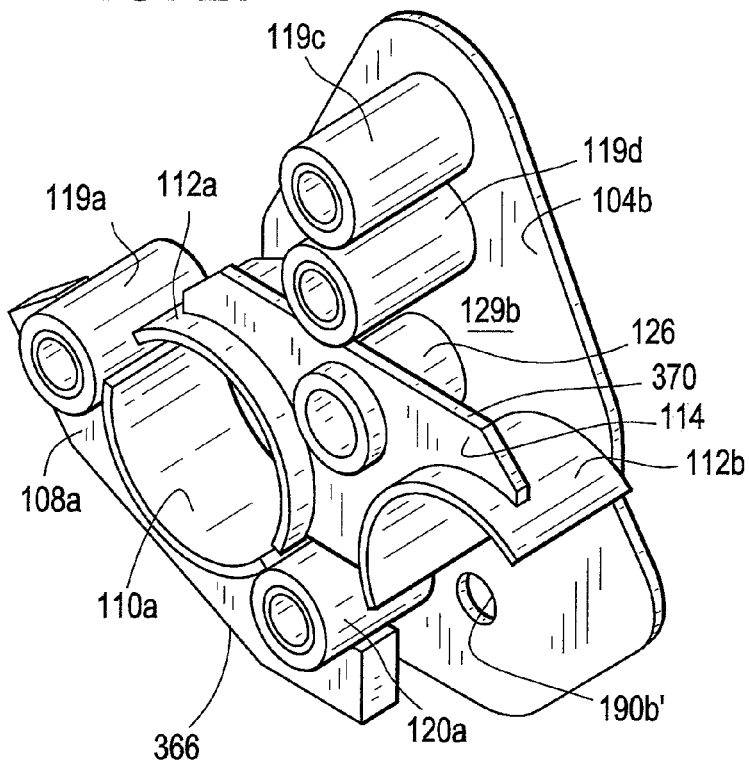
FIGS. 27-32 are perspective views illustrating the formation of the first embodiment of the equalizer.
Figure 28:
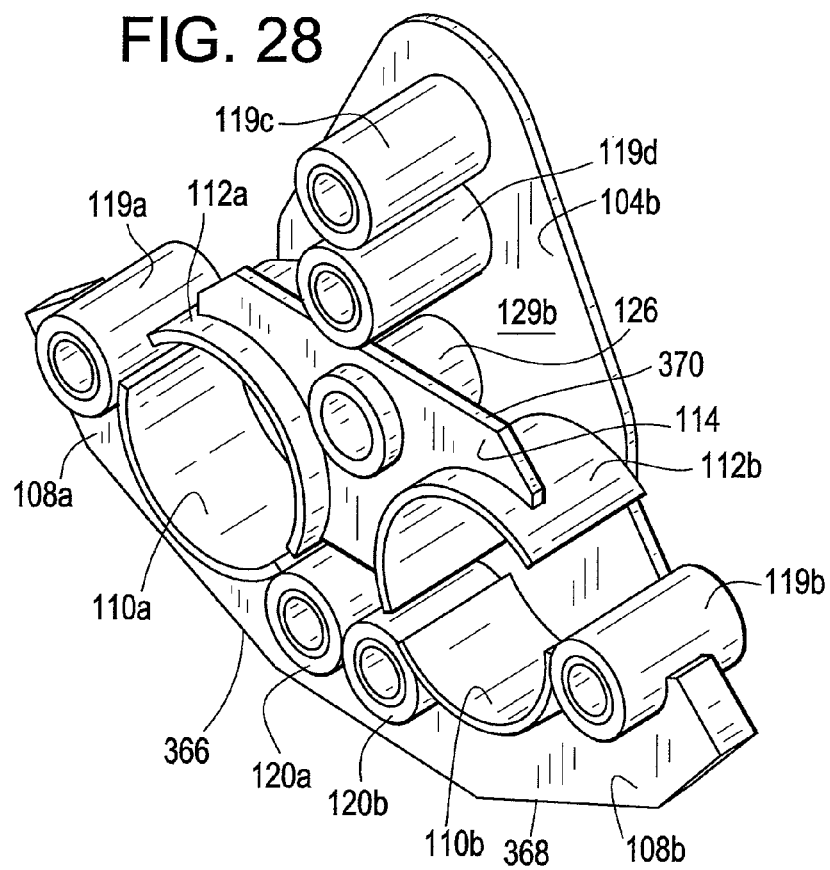
Figure 29:
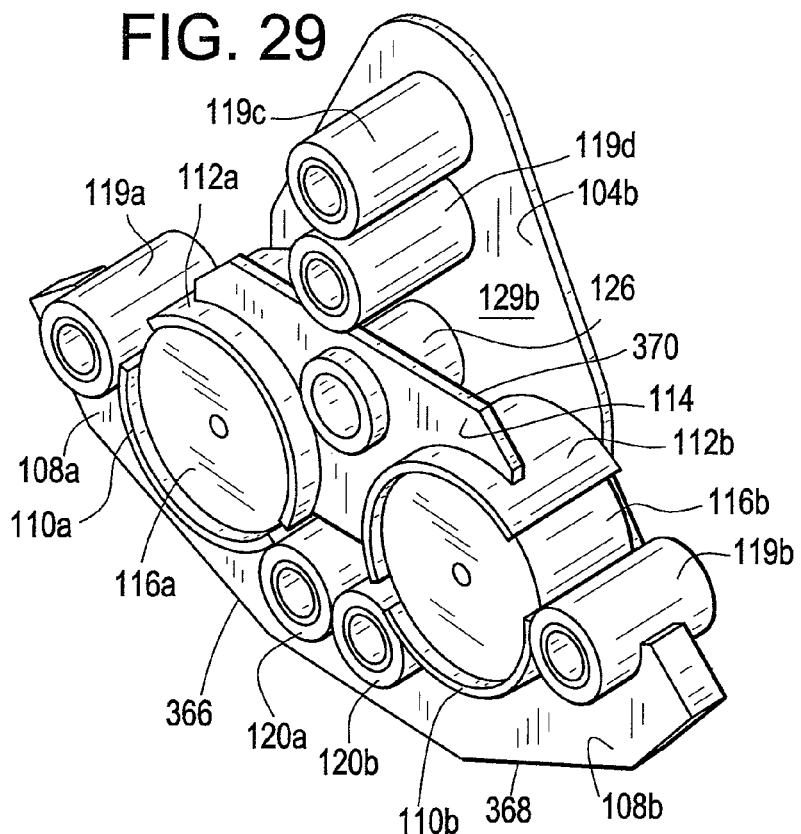

The equalizer 100 is constructed by forming first and second equalizer arm assemblies 366, 368. The configuration of the first equalizer arm assembly 366 is illustrated in FIGS. 24-26. The first equalizer arm assembly 366 includes the first equalizer arm 108a, the first lower shock plate 110a, the first upper pivot tube 119a, and the first lower pivot tube 120a.

The outer surface 318a of the outer tube 312a of the first upper pivot tube 119a is positioned against the fifth edge portion 252a of the first equalizer arm 108a, such that the first end 308a of the first upper pivot tube 119a extends outwardly from the first surface 238a of the first equalizer arm 108a and such that the second end 310a of the first upper pivot tube 119a extends outwardly from the second surface 239a of the first equalizer arm 108a. The outer surface 318a of the outer tube 312a of the first upper pivot tube 119a is fixedly secured to the first equalizer arm 108a, preferably by welding.

The outer surface 334a of the outer tube 328a of the first lower pivot tube 120a is positioned against the fifth edge portion 252a' of the first equalizer arm 108a, such that the first end 324a of the first lower pivot tube 120a extends outwardly from the first surface 238a of the first equalizer arm 108a and such that the second end 326a of the first lower pivot tube 120a extends outwardly from the second surface 239a of the first equalizer arm 108a. The first end 324a is provided closer to the first surface 238a of the first equalizer arm 108a than is the first end 308a of the first upper pivot tube 119a, and the second end 326a is provided closer to the second surface 239a of the first equalizer arm 108a than is the second end 310a of the first upper pivot tube 119a. The outer surface 334a of the outer tube 328a of the first lower pivot tube 120a is fixedly secured to the first equalizer arm 108a, preferably by welding.

The outer surface 279a of the first lower shock plate 110a is positioned against the seventh edge portions 256a, 256a' of the first equalizer arm 108a, such that the first side 280a of the first lower shock plate 110a extends outwardly from the first surface 238a of the first equalizer arm 108a and such that the second side 281a of the first lower shock plate 110a extends outwardly from the second surface 239a of the first equalizer arm 108a. The first side 280a is substantially flush with the first end 324a of the first lower pivot tube 120a, and the second side 282a is substantially flush with the second end 326a of the first lower pivot tube 120a. The outer surface 279a of the first lower shock plate 110a is fixedly secured to the first equalizer arm 108a, preferably by welding. The outer surface 279a of the first lower shock plate 110a, proximate to the first end 274a thereof, faces, and may abut against, the outer surface 318a of the outer tube 312a of the first upper pivot tube 119a. The outer surface 279a of the first lower shock plate 110a, proximate to the second end 276a thereof, faces, and may abut against, the outer surface 334a of the outer tube 328a of the first lower pivot tube 120a.

The second equalizer arm assembly 368 includes the second equalizer arm 108b, the second lower shock plate 110b, the second upper pivot tube 119b, and the second lower pivot tube 120b. The configuration of the second equalizer arm assembly 368 is identical to the configuration of the first equalizer arm assembly 366, illustrated in FIGS. 24-26, except that the outer surface of the outer tube of the second upper pivot tube 119b is positioned against the fifth edge portion of the second equalizer arm 108b, as opposed to the fifth edge portion 252b, and the outer surface 334b of the outer tube 328b of the first lower pivot tube 120b is positioned against the fifth edge portion 252b of the second equalizer arm 108b.

Attention is invited to FIGS. 2 and 27-36. The equalizer 100 is further constructed by forming a reinforcement plate assembly 370. The reinforcement plate assembly 370 includes the reinforcement plate 114, the shock spacer 126, and the first and second upper shock plates 112a, 112b.

The shock spacer 126 is inserted through the aperture 306 of the reinforcement plate 114 such that the first end 356 of the shock spacer 126 extends outwardly from the first surface 305 of the reinforcement plate 114 and such that the second end 358 of the shock spacer 126 extends outwardly from the second surface 307 of the reinforcement plate 114. The second end 358 preferably extends further outwardly from the second surface 307 than does the first end 356 from the first surface 305. The outer surface 362 is preferably generally positioned against a wall defined by the aperture 306, and the outer surface 362 is fixedly secured to the reinforcement plate 114, preferably by welding. The shock spacer 126 spaces the reinforcement plate 114 from the first and second base plates 104a, 104b The outer surface 287a of the first upper shock plate 112a is positioned against the fourth edge portion 298 of the reinforcement plate 114, such that the first side 288a of the first upper shock plate 112a extends outwardly from the first surface 305 of the reinforcement plate 114 and such that the second side 289a of the first upper shock plate 112a extends outwardly from the second surface 307 of the reinforcement plate 114. The outer surface 287a of the first upper shock plate 112a is fixedly secured to the reinforcement plate 114, preferably by welding. The second side 289a preferably extends further outwardly from the second surface 307 than does the first side 288a from the first surface 305. The first side 288a is substantially planar with the first end 356 of the shock spacer 126, and the second side 289a is substantially planar with the second end 358 of the shock spacer 126.

The outer surface 287b of the second upper shock plate 112b is positioned against the fourth edge portion 298' of the reinforcement plate 114, such that the first side 288b of the second upper shock plate 112b extends outwardly from the first surface 305 of the reinforcement plate 114 and such that the second side 289b of the second upper shock plate 112b extends outwardly from the second surface 307 of the reinforcement plate 114. The outer surface 287b of the second upper shock plate 112b is fixedly secured to the reinforcement plate 114, preferably by welding. The second side 289b preferably extends further outwardly from the second surface 307 than does the first side 288b from the first surface 305. The first side 288b is substantially planar with the first end 356 of the shock spacer 126, and the second side 289b is substantially planar with the second end 358 of the shock spacer 126.

The reinforcement plate assembly 370 is positioned against the first surface 129b of the second base plate 104b such that the second end 358 of the shock spacer 126, and the second sides 289a, 289b of the first and second upper shock plates 112a, 112b, abut against the first surface 129b of the second base plate 104b. The aperture 360 of the shock spacer 126 is aligned with the second aperture 188b of the second base plate 104b. The reinforcement plate assembly 370 is fixedly secured to the first surface 129b of the second plate 104b, preferably by welding the outer surface 362 of the shock spacer 126 to the first surface 129b of the second plate 104b, by welding the outer surface 287a of the first upper shock plate 112a to the first surface 129b, proximate to the fourth edge portion 138b thereof, and by welding the outer surface 287b of the second upper shock plate 112b to the first surface 129b, proximate to the fourth edge portion 138b' thereof.

The third upper pivot tube 119c is positioned within the first portion 182b of the first aperture 180b of the second base plate 104b such that the second end 310c of the third upper pivot tube 119c is substantially flush with the second surface 131b of the second base plate 104b. The outer surface 318c of the outer tube 312c of the third upper pivot tube 119c is fixedly secured to the first surface 129b of the second base plate 104b, preferably by welding.

The fourth upper pivot tube 119d is positioned within the second portion 184b of the first aperture 180b of the second base plate 104b such that the second end 310d of the fourth upper pivot tube 119d is substantially flush with the second surface 131b of the second base plate 104b. The outer surface 318d of the outer tube 312d of the fourth upper pivot tube 119d is fixedly secured to the first surface 129b of the second base plate 104b, and to the outer surface 318c of the outer tube 312c of the third upper pivot tube 119c, preferably by welding.

The first equalizer arm assembly 366 is positioned such that the second end 326a of the first lower pivot tube 120a faces the first surface 129b of the second base plate 104b. The aperture 336a of the first lower pivot tube 120a is in alignment with the aperture 190b provided through the second base plate 104b. The inner surfaces 278a, 286a of the first lower and upper shock plates 110a, 112a face one another. The first shock absorber 116a is positioned between the inner surfaces 278a, 286a of the first lower and upper shock plates 110a, 112a such that the outer surface 117a of the first shock absorber 116a generally abuts against or faces the inner surfaces 278a, 286a of the first lower and upper shock plates 110a, 112a. The first shock absorber 116a is held in place between the first lower and upper shock plates 110a, 112a. The first end 274a of the first lower shock plate 110a is spaced from the first end 282a of the first upper shock plate 112a. The second end 276a of the first lower shock plate 110a is spaced from the second end 284a of the first upper shock plate 112a.

The second equalizer arm assembly 368 is positioned such that the second end 326b of the second lower pivot tube 120b faces the first surface 129b of the second base plate 104b. The aperture 336b of the second lower pivot tube 120b is in alignment with the aperture 192b provided through the second base plate 104b. The inner surfaces 278b, 286b of the second lower and upper shock plates 110b, 112b face one another. The second shock absorber 116b is positioned between the inner surfaces 278b, 286b of the second lower and upper shock plates 110b, 112b such that the outer surface 117b of the second shock absorber 116b generally abuts against or faces the inner surfaces 278b, 286b of the second lower and upper shock plates 110b, 112b. The second shock absorber 116b is held in place between the first lower and upper shock plates 110b, 112b. The first end 274b of the second lower shock plate 110b is spaced from the first end 282b of the second upper shock plate 112b. The second end 276b of the second lower shock plate 110b is spaced from the second end 284b of the second upper shock plate 112b.

Figure 30:
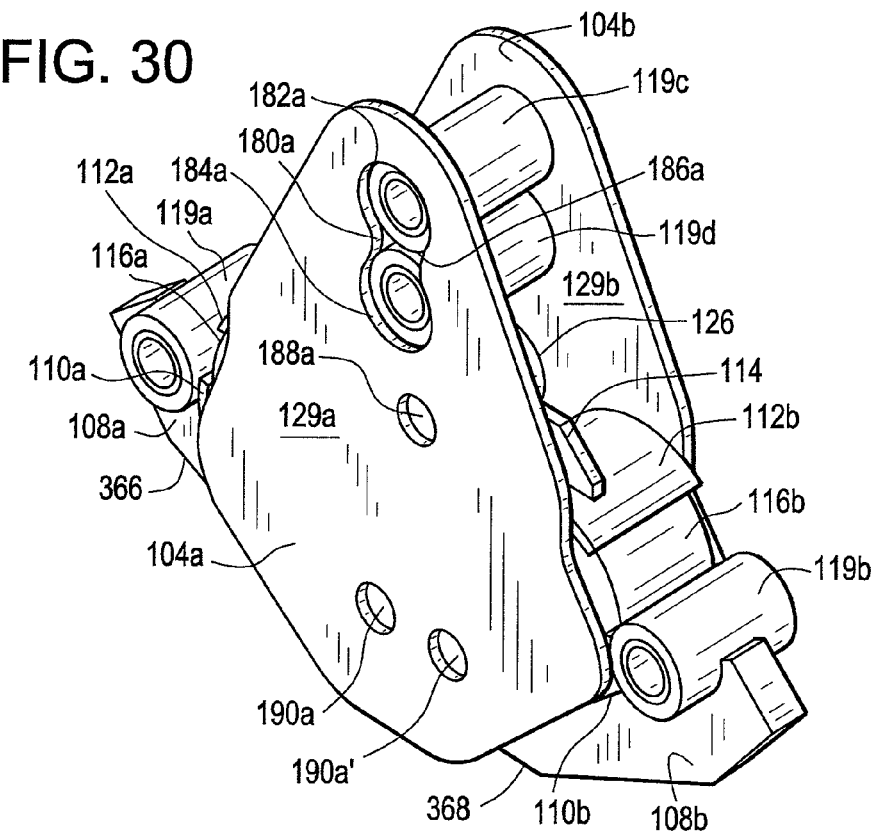

The first base plate 104a is positioned, as illustrated in FIG. 30, such that the first end 308c of the third upper pivot tube 119c extends into, from the second surface 131a of the first base plate 104a, the first portion 182a of the first aperture 180a of the first base plate 104a; such that the first end 308d of the fourth upper pivot tube 119d extends into, from the second surface 131a of the first base plate 104a, the second portion 184a of the first aperture 180a of the first base plate 104a; such that the first end 356 of the shock spacer 126 faces the second surface 131a of the first base plate 104a, with the aperture 360 of the shock spacer 126 being in alignment with the second aperture 188a of the first base plate 104a; such that the first end 324a of the first lower pivot tube 120a faces the second surface 131a of the first base plate 104a, with the aperture 336a of the first lower pivot tube 120a being in alignment with the third aperture 190a of the first base plate 104a; such that the first end 324b of the second lower pivot tube 120b faces the second surface 131a of the first base plate 104a, with the aperture 336b of the second lower pivot tube 120b being in alignment with the fourth aperture 190a' of the first base plate 104a; such that the first sides 280a, 280b, 288a, 288b of the first and second lower and upper shock plates 110a, 110b, 112a, 112b, respectively, face the second surface 131a of the first base plate 104a; and such that the first surfaces 118a, 118b of the first and second shock absorbers 116a, 116b, respectively, face the second surface 131a of the first base plate 104a.

Figure 31:
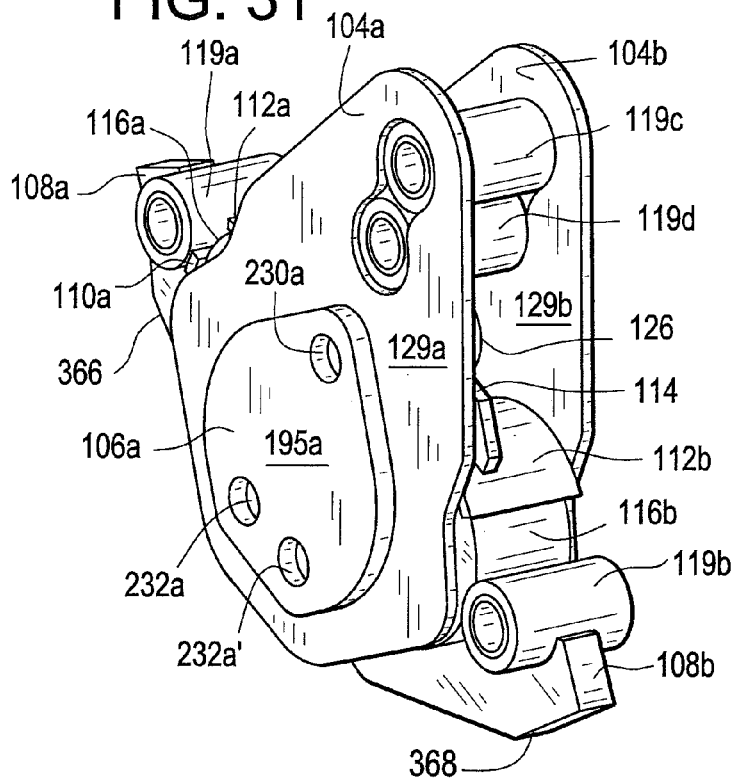

As illustrated in FIG. 31, the second surface 197a of the first secondary base plate 106a is positioned against the first surface 129a of the first base plate 104a such that the first aperture 230a of the first secondary base plate 106a is in alignment with the second aperture 188a of the first base plate 104a, the second aperture 232a of the first secondary base plate 106a is in alignment with the third aperture 190a of the first base plate 104a, and the third aperture 232a' of the first secondary base plate 106a is in alignment with the fourth aperture 192a of the first base plate 104a. The first secondary base plate 106a is fixedly secured to the first surface 129a of the first base plate 104a, preferably by welding.

Likewise, although not explicitly illustrated, the first surface 195b of the second secondary base plate 106b is positioned against the second surface 131b of the second base plate 104b such that the first aperture 230b of the second secondary base plate 106b is in alignment with the second aperture 188b of the second base plate 104b, the second aperture 232b of the second secondary base plate 106b is in alignment with the third aperture 190b of the second base plate 104b, and the third aperture 232b' of the second secondary base plate 106b is in alignment with the fourth aperture 190b' of the second base plate 104b. The second secondary base plate 106b is fixedly secured to the second surface 131b of the second base plate 104b, preferably by welding.

Figure 32:
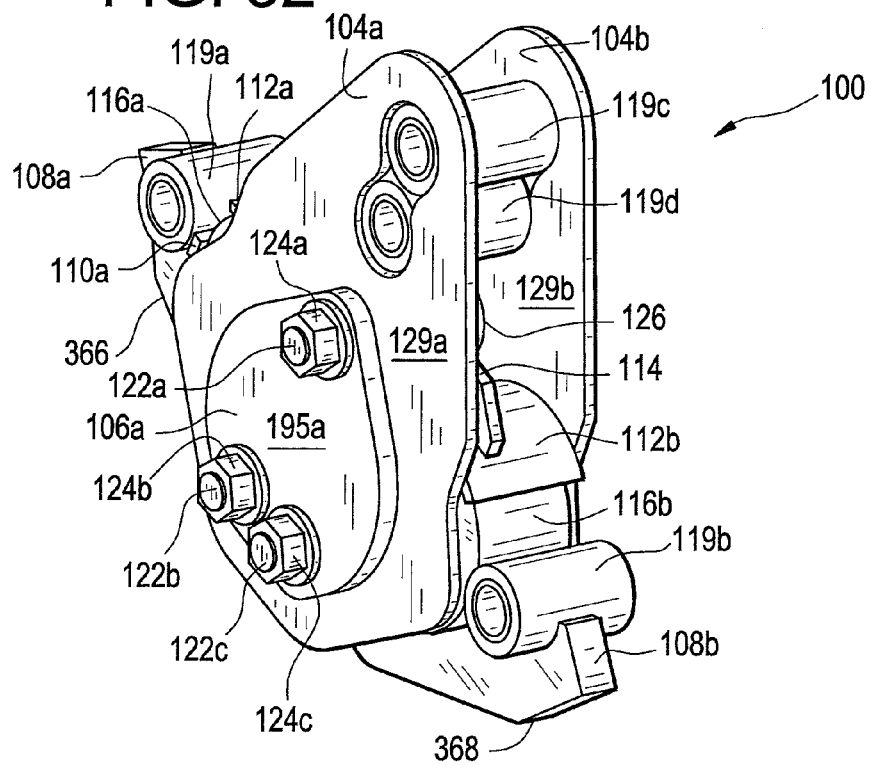
Figure 33:
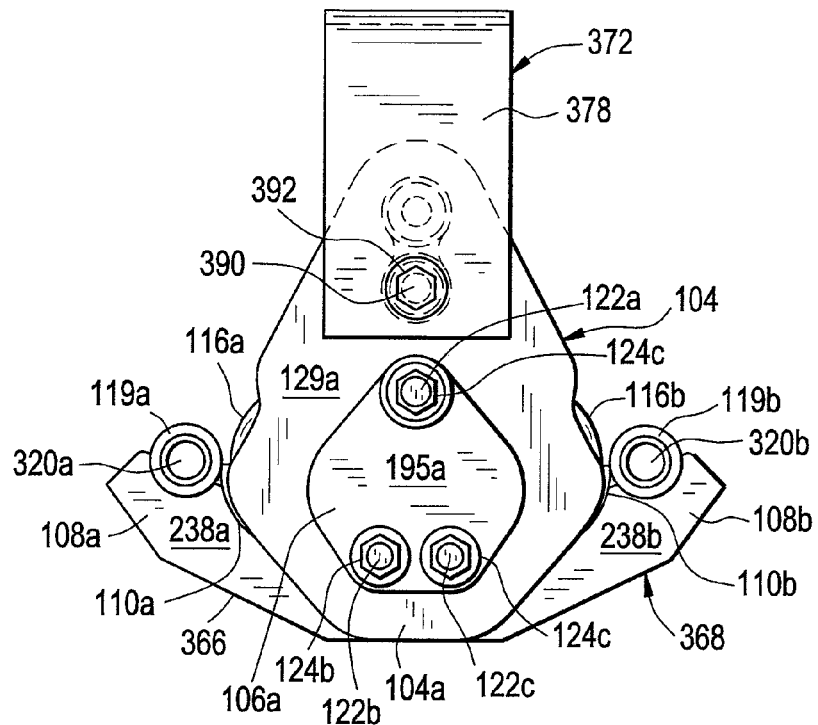
FIG. 33 is a front view of the first embodiment of the equalizer rotatably secured to a center frame hangar of a trailer about a first point of the equalizer.

As best illustrated in FIG. 32, the first fastening member 122a extends through the first aperture 230b of the second secondary base plate 106b, through the second aperture 188b of the second base plate 104b, through the aperture 360 of the shock spacer 126, through the second aperture 188a of the first base plate 104a, and through the first aperture 230a of the first secondary base plate 106a, such that the shoulder 348a of the first fastening member 122a abuts against the second surface 197b of the second secondary base plate 106b and at least a portion of the threaded, second shaft portion 344a of the first fastening member 122a extends beyond the first surface 195a of the first secondary base plate 106a. The first securing member 124a is threaded onto the threaded, second shaft portion 344a of the first fastening member 122a such that the washer member 352a is tightly positioned against the first surface 195a of the first secondary base plate 106a. The reinforcement plate assembly 370 is thus fixedly secured to the first base plate 104a by the first fastening and securing members 122a, 124a.

The second fastening member 122b extends through the second aperture 232b of the second secondary base plate 106b, through the third aperture 190b of the second base plate 104b, through the aperture 336a of the first lower pivot tube 120a, through the third aperture 190a of the first base plate 104a, and through the second aperture 232a of the first secondary base plate 106a, such that the shoulder 348b of the second fastening member 122b abuts against the second surface 197b of the second secondary base plate 106b and at least a portion of the threaded, second shaft portion 344b of the second fastening member 122b extends beyond the first surface 195a of the first secondary base plate 106a. The second securing member 124b is threaded onto the threaded, second shaft portion 344b of the second fastening member 122b such that the washer member 352b is tightly positioned against the first surface 195a of the first secondary base plate 106a.

The third fastening member 122c extends through the third aperture 232b' of the second secondary base plate 106b, through the fourth aperture 190b' of the second base plate 104b, through the aperture 336b of the second lower pivot tube 120b, through the fourth aperture 190a' of the first base plate 104a, and through the third aperture 232a' of the first secondary base plate 106a, such that the shoulder 348c of the third fastening member 122c abuts against the second surface 197b of the second secondary base plate 106b and at least a portion of the threaded, second shaft portion 344c of the third fastening member 122c extends beyond the first surface 195a of the first secondary base plate 106a. The third securing member 124c is threaded onto the threaded, second shaft portion 344c of the third fastening member 122c such that the washer member 352c is tightly positioned against the first surface 195a of the first secondary base plate 106a. The first equalizer arm assembly 366 is thus rotatably secured or pivotally mounted between the first and second base plates 104a, 104b by the second fastening and securing members 122b, 124b. The second equalizer arm assembly 368 is thus rotatably secured or pivotally mounted between the first and second base plates 104a, 104b by the third fastening and securing members 122c, 124c.

The equalizer 100 is thus provided as illustrated in FIG. 32.

As illustrated in FIGS. 2, 33, 35 and 36, the equalizer 100 is secured to a center frame hangar 372 which depends from a frame 374 of a trailer (not shown). The center frame hangar 372 is generally U-shaped such that it has a base portion 376 and first and second portions 378, 380 which extend downwardly from opposite ends of the base portion 376. The base portion 376 is fixedly secured to the frame 374 of the trailer by known means, such as welding. The first extending portion 378 has an aperture 382 extending therethrough proximate to a free end 384. The second extending portion 380 has an aperture 386 extending therethrough proximate to a free end 388. The apertures 382, 386 are in alignment with one another and the free ends 384, 388 are preferably planar.

As illustrated in FIGS. 2, 33 and 35-38, the first and second base plates 104a, 104b are positioned between the first and second extending portions 378, 380 of the center frame hangar 372 such that the first surface 129a of the first base plate 104a faces the first extending portion 378, and the second surface 131b of the second base plate 104b faces the second extending portion 380. The second portion 184a of the first aperture 180a of the first base plate 104a is in alignment with the aperture 382 of the first extending portion 378 of the center frame hangar 372. Likewise, the second portion 184b of the first aperture 180b of the second base plate 104b is in alignment with the aperture 386 of the second extending portion 380 of the center frame hangar 372. A fastening member 390, which may be identical to or different from the fastening members 122a, 122b, 122c can be inserted through the aperture 386 of the second extending portion 380 of the center frame hangar 372, through the second portion 184b of the first aperture 180b of the second base plate 104b, through the aperture 320d of the fourth upper pivot tube 119d, through the second portion 184a of the first aperture 180a of the first base plate 104a, and through the aperture 382 of the first extending portion 378 of the center frame hangar 372. A securing member 392, which may be identical to or different from the fastening members 124a, 124b, 124c can then be secured to the fastening member 390 such that the equalizer 100 is rotatably secured or pivotally mounted between the first and second extending portions 378, 380 of the center frame hangar 372 by the fastening and securing members 390, 392.

Figure 34:
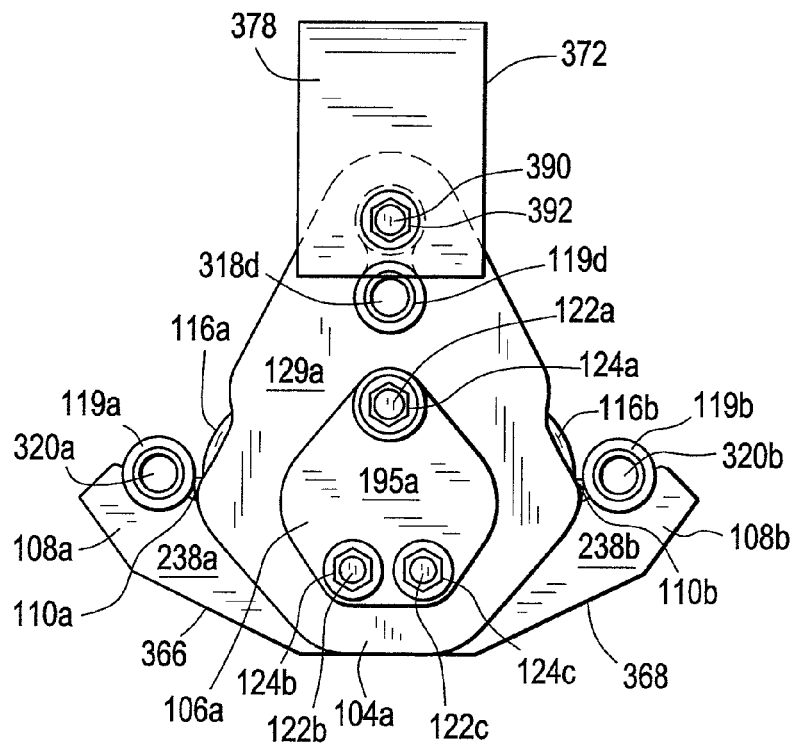
FIG. 34 is a front view of the first embodiment of the equalizer rotatably secured to the center frame hangar of the trailer about a second point of the equalizer.
Figure 35:
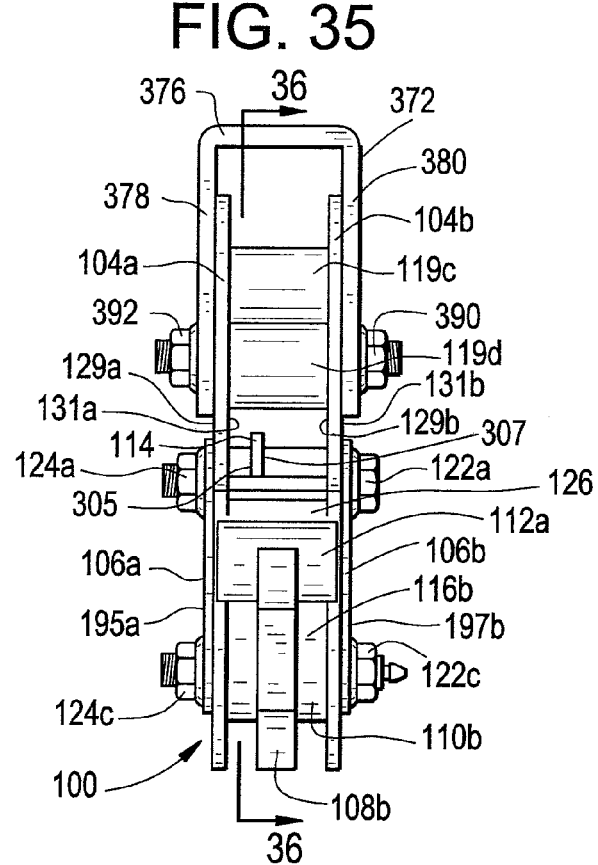
FIG. 35 is a side view of the first embodiment of the equalizer rotatably secured to the center frame hangar as illustrated in FIG. 33.
Figure 36:
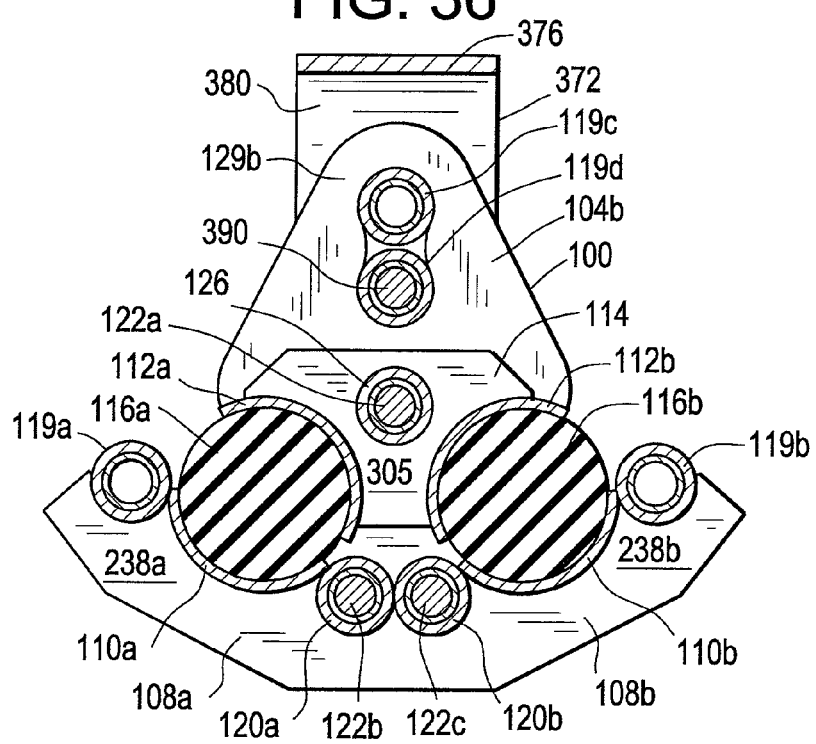
FIG. 36 is a cross-sectional view of the first embodiment of the equalizer rotatably secured to the center frame hangar taken along line 36-36 of FIG. 35.

It should be noted that, alternatively, the equalizer 100 can also be rotatably secured or pivotally mounted between the first and second extending portions 378, 380 of the center frame hangar 372 by the fastening and securing members 390, 392, as illustrated in FIG. 34. In FIG. 34, the first portion 182a of the first aperture 180a of the first base plate 104a is in alignment with the aperture 382 of the first extending portion 378 of the center frame hangar 372 and the first portion 182b of the first aperture 180b of the second base plate 104b is in alignment with the aperture 386 of the second extending portion 380 of the center frame hangar 372. As such, the fastening member 390 can be inserted through the aperture 386 of the second extending portion 380 of the center frame hangar 372, through the first portion 182b of the first aperture 180b of the second base plate 104b, through the aperture 320c of the third upper pivot tube 119c, through the first portion 182a of the first aperture 180a of the first base plate 104a, and through the aperture 382 of the first extending portion 378 of the center frame hangar 372. The securing member 392 can then be secured to the fastening member 390.

Thus, the configuration of the equalizer 100 allows for two different connections to the center frame hangar 372 of the frame 374 of the trailer depending on the desired position of the equalizer 100 relative to the frame 374 of the trailer.

As illustrated in FIG. 2, the suspension system 102 includes the equalizer 100, a front leaf spring 394, a rear leaf spring 396, a front shackle or link 398 and a rear shackle or link 400. As discussed above, the equalizer 100 is rotatably secured or pivotally mounted to the center frame hangar 372 of the frame 374 of the trailer, illustrated at a point J in FIG. 2. A first end 402 of the front shackle 398 is rotatably secured or pivotally mounted to the first equalizer arm assembly 366, at a point K. The first end 402 of the front shackle 398 is rotatably secured or pivotally mounted to the first equalizer arm assembly 366 by a fastening member and a securing member. The fastening member extends through apertures of the front shackle 398 and the aperture 320a of the first upper pivot tube 119a. A first end 404 of the rear shackle 400 is rotatably secured or pivotally mounted to the second equalizer arm assembly 368, at a point L. The first end 404 of the rear shackle 400 is rotatably secured or pivotally mounted to the second equalizer arm assembly 368 by a fastening member and a securing member. The fastening member extends through apertures of the rear shackle 400 and the aperture 320b of the second upper pivot tube 119b. The fastening members may be identical to or different from the fastening members 122a, 122b, 122c. The securing members may be identical to or different from the securing members 124a, 124b, 124c.

A second end 406 of the front shackle 398 is rotatably secured or pivotally mounted to a rear end 408 of the front leaf spring 394 at a point M. A front end 410 of the front leaf spring 394 is attached to a front frame hangar 411 of the frame 374 at a point N, as illustrated in FIG. 2, or can be directly attached to the frame 374 itself, depending on the configuration of the frame 374.

A second end 412 of the rear shackle 400 is rotatably secured or pivotally mounted to a front end 414 of the rear leaf spring 396 at a point P. A rear end 416 of the rear leaf spring 396 is attached to a rear frame hangar 417 of the frame 374 at a point Q, as illustrated in FIG. 2, or can be directly attached to the frame 374 itself, depending on the configuration of the frame 374.

A front axle 418 of the trailer is positioned on the forward leaf spring 394 generally equidistantly between point M and point N. A rear axle 420 is positioned on the rear leaf spring 396 generally equidistantly between point P and point Q.

It is to be understood that while only a single suspension system 102 is illustrated and described, it is typical to have one suspension system 102 provided on both a left and a right side of a trailer. If more than two axles are provided on the trailer, it is to be understood that two or more suspension systems 102 can be provided on both a left and a right side of the trailer.

Like the prior art suspension system 20 including the equalizer 22 illustrated in FIG. 1, to the extent possible, road shock and vibrations from tires (not shown) of the trailer, utilizing the suspension system 102 including the equalizer 100 of the present invention, are transferred to the front and rear axles 418, 420, and are absorbed by the front and rear leaf springs 394, 396, respectively. Points J, N and Q are the contact points through which the road shock is passed to the frame 374. The equalizer 100 is included in the suspension system 102 in order to equalize the weight on both the front and rear axles 418, 420 as the tires pass over uneven terrain. For example, an upward motion of the front leaf spring 394 results in a downward motion of the rear leaf spring 396.

Figure 37:
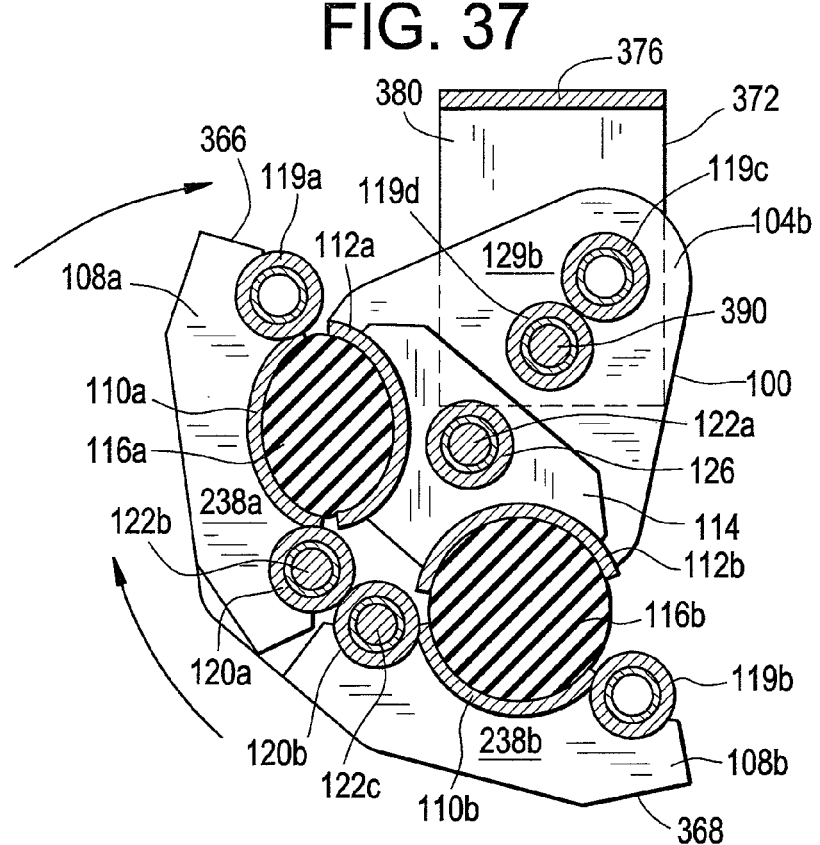
FIG. 37 is a cross-sectional view of the first embodiment of the equalizer being rotated upwardly and to the left, relative to the position of the equalizer shown in FIG. 36, where a shock absorber is being deformed in order to absorb or dampen harsh shocks or vibrations coming off of a rear end of a front leaf spring of the suspension system.
Figure 38:
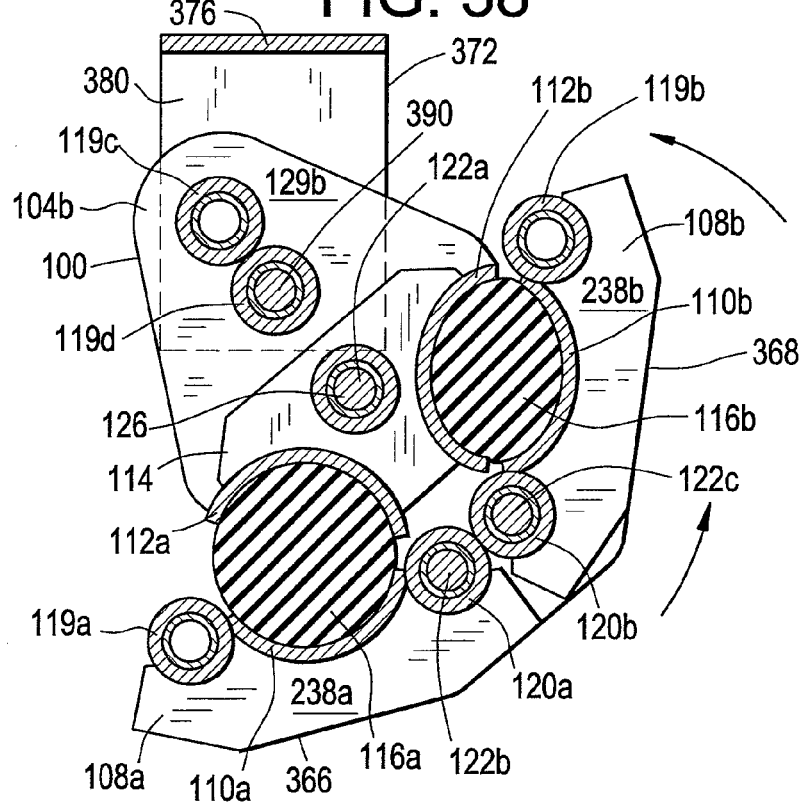
FIG. 38 is a cross-sectional view of the first embodiment of the equalizer being rotated upwardly and to the right, relative to the position of the equalizer shown in FIG. 36, where a shock absorber is being deformed in order to absorb or dampen harsh shocks or vibrations coming off of a front end of a rear leaf spring of the suspension system.

As illustrated in FIGS. 37 and 38, the equalizer 100, unlike the equalizer 22 of the prior art, is configured to dampen or absorb the harsh shocks or vibrations coming off the rear end 408 of the front leaf spring 394 and the front end 414 of the rear leaf spring 396 proximate to the center frame hangar 372, thereby allowing for a "softer" ride.

When the front leaf spring 394 moves upward, the equalizer 100 rotates upwardly and to the left relative to the center hangar 372 about point J, as illustrated in FIG. 37, such that the rear leaf spring 396 moves downward, thus equalizing the weight on both the front and rear axles 418, 420. Further, when the front leaf spring 394 moves upward, the first equalizer arm assembly 366 rotates or pivots upwardly between the first and second base plates 104a, 104b by the second fastening and securing members 122b, 124b about a point R. As the first equalizer arm assembly 366 rotates or pivots upwardly, the first lower shock plate 110a of the first equalizer arm assembly 366 is forced against a portion of the outer surface 117a of the first shock absorber 116a, thus forcing another portion of the outer surface 117a against the first upper shock plate 112a. Under this force, the first shock absorber 116a deforms between the first lower and upper shock plates 110a, 112a, such that the first ends 274a, 282a of the first lower and upper shock plates 110a, 112a move toward one another and, such that the second ends 276a, 284a of the first lower and upper shock plates 110a, 112a move toward one another. Upon deformation, the first shock absorber 116a absorbs or dampens the harsh shocks or vibrations coming off the rear end 408 of the front leaf spring 394, which would otherwise be transferred through the equalizer to the center frame hangar 372 and, thus, to the frame 374 of the trailer. Therefore, a "softer" ride is achieved by the suspension system 102 including the equalizer 100 of the present invention.

Likewise, when the rear leaf spring 396 moves upward, the equalizer 100 rotates upwardly and to the right relative to the center hangar 372 about point J, as illustrated in FIG. 38, such that the front leaf spring 394 moves downward, thus equalizing the weight on both the front and rear axles 418, 420. Further, when the rear leaf spring 396 moves upward, the second equalizer arm assembly 368 rotates or pivots upwardly between the first and second base plates 104a, 104b by the third fastening and securing members 122c, 124c about a point S. As the second equalizer arm assembly 368 rotates or pivots upwardly, the second lower shock plate 110b of the second equalizer arm assembly 368 is forced against a portion of the outer surface 117b of the second shock absorber 116b, thus forcing another portion of the outer surface 117b against the second upper shock plate 112b. Under this force, the second shock absorber 116b deforms between the second lower and upper shock plates 110b, 112b, such that the first ends 274b, 282b of the second lower and upper shock plates 110b, 112b move toward one another and, such that the second ends 276b, 284b of the second lower and upper shock plates 110b, 112b move toward one another. Upon deformation, the second shock absorber 116b absorbs or dampens the harsh shocks or vibrations coming off the front end 414 of the rear leaf spring 396, which would otherwise be transferred through the equalizer to the center frame hangar 372 and, thus, to the frame 374 of the trailer. Therefore, a "softer" ride is achieved by the suspension system 102 including the equalizer 100 of the present invention.

Figure 39:
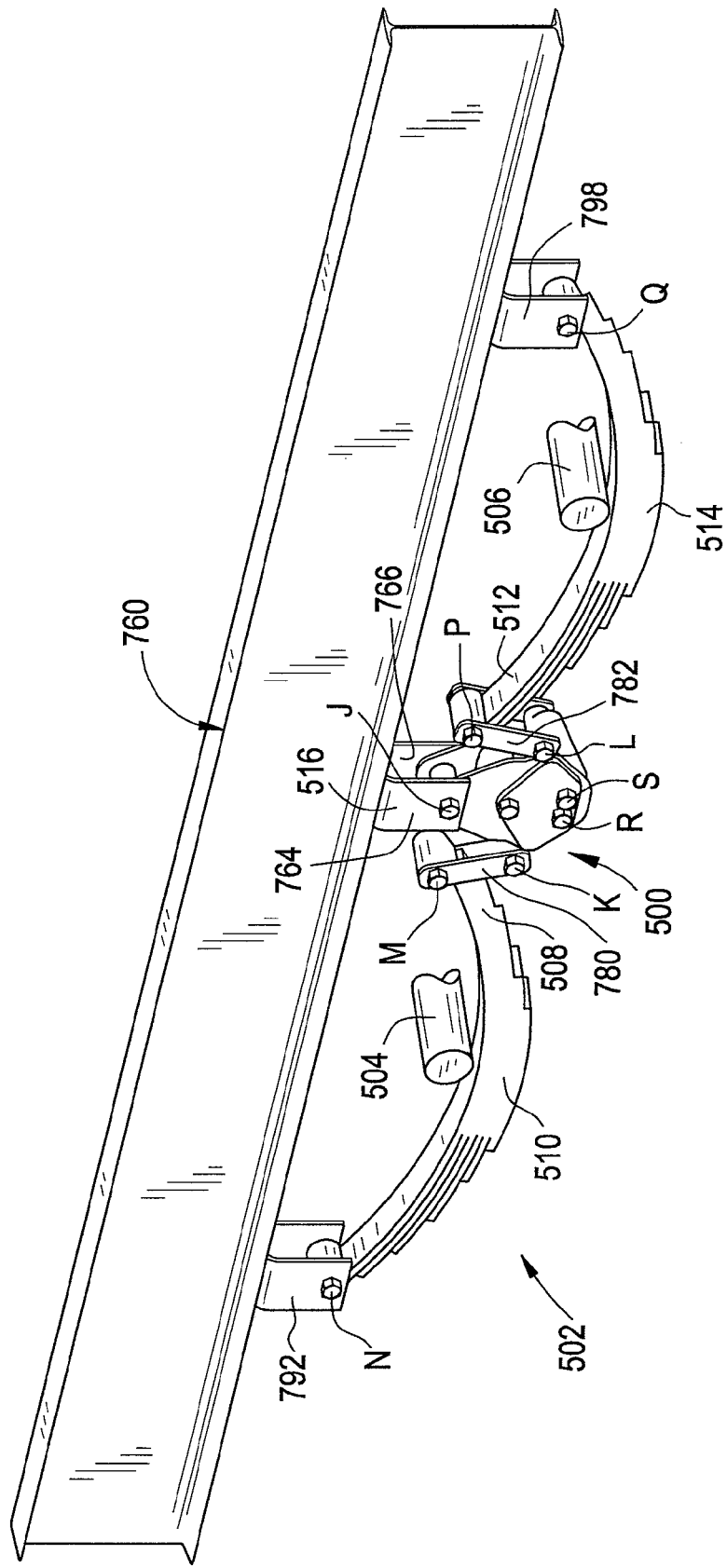
FIG. 39 is a view of a second embodiment of an equalizer which incorporates the features of the present invention incorporated into a suspension system which is mounted on a frame of a trailer.
Figure 40:
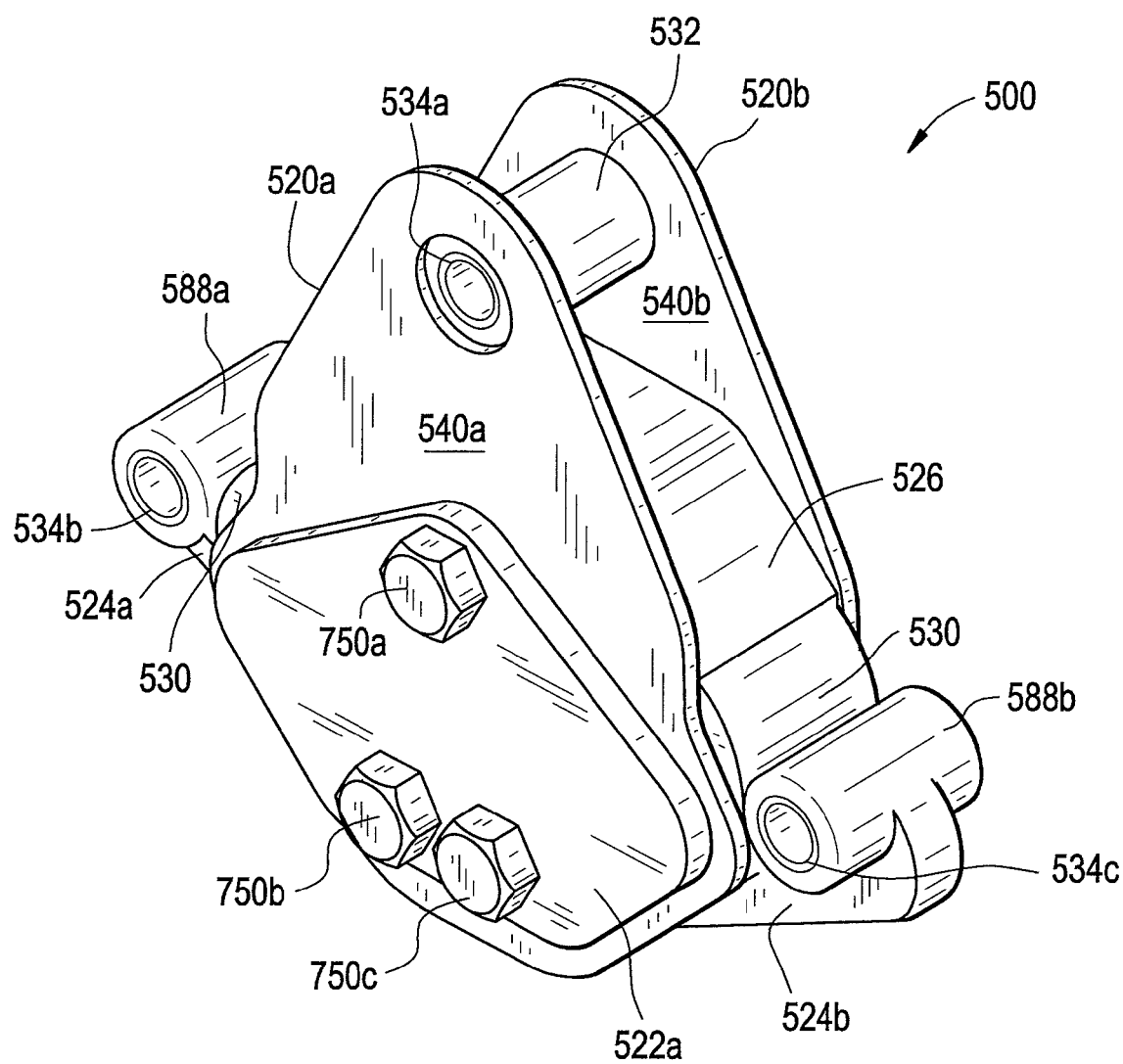
FIG. 40 is a perspective view of the second embodiment of the equalizer which incorporates the features of the present invention.
Figure 44:
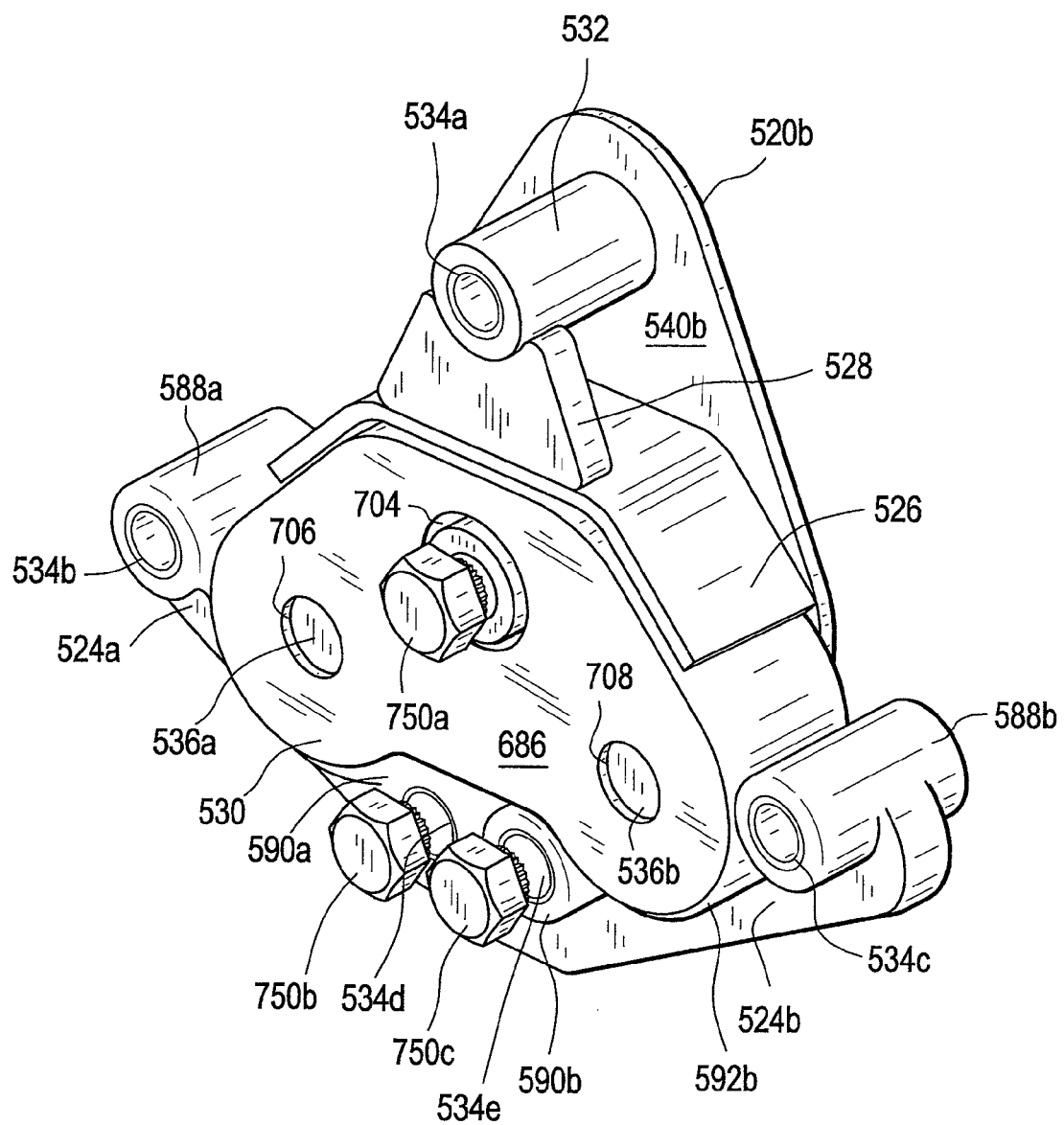
FIG. 44 is a perspective view of the equalizer of FIG. 41 with a first base plate and a first secondary base plate removed therefrom.

Attention is directed to the second embodiment of an equalizer 500 shown in FIGS. 39-76. The equalizer 500 is provided for use in a suspension system 502, as illustrated in FIG. 39, to equalize the weight on both the front and rear axles 504, 506 as the tires pass over uneven terrain (as does the equalizer 22 of the prior art suspension system 20), as well as to dampen or absorb the harsh shocks or vibrations coming off a rear end 508 of a front leaf spring 510 on which the front axle 504 is positioned and a front end 512 of a rear leaf spring 514 on which the rear axle 506 is positioned, proximate to the center frame hangar 516, thus allowing for a "softer" ride. As best illustrated in FIGS. 39-44, the equalizer 500 includes first and second base plates 520a, 520b, first and second secondary base plates 522a, 522b, first and second equalizer arm castings 524a, 524b, an upper shock plate 526, a reinforcement plate 528, a shock absorber 530, an upper pivot tube 532, first, second, third, fourth and fifth bushings 534a, 534b, 534c, 534d, 534e, first and second plug members 536a, 536b, and a plastic spacer 538. It should be noted that the configuration of each of these members as shown and described is a preferred configuration of same such that the members could be configured in any other suitable manner.

The first base plate 520a is preferably identical in shape and configuration to the second base plate 520b and, as such, only the first base plate 520a is described with the understanding that the description of the second base plate 520b would be identical. The elements of the first base plate 520a will have reference numerals ending in "a". As such, it is to be understood that the elements of the second base plate 520b will have like reference numerals ending in "b".

Figure 45:
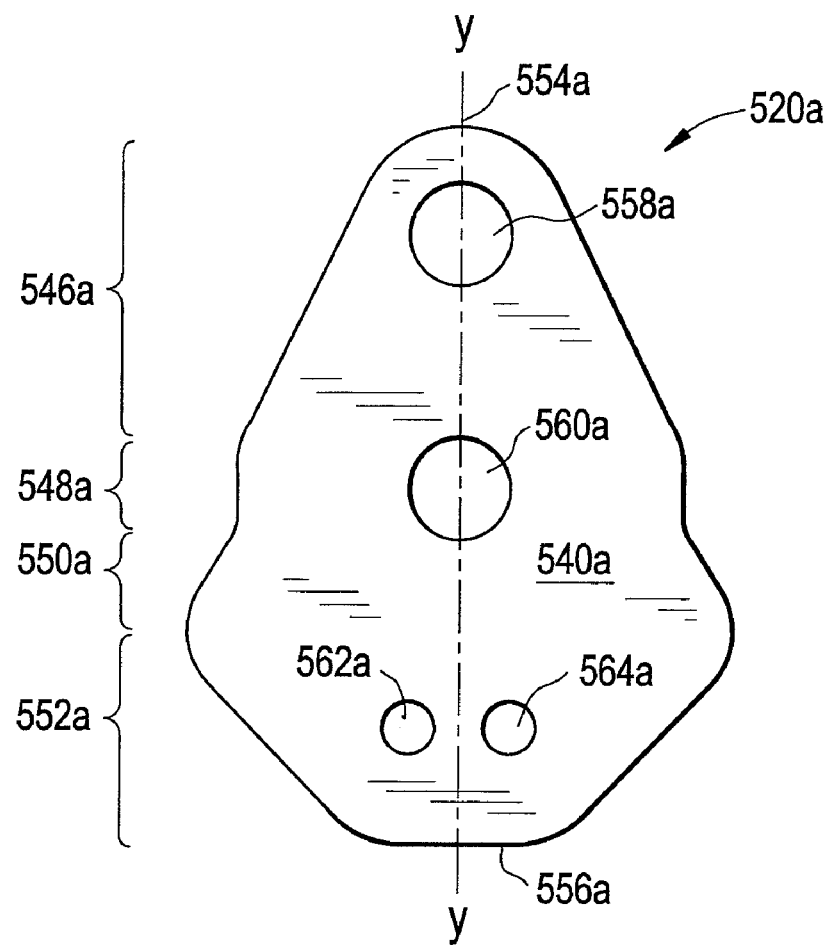
FIG. 45 is a front view of a base plate of the equalizer illustrated in FIG. 40.
Figure 46:
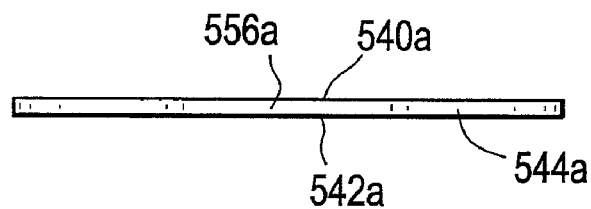
FIG. 46 is a bottom view of the base plate illustrated in FIG. 45.

FIGS. 45 and 46 illustrate the first base plate 520a, which is preferably formed of a forged, cast or fabricated metal. The first base plate 520a has a first planar surface 540a, a second planar surface 542a, and an edge 544a which defines a perimeter of the first base plate 520a. The first base plate 520a generally has first, second, third and fourth portions 546a, 548a, 550a, 552a.

The first portion 546a of the first base plate 520a is generally triangular in configuration such that the edge 544a extends angularly downwardly and outwardly from a top 554a of the first base plate 520a. The edge 544a at the top 554a of the first portion 546a is generally rounded.

The second portion 548a of the first base plate 520a is generally rectangular in configuration such that the edge 544a extends downwardly from the first portion 546a to the third portion 550a. The edge 544a at the connection of the first and second portions 546a, 548a is generally rounded.

The third portion 550a of the first base plate 520a is generally trapezoidal in configuration such that the edge 544a extends angularly downwardly and outwardly from the second portion 548a to the fourth portion 552a. The edge 544a at the connection of the second and third portions 548a, 550a is generally rounded.

The fourth portion 552a of the first base plate 520a is generally trapezoidal in configuration such that the edge 544a extends angularly downwardly and inwardly from the third portion 550a to a flat bottom 556a of the first base plate 520a. The edge 544a at the connection of the third and fourth portions 550a, 552a is generally rounded and the edge 544a at the connection of the fourth portion 552a to the flat bottom 556a is generally rounded.

A center reference line Y is provided in FIG. 45. The first portion 546a of the first base plate 520a has an aperture 558a extending therethrough proximate to the top 554a of the first base plate 520a The aperture 558a is generally bisected by the center reference line Y. The second portion 548a of the first base plate 520a has an aperture 560a extending therethrough which is generally bisected by the center reference line Y. The fourth portion 552a of the first base plate 520a has two apertures 562a, 564a extending therethrough which are planar to one another. Aperture 562a is provided a predetermined distance to the left from the center reference line Y, and aperture 564a is provided a predetermined distance to the right from the center reference line Y. Each of the apertures 558a, 560a, 562a, 564a are preferably circular/cylindrical. Apertures 558a, 560a preferably have identical diameters and apertures 562a, 564a preferably have identical diameters, with the diameters of the apertures 558a, 560a preferably being larger than the diameters of the apertures 562a, 564a.

The first secondary base plate 522a is preferably identical in shape and configuration to the second secondary base plate 522b and, as such, only the first secondary base plate 522a is described with the understanding that the description of the second secondary base plate 522b would be identical. The elements of the first secondary base plate 522a will have reference numerals ending in "a". As such, it is to be understood that the elements of the second secondary base plate 522b will have like reference numerals ending in "b".

Figure 47:
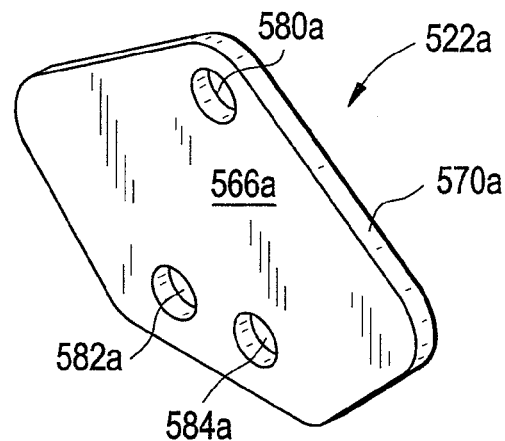
FIG. 47 is a perspective view of a secondary base plate of the equalizer illustrated in FIG. 40.
Figure 48:
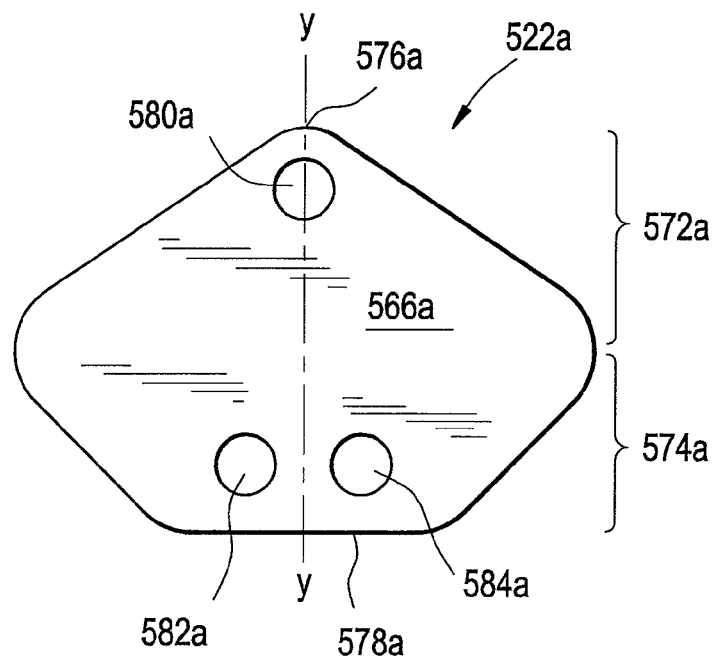
FIG. 48 is a front view of the secondary base plate illustrated in FIG. 47.
Figure 49:
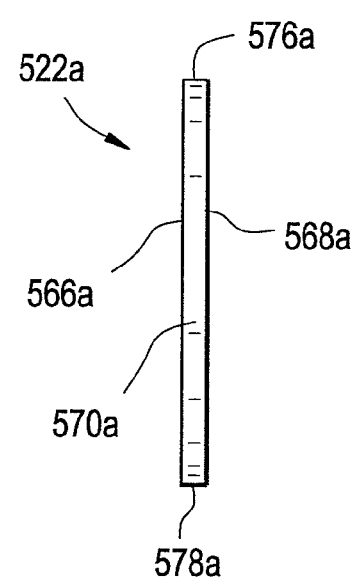
FIG. 49 is a side view of the secondary base plate illustrated in FIG. 47.

FIGS. 47-49 illustrate the first secondary base plate 522a, which is preferably formed of a forged, cast or fabricated metal. The first secondary base plate 522a has a first planar surface 566a, a second planar surface 568a, and an edge 570a which defines a perimeter of the first secondary base plate 522a. The first secondary base plate 522a generally has first and second portions 572a, 574a.

The first portion 572a of the first secondary base plate 522a is generally triangular in configuration such that the edge 570a extends angularly downwardly and outwardly from a top 576a of the first secondary base plate 522a. The edge 570a at the top 576a of the first portion 572a is generally rounded.

The second portion 574a of the first secondary base plate 522a is generally trapezoidal in configuration such that the edge 570a extends angularly downwardly and inwardly from the first portion 572a to a flat bottom 578a of the first secondary base plate 522a. The edge 570a at the connection of the first and second portions 572a, 574a is generally rounded and the edge 570a at the connection of the second portion 574a to the flat bottom 578a is generally rounded.

A center reference line Y is provided in FIG. 48. The first portion 572a of the first secondary base plate 522a has an aperture 580a extending therethrough proximate to the top 576a of the first secondary base plate 522a. The aperture 580a is generally bisected by the center reference line Y. The second portion 574a of the first secondary base plate 522a has two apertures 582a, 584a extending therethrough proximate to the flat bottom 578a of the first secondary base plate 522a which are planar to one another. Aperture 582a is provided a predetermined distance to the left from the center reference line Y, and aperture 584a is provided a predetermined distance to the right from the center reference line Y. Each of the apertures 580a, 582a, 584a are preferably circular/cylindrical. Each of the apertures 580a, 582a, 584a preferably have identical diameters, which are identical to the diameters of the apertures 562a, 564a of the first base plate 520a.

The first equalizer arm casting 524a is preferably identical in shape and configuration to the second equalizer arm casting 524b and, as such, only the first equalizer arm casting 524a is described with the understanding that the description of the second equalizer arm casting 524b would be identical. The elements of the first equalizer arm casting 524a will have reference numerals ending in "a". As such, it is to be understood that the elements of the second equalizer arm casting 524b will have like reference numerals ending in "b".

FIGS. 50-53 illustrate the first equalizer arm casting 524a, which is preferably formed of a forged, cast or fabricated metal. The first equalizer arm casting 524a has an equalizer arm 586a, an outer pivot tube 588a, an inner pivot tube 590a, and a lower shock plate 592a, which are all preferably integrally formed.

The equalizer arm 586a is an elongated member having a first planar surface 594a, a second planar surface 596a, and an edge 598a which defines a perimeter of the equalizer arm 586a. As viewed in FIG. 51, the edge 598a has a flat bottom 600a, an outer side 602a, a top 604a, and an inner side 606a, all of which are defined by the edge 598a. The outer side 602a curves upwardly and outwardly from the flat bottom 600a and then curves upwardly and inwardly to the top 604a. The inner side 606a has a first portion 607a which extends angularly upwardly and outwardly from the flat bottom 600a and then a second portion 609a which extends angularly upwardly and inwardly to the top 604a. From the outer side 602a, the top 604a has, in series, an outer concave portion 608a, an outer convex portion 610a, a middle concave portion 612a, an inner convex portion 614a, and an inner concave portion 616a which extends to the inner side 606a of the edge 598a.

The outer pivot tube 588a is a cylindrical member having an aperture 618a extending entirely therethrough such that inner and outer surfaces 620a, 622a of the outer pivot tube 588a are defined. The outer pivot tube 588a extends from a first end 624a thereof to a second end 626a thereof. The inner surface 620a of the outer pivot tube 588a at each of the first and second ends 624a, 626a is preferably chamfered. The outer pivot tube 588a is configured to be positioned on/within and secured to the outer concave portion 610a of the equalizer arm 586a. The diameter of the outer surface 622a of the outer pivot tube 588a is commensurate with that at which the outer concave portion 610a is curved. The first end 624a of the outer pivot tube 588a extends a predetermined distance beyond the first planar surface 594a of the equalizer arm 586a and the second end 626a of the outer pivot tube 588a likewise extends the same predetermined distance beyond the second planar surface 596a of the equalizer arm 586a.

The inner pivot tube 590a is a cylindrical member having an aperture 628a extending entirely therethrough such that inner and outer surfaces 630a, 632a of the inner pivot tube 590a are defined. A diameter of the aperture 628a is preferably identical to the diameter of the aperture 618a of the outer pivot tube 588a, which is also preferably larger than the diameters of the apertures 562a, 564a of the first base plate 520a and the apertures 580a, 582a, 584a of the first secondary base plate 522a. The inner pivot tube 590a extends from a first end 634a thereof to a second end 636a thereof. The inner surface 630a of the inner pivot tube 590a at each of the first and second ends 634a, 636a is preferably chamfered. The inner pivot tube 590a is configured to be positioned on/within and secured to the inner concave portion 616a of the equalizer arm 586a. The diameter of the outer surface 632a of the inner pivot tube 590a is commensurate with that at which the inner concave portion 616a is curved. The first end 634a of the inner pivot tube 590a extends a predetermined distance beyond the first planar surface 594a of the equalizer arm 586a and the second end 636a of the inner pivot tube 590a likewise extends the same predetermined distance beyond the second planar surface 596a of the equalizer arm 586a. The distance between the first and second ends 634a, 636a of the inner pivot tube 590a is preferably less than a distance between the first and second ends 624a, 626a of the outer pivot tube 588a.

The lower shock plate 592a is a thin plate which has first and second ends 638a, 640a, inner and outer ends 642a, 644a, and top and bottom surfaces 646a, 648a. The lower shock plate 592a is curved in a concave manner from the inner end 642a thereof to the outer end 644a thereof. The lower shock plate 592a is configured to have the bottom surface 648a thereof be positioned on/within and secured to the middle concave portion 612a of the equalizer arm 586a. The curving of the bottom surface 648a of the lower shock plate 592a is generally commensurate with that at which the middle concave portion 612a is curved. The first end 638a of the lower shock plate 592a extends a predetermined distance beyond the first planar surface 594a of the equalizer arm 586a and the second end 640a of the lower shock plate 592a likewise extends the same predetermined distance beyond the second planar surface 596a of the equalizer arm 586a. The distance between the first and second ends 638a, 640a of the lower shock plate 592a is preferably identical to the distance between the first and second ends 634a, 636a of the inner pivot tube 590a. The outer end 644a of the lower shock plate 592a is configured to connect to the outer surface 622a of the outer pivot tube 588a, and to bend around the outer convex portion 610a of the top 604a of the equalizer arm 586a. The inner end 642a of the lower shock plate 592a is configured to connect to the outer surface 632a of the inner pivot tube 590a, and to bend around the inner convex portion 614a of the top 604a of the equalizer arm 586a.

Figure 54:
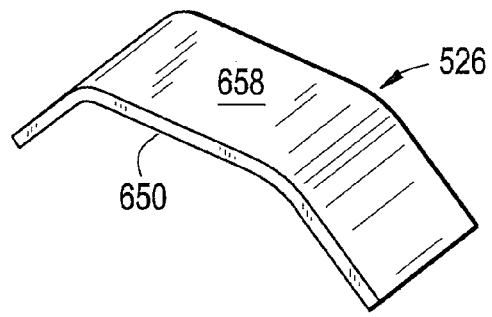
FIG. 54 is a perspective view of an upper shock plate of the equalizer illustrated in FIG. 40.
Figure 55:
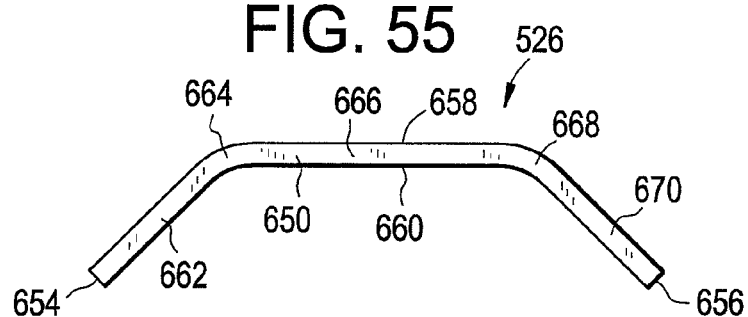
FIG. 55 is a front view of the upper shock plate illustrated in FIG. 54.
Figure 56:
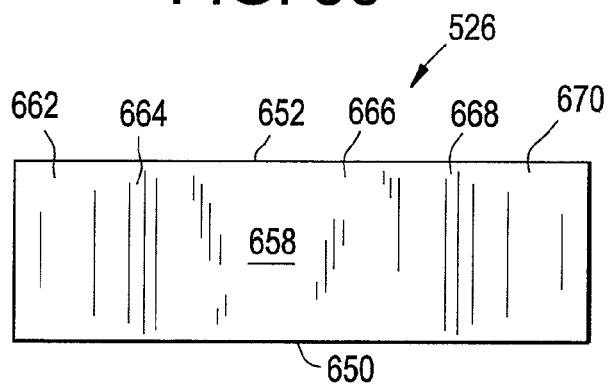
FIG. 56 is a top view of the upper shock plate illustrated in FIG. 54.

FIGS. 54-56 illustrate the upper shock plate 526, which is preferably formed of a forged, cast or fabricated metal. The upper shock plate 526 is a thin plate which has first and second side ends 650, 652, first and second outer ends 654, 656, and top and bottom surfaces 658, 660. The upper shock plate 526 has, from the first outer end 654 to the second outer end 656, in series, a first outer straight portion 662, a first curved portion 664, a middle straight portion 666, a second curved portion 668, and a second outer straight portion 670. The first and second curved portions 664, 668 are curved downwardly and outwardly from the ends of the middle straight portion 666. The first outer straight portion 662 extends downwardly and outwardly from the first curved portion 664, such that it is at an angle relative to the middle straight portion 666. The second outer straight portion 670 extends downwardly and outwardly from the second curved portion 668, such that it is at an angle relative to the middle straight portion 666, and such that it is generally perpendicular to the first outer straight portion 662.

Figure 57:
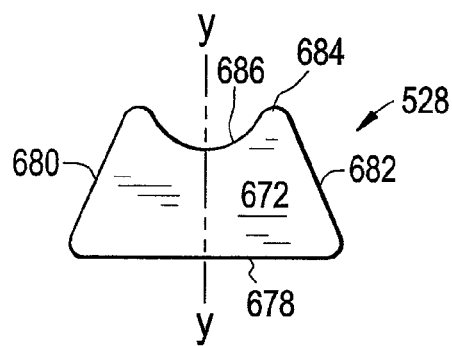
FIG. 57 is a front view of a reinforcement plate of the equalizer illustrated in FIG. 40.
Figure 58:
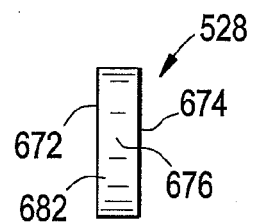
FIG. 58 is a side view of the reinforcement plate illustrated in FIG. 57.

FIGS. 57 and 58 illustrate the reinforcement plate 528, which is preferably formed of a forged, cast or fabricated metal. The reinforcement plate 528 has a first planar surface 672, a second planar surface 674, and an edge 676 which defines a perimeter of the reinforcement plate 528.

The reinforcement plate 528 is generally trapezoidal in configuration such that the edge 676 includes a flat bottom 678, first and second sides 680, 682, and a top 684. The first and second sides 680, 682 are angled upwardly and inwardly from the ends of the flat bottom 678 to the top 684. The edge 676 at the connection of the first and second sides 680, 682 to the flat bottom 678 is generally rounded. The edge 676 at the connection of the first and second sides 680, 682 to the top 684 is also generally rounded. The top 684 has a concave portion 686 formed therein which extends from proximate the connection of the first side 680 to the top 684 to proximate the connection of the second side 682 to the top 684.

Figure 59:
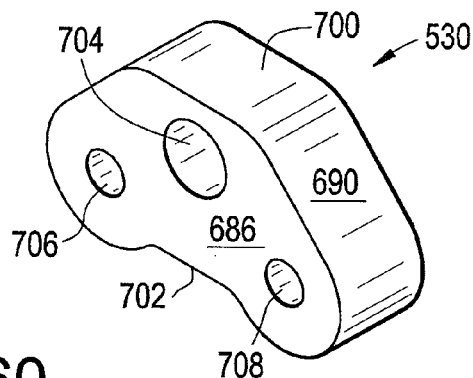
FIG. 59 is a perspective view of a shock absorber of the equalizer illustrated in FIG. 40.
Figure 60:
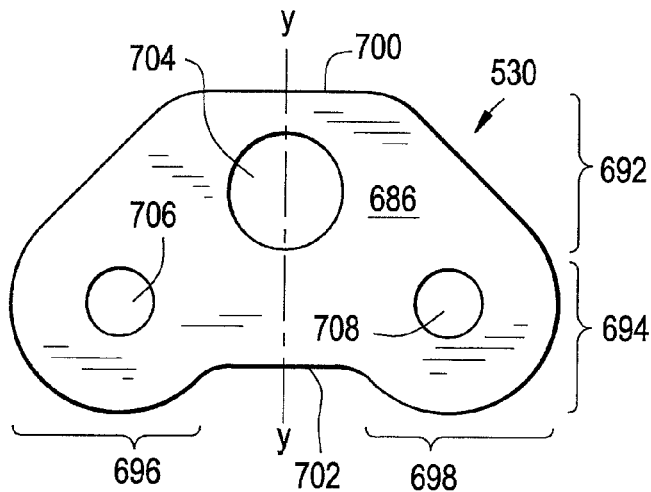
FIG. 60 is a front view of the shock absorber illustrated in FIG. 59.
Figure 61:
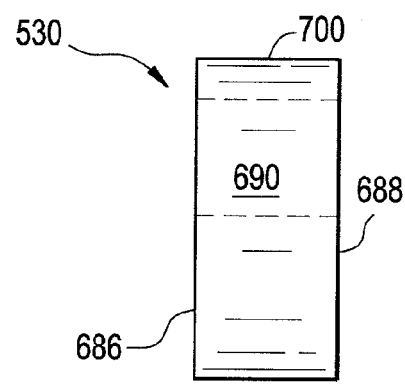
FIG. 61 is a side view of the shock absorber illustrated in FIG. 59.

FIGS. 59-61 illustrate the shock absorber 530, which is preferably formed of an elastomeric material, such as rubber, and preferably TORSILASTIC® rubber. The shock absorber 530 has a first planar surface 686, a second planar surface 688, and an edge 690 which defines a perimeter of the shock absorber 530. The shock absorber 530 generally has first, second, third and fourth portions 692, 694, 696, 698.

The first portion 692 of the shock absorber 530 is generally trapezoidal in configuration such that the edge 690 extends angularly downwardly and outwardly from a flat top 700 of the shock absorber 530. The edge 690 at the connection to the flat top 700 is generally rounded.

The second portion 694 of the shock absorber 530 is generally rectangular in configuration and is positioned below the first portion 692 of the shock absorber 530, and extends to a flat bottom 702 of the shock absorber 530, although the edge 690 is rounded or arced from the first portion 692 to the flat bottom 702.

The third and fourth portions 696, 698 of the shock absorber 530 are generally configured as segments of a circle. The third portion 696 is positioned below the flat bottom 702 at the left side of the shock absorber 530 and extends inwardly, and the fourth portion 698 is positioned below the flat bottom 702 at the right side of the shock absorber 530 and extends inwardly, such that the flat bottom 702 of the shock absorber 530 is visibly provided between the third and fourth portions 696, 698. The edge 690 on the third and fourth portions 696, 698 is generally continuously curved from the curve of the edge 690 provided on the second portion 694.

The shock absorber 530 is thus generally formed in the shape of an upside-down heart.

A center reference line Y is provided in FIG. 60. The first portion 692 of the shock absorber 530 has an aperture 704 extending therethrough which is generally bisected by the center reference line Y. The second portion 694 of the shock absorber 530 has two apertures 706, 708 extending therethrough which are planar to one another. Aperture 706 is provided at a predetermined distance to the left from the center reference line Y, and is preferably centered over the third portion 696 of the shock absorber 530. Aperture 708 is provided at a predetermined distance to the right from the center reference line Y, and is preferably centered over the fourth portion 698 of the shock absorber 530. Each of the apertures 704, 706, 708 are preferably circular/cylindrical. Apertures 706, 708 preferably have identical diameters, with a diameter of the aperture 704 being larger than the diameters of the apertures 706, 708. The diameter of the aperture 704 is preferably larger than the diameter of the aperture 560a provided through the second portion 548a of the first base plate 520a.

Figure 71:
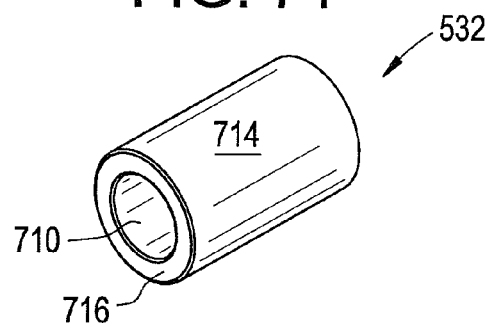
FIG. 71 is a perspective view of an upper pivot tube of the equalizer illustrated in FIG. 40.
Figure 72:
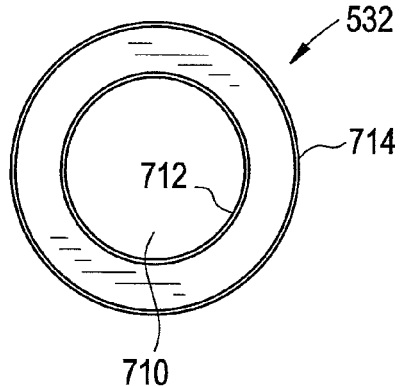
FIG. 72 is a front view of the upper pivot tube illustrated in FIG. 71.
Figure 73:
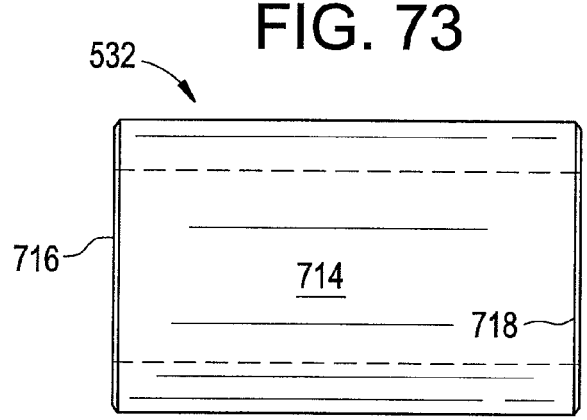
FIG. 73 is a side view of the upper pivot tube illustrated in FIG. 71.
Figure 74:
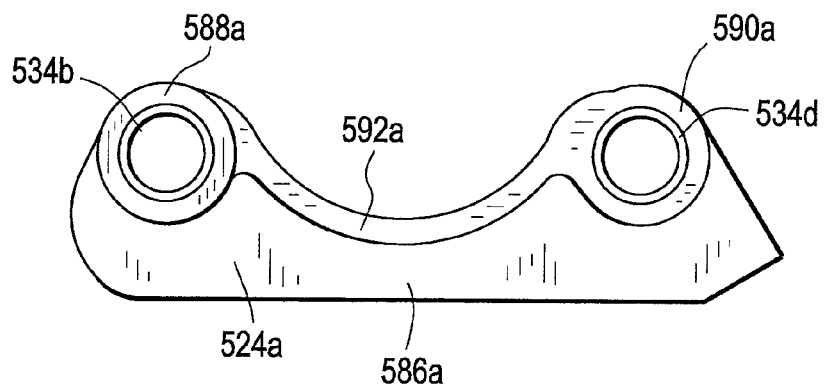
FIG. 74 is a side view of the equalizer arm casting having bushings secured therein.

FIGS. 71-73 illustrate the upper pivot tube 532, which is preferably formed of a forged, cast or fabricated metal. The upper pivot tube 532 is a cylindrical member having an aperture 710 extending entirely therethrough such that inner and outer surfaces 712, 714 of the upper pivot tube 532 are defined. The upper pivot tube 532 extends from a first end 716 thereof to a second end 718 thereof. The inner surface 712 of the upper pivot tube 532 at each of the first and second ends 716, 718 is preferably chamfered.

Each of the bushings 534a, 534b, 534c, 534d, 534e are generally identical to one another in shape and configuration (although the first, second and third bushings 534a, 534b, 534c have a longer length than do the fourth and fifth bushings 534d, 534e) and, as such, only the first bushing 534a is described with the understanding that the description of the second, third, fourth and fifth bushings 534b, 534c, 534d, 534e would be identical. The elements of the first bushing 534a will have reference numerals ending in "a". As such, it is to be understood that the elements of the second, third, fourth and fifth bushings 534b, 534c, 534d, 534e will have like reference numerals ending in "b", "c", "d" and "e", respectively.

Figure 65:
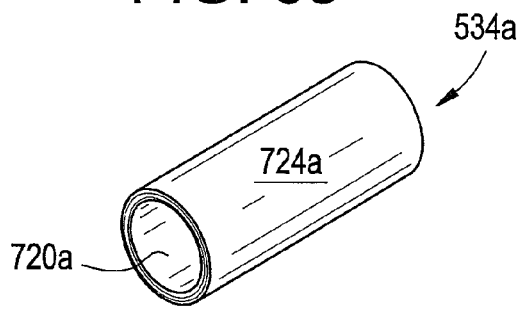
FIG. 65 is a perspective view of a bushing of the equalizer illustrated in FIG. 40.
Figure 66:
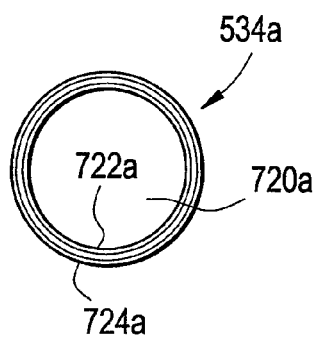
FIG. 66 is a front view of the bushing illustrated in FIG. 65.
Figure 67:
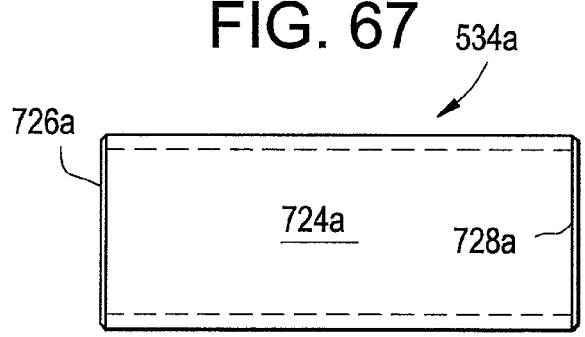
FIG. 67 is a side view of the bushing illustrated in FIG. 65.

FIGS. 65-67 illustrate the first bushing 534a, which is preferably formed of metal, such as brass. The first bushing 534a is a cylindrical member having an aperture 720a extending entirely therethrough such that inner and outer surface 722a, 724a of the first bushing 534a are defined. The first bushing 534a extends from a first end 726a thereof to a second end 728a thereof. The inner surface 722a of the first bushing 534a at each of the first and second ends 726a, 728a is preferably chamfered.

Each of the plug members 536a, 536b are generally identical to one another in shape and configuration and, as such, only the first plug member 536a is described with the understanding that the description of the second plug member 536b would be identical. The elements of the first plug member 536a will have reference numerals ending in "a". As such, it is to be understood that the elements of the second plug member 536b will have like reference numerals ending in "b".

Figure 68:
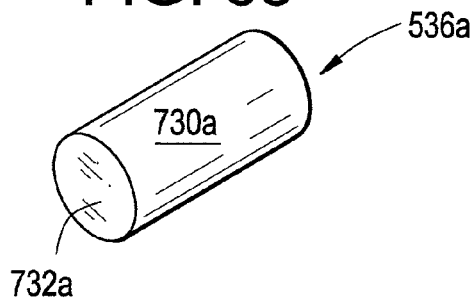
FIG. 68 is a perspective view of a plug member of the equalizer illustrated in FIG. 40.
Figure 69:
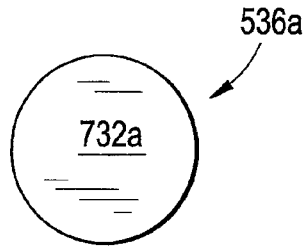
FIG. 69 is a front view of the plug member illustrated in FIG. 68.
Figure 70:
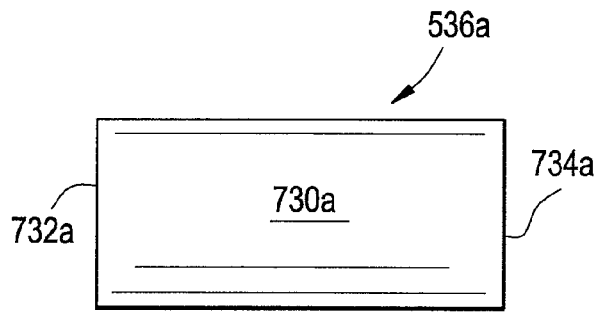
FIG. 70 is a side view of the plug member illustrated in FIG. 68.

FIGS. 68-70 illustrate the first plug member 536a, which is preferably formed of an elastomeric material, such as rubber, and preferably TORSILASTIC® rubber. The first plug member 536a is a cylindrical member defining an outer surface 730a. The first plug member 536a extends from a first end 732a thereof to a second end 734a thereof.

Figure 62:
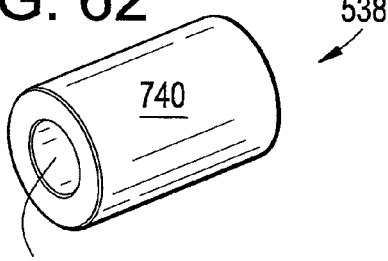
FIG. 62 is a perspective view of a spacer of the equalizer illustrated in FIG. 40.
Figure 63:
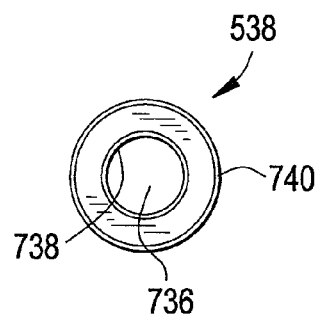
FIG. 63 is a front view of the spacer illustrated in FIG. 62.
Figure 64:
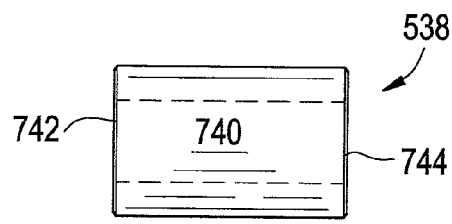
FIG. 64 is a side view of the spacer illustrated in FIG. 62.

FIGS. 62-64 illustrate the spacer 538, which is preferably formed of a plastic material. The spacer 538 is a cylindrical member having an aperture 736 extending entirely therethrough such that inner and outer surfaces 738, 740 of the spacer 538 are defined. The spacer 538 extends from a first end 742 thereof to a second end 744 thereof. The inner surface 738 of the spacer 538 at each of the first and second ends 742, 744 is preferably chamfered.

FIGS. 39-44 and 74 illustrate the construction of the equalizer 500 alone and in conjunction with the suspension system 502, as well as the function of the equalizer 500 with the suspension system 502. It should be noted that the order of the construction of the equalizer 500 as described is not the only order in which the equalizer 500 may be constructed.

The fourth and fifth bushings 534d, 534e are inserted and secured within the apertures 628a, 628b of the inner pivot tubes 590a, 590b of the first and second equalizer arm castings 524a, 524b, respectively, such that the outer surfaces 724d, 724e of the fourth and fifth bushings 534d, 534e are positioned against the inner surfaces 630a, 630b of the inner pivot tubes 590a, 590b. The fourth and fifth bushings 534d, 534e are further secured within the apertures 628a, 628b of the inner pivot tubes 590a, 590b, respectively, such that the first ends 726d, 726e of the fourth and fifth bushings 534d, 534e are provided proximate to or flush with the first ends 634a, 634b of the inner pivot tubes 590a, 590b, and such that the second ends 728d, 728e of the fourth and fifth bushings 534d, 534e are provided proximate to or flush with the second ends 636a, 636b of the inner pivot tubes 590a, 590b.

The second and third bushings 534b, 534c are inserted and secured within the apertures 618a, 618b of the outer pivot tubes 588a, 588b of the first and second equalizer arm castings 524a, 524b, respectively, such that the outer surfaces 724b, 724c of the second and third bushings 534b, 534c are positioned against the inner surfaces 620a, 620b of the outer pivot tubes 588a, 588b. The second and third bushings 534b, 534c are further secured within the apertures 618a, 618b of the outer pivot tubes 588a, 588b such that the first ends 726b, 726c of the second and third bushings 534b, 534c are provided proximate to or flush with the first ends 624a, 624b of the outer pivot tubes 588a, 588b, and such that the second ends 728b, 728c of the second and third bushings 534b, 534c are provided proximate to or flush with the second end 626a, 626b of the outer pivot tubes 588a, 588b.

The first bushing 534a is inserted into and secured within the aperture 710 of the upper pivot tube 532 such that the outer surface 724a of the first bushing 534a is positioned against the inner surface 712 of the upper pivot tube 532. The first bushing 534a is further secured within the aperture 710 of the upper pivot tube 532 such that the first end 726a of the first bushing 534a is provided proximate to or flush with the first end 716 of the upper pivot tube 532, and such that the second end 728a of the first bushing 534a is provided proximate to or flush with the second end 718 of the upper pivot tube 532.

The first plug member 536a is inserted into the aperture 706 of the shock absorber 530 in order to fully or partially plug up the aperture 706, as desired, of the shock absorber 530 and, as such, may either be fixedly secured within the aperture 706 or loose within the aperture 706. Likewise, the second plug member 536b is inserted into the aperture 708 of the shock absorber 530 in order to fully or partially plug up the aperture 708, as desired, of the shock absorber 530 and, as such, may either be fixedly secured within the aperture 708 or loose within the aperture 708.

The spacer 538 is inserted into the aperture 704 of the shock absorber 530 and may either be fixedly secured within the aperture 704 or loose within the aperture 704.

The upper pivot tube 532 is positioned within the aperture 558b of the second base plate 520b such that the second end 718 of the upper pivot tube 532 is substantially flush with the second planar surface 542b of the second base plate 520b. The outer surface 714 of the upper pivot tube 532 is fixedly secured to the second base plate 520b, preferably by welding.

The second side end 652 of the upper shock plate 526 is positioned and secured against, preferably by welding, the first planar surface 540b of the second base plate 520b. The first and second outer ends 654, 656 are preferably flush with the edge 544b of the second base plate 520b at the second portion 548b thereof. The middle straight portion 666 of the upper shock plate 526 is preferably, thus, positioned between the apertures 558b, 560b extending through the second base plate 520b.

The flat bottom 678 of the edge 676 of the reinforcement plate 528 is positioned to rest on the top surface 658 of the middle straight portion 666 of the upper shock plate 526 such that the first planar surface 672 of the reinforcement plate 528 is preferably flush with the first side end 650 of the upper shock plate 526. The outer surface 714 of the upper pivot tube 532, proximate to the first end 716 thereof, rests within the concave portion 686 of the top 684 of the edge 676 of the reinforcement plate 528, such that the first end 716 of the upper pivot tube 532 is preferably flush with the first planar surface 672 of the reinforcement plate 528.

The first equalizer arm casting 524a is aligned with the second base plate 520b such that the second planar surface 596a of the equalizer arm 586a faces the first planar surface 540b of the second base plate 520b and such that the aperture 720d of the fourth bushing 534d, and thus the aperture 628a of the inner pivot tube 590a, are in communication with the aperture 562b of the second base plate 520b.

The second equalizer arm casting 524b is aligned in an opposite manner with the with the second base plate 520b such that the first planar surface 594b of the equalizer arm 586b faces the first planar surface 540b of the second base plate 520b and such that the aperture 720e of the fifth bushing 534e, and thus the aperture 628b of the inner pivot tube 590b, are in communication with the aperture 564b of the second base plate 520b. As such, the first portions 607a, 607b of the equalizer arms 586a, 586b are generally planar with and positioned next to one another, and the second portions 609a, 609b of the equalizer arms 586a, 586b generally face one another.

The second planar surface 688 of the shock absorber 530 is positioned to face the first planar surface 540b of the second base plate 520b. The flat bottom 702 of the shock absorber 530 is positioned above the outer surfaces 632a, 632b of the inner pivot tubes 590a, 590b of the first and second equalizer arm castings 524a, 524b.

The edge 690 about the third portion 696 of the shock absorber 530 is positioned to rest on the top surface 646a of the lower shock plate 592a of the first equalizer arm casting 524a, with the curve of the edge 690 about the third portion 696 of the shock absorber 530 generally matching the curve of the top surface 646a of the lower shock plate 592a.

The edge 690 about the fourth portion 698 of the shock absorber 530 is positioned to rest on the top surface 646b of the lower shock plate 592b of the second equalizer arm casting 524b, with the curve of the edge 690 about the fourth portion 698 of the shock absorber 530 generally matching the curve of the top surface 646b of the lower shock plate 592b.

The bottom surface 660 of the upper shock plate 526 is configured to face and/or abut against the edge 690 of the first portion 692 of the shock absorber 530, with the middle straight portion 666 of the upper shock plate 526 facing and/or abutting against the flat top 700 of the shock absorber 530.

In this position, the aperture 736 through the spacer 538, and thus the aperture 704 through the shock absorber 530, are in communication with the aperture 560b through the second base plate 520b.

The first base plate 520a is positioned such that the second planar surface 542a thereof faces the first planar surface 594a of the first equalizer arm 586a and the second planar surface 596b of the second equalizer arm 586b, and such that the second planar surface 542a thereof faces and/or abuts against the first planar surface 672 of the reinforcement plate 528, the first side end 650 of the upper shock plate 526, the first planar surface 686 of the shock absorber 530, the first end 638a of the lower shock plate 592a, the second end 640b of the lower shock plate 592b, the first end 634a of the inner pivot tube 590a, and the second end 636b of the inner pivot tube 590b.

The first end 716 of the upper pivot tube 532 does not extend into the aperture 558a of the first base plate 520a, but the aperture 720a of the first bushing 534a is in communication with the aperture 558a of the first base plate 520a. The aperture 736 through the spacer 538, and thus the aperture 704 through the shock absorber 530, are in communication with the aperture 560a through the first base plate 520a. The aperture 720d of the bushing 534d provided in the aperture 628a of the inner pivot tube 590a is in communication with the aperture 562a of the first base plate 520a, and the aperture 720e of the bushing 534e provided in the aperture 630b of the inner pivot tube 590b is in communication with the aperture 564a of the first base plate 520a.

The first planar surface 568b of the second secondary base plate 522b faces and/or abuts against the second planar surface 542b of the second base plate 520b such that the aperture 580b is in alignment with the aperture 560b, such that the aperture 582b is in alignment with the aperture 562b, and such that the aperture 584b is in alignment with the aperture 564b.

The second planar surface 566a of the first secondary base plate 522a faces and/or abuts against the first planar surface 540a of the first base plate 520a such that the aperture 580a is in alignment with the aperture 560a, such that the aperture 582a is in alignment with the aperture 562a, and such that the aperture 584a is in alignment with the aperture 564a.

Figure 75:
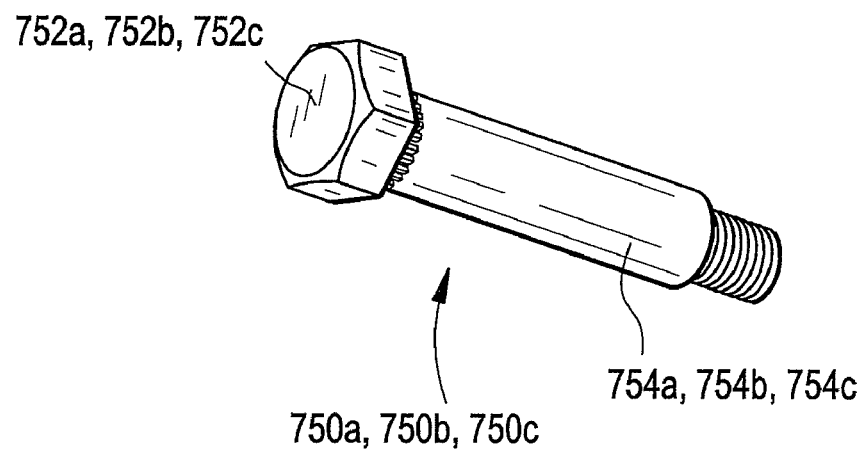
FIG. 75 is a perspective view of a fastening member of the equalizer of FIG. 40.
Figure 76:
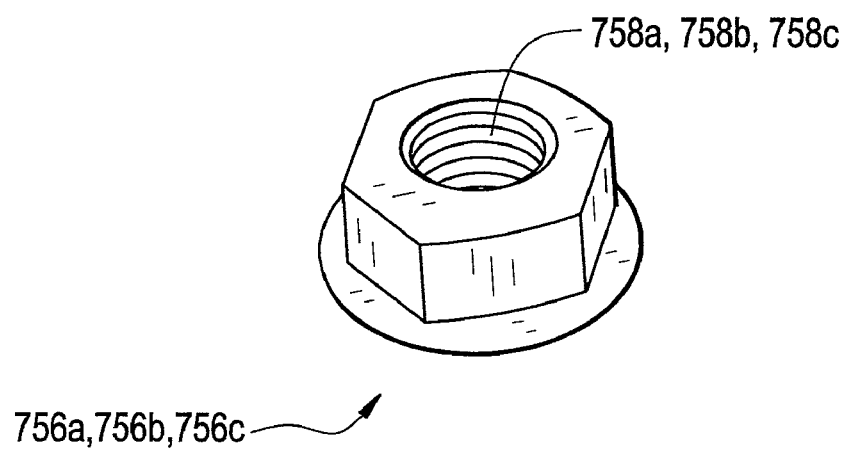
FIG. 76 is a perspective view of a securing member of the equalizer of FIG. 40.

A first fastening member 750a, illustrated in FIG. 75, such as a bolt, having an enlarged head portion 752a and an elongated shank portion 754a extending therefrom is inserted through the aperture 580a of the first secondary base plate 522a, through the aperture 560a of the first base plate 520a, through the aperture 736 of the spacer 538, through the aperture 560b of the second base plate 520b, and through the aperture 580b of the second secondary base plate 522b such that the enlarged head portion 752a is positioned against the first planar surface 566a of the first secondary base plate 522a. A first securing member 756a, illustrated in FIG. 76, such as a nut, having an aperture 758a provided therethrough, is positioned with the elongated shank portion 754a extending through the aperture 758a and the first securing member 756a is positioned against the second planar surface 568b of the second secondary base plate 522b.

A second fastening member 750b, such as a bolt, having an enlarged head portion 752b and an elongated shank portion 754b extending therefrom is inserted through the aperture 582a of the first secondary base plate 522a, through the aperture 562a of the first base plate 520a, through the aperture 720d of the fourth bushing 534d, through the aperture 562b of the second base plate 520b, and through the aperture 582b of the second secondary base plate 522b such that the enlarged head portion 752b is positioned against the first planar surface 566a of the first secondary base plate 522a. A first securing member 756b, such as a nut, having an aperture 758b provided therethrough, is positioned with the elongated shank portion 754b extending through the aperture 758b and the first securing member 756b is positioned against the second planar surface 568b of the second secondary base plate 522b.

A third fastening member 750c, such as a bolt, having an enlarged head portion 752c and an elongated shank portion 754c extending therefrom is inserted through the aperture 584a of the first secondary base plate 522a, through the aperture 564a of the first base plate 520a, through the aperture 720e of the fifth bushing 534e, through the aperture 564b of the second base plate 520b, and through the aperture 584b of the second secondary base plate 522b such that the enlarged head portion 752c is positioned against the first planar surface 566a of the first secondary base plate 522a. A first securing member 756c, such as a nut, having an aperture 758c provided therethrough, is positioned with the elongated shank portion 754c extending through the aperture 758c and the first securing member 756c is positioned against the second planar surface 568b of the second secondary base plate 522b.

The equalizer 500 of the invention is thus constructed as illustrated in FIGS. 39-43. Different fastening members 750a, 750b, 750c can be utilized as desired to provide for greasable or non-greasable pivots.

As illustrated in FIG. 39, the equalizer 500 is secured to the center frame hangar 516 which depends from a frame 760 of a trailer (not shown). The center frame hangar 516 is generally U-shaped such that it has a base portion and first and second portions 764, 766 which extend downwardly from opposite ends of the base portion. The base portion is fixedly secured to the frame 760 of the trailer by known means, such as welding. The first extending portion 764 has an aperture (not shown) extending therethrough proximate to a free end thereof. The second extending portion 766 has an aperture (not shown) extending therethrough proximate to a free end thereof. The aperture of the extending portions 764, 766 are in alignment with one another and the free ends are preferably planar.

As illustrated in FIG. 39, the first and second base plates 520a, 520b are positioned between the first and second extending portions 764, 766 of the center frame hangar 516 such that the first planar surface 540a of the first base plate 520a faces the first extending portion 764, and such that the second planar surface 542b of the second base plate 520b faces the second extending portion 766. The aperture 558a of the first base plate 520a is in alignment with the aperture of the first extending portion 764 of the center frame hangar 516. Likewise, the aperture 558b of the second base plate 520b is in alignment with the aperture of the second extending portion 766 of the center frame hangar 516. A fastening member, which may be identical to or different from the fastening members 750a, 750b, 750c can be inserted through the apertures 768, 558a, 720a, 558b, 772. A securing member, which may be identical to or different from the securing members 756a, 756b, 756c can then be secured to the fastening member such that the equalizer 500 is rotatably secured or pivotally mounted between the first and second extending portions 764, 766 of the center frame hangar 516.

As illustrated in FIG. 39, the suspension system 502 includes the equalizer 500, a front leaf spring 510, a rear leaf spring 514, a front shackle or link 780, and a rear shackle or link 782. As discussed, the equalizer 500 is rotatably secured or pivotally mounted to the center frame hangar 516 of the frame 760 of the trailer, illustrated at a point J. A first end of the front shackle 780 is rotatably secured or pivotally mounted to the outer pivot tube 588a of the first equalizer arm casting 524a, at a point K, preferably by a fastening member and a securing member. The fastening member extends through apertures of the front shackle 780 and the aperture 720b of the second bushing 534b. A first end of the rear shackle 782 is rotatably secured or pivotally mounted to the outer pivot tube 588b of the second equalizer arm casting 524b, at a point L, preferably by a fastening member and a securing member. The fastening member extends through the apertures of the rear shackle 782 and the aperture 720c of the third busing 534c. The fastening members may be identical to or different from the fastening members 750a, 750b, 750c. The securing members may be identical or different from the securing members 756a, 756b, 756c.

A second end of the front shackle 780 is rotatably secured or pivotally mounted to the rear end 508 of the front leaf spring 510 at a point M. A front end 790 of the front leaf spring 510 is attached to a front frame hangar 792 at a point N, or can be directly attached to the frame 760 itself, depending on the configuration of the frame 760.

A second end of the rear shackle 782 is rotatably secured or pivotally mounted to the front end 512 of the rear leaf spring 514 at a point P. A rear end of the rear leaf spring 514 is attached to a rear frame hangar 798 at a point Q, or can be directly attached to the frame 760 itself, depending on the configuration of the frame 760.

The front axle 504 of the trailer is positioned on the forward leaf spring 510 generally equidistantly between point M and point N. The rear axle 506 is positioned on the rear leaf spring 514 generally equidistantly between point P and point Q.

It is to be understood that while only a single suspension system 502 is illustrated and described, it is typical to have one suspension system 502 provided on both a left and a right side of a trailer. If more than two axles are provided on the trailer, it is to be understood that two or more suspension systems 502 can be provided on both a left and a right side of the trailer.

Like the prior art suspension system 20 including the equalizer 20 illustrated in FIG. 1, to the extent possible, road shock and vibrations from tires (not shown) of the trailer, utilizing the suspension system 502 including the equalizer 500 of the present invention, are transferred to the front and rear axles 504, 506, and are absorbed by the front and rear leaf springs 510, 514, respectively. Points J, N and Q are the contact points through which the road shock is passed to the frame 760. The equalizer 500 is included in the suspension system 502 in order to equalize the weight on both the front and rear axles 504, 506 as the tires pass over uneven terrain.

For example, an upward motion of the front leaf spring 504 results in a downward motion of the rear leaf spring 506.

The equalizer 500, like the equalizer 100, and unlike the equalizer 22 of the prior art, is configured to dampen or absorb the harsh shocks or vibrations coming off the rear end 508 of the front leaf spring 510 and the front end 512 of the rear leaf spring 514 proximate to the center frame hangar 516, thereby allowing for a "softer" ride.

When the front leaf spring 510 moves upward, the equalizer 500 rotates upwardly and to the left relative to the center hangar 516 about point J such that the rear leaf spring 514 moves downward, thus equalizing the weight on both the front and rear axles 504, 506. Further, when the front leaf spring 510 moves upward, the first equalizer arm casting 524a rotates or pivots upwardly between the first and second base plates 520a, 502b by the second fastening and securing members 750b, 756b about a point R. As the first equalizer arm casting 524a rotates or pivots upwardly, the lower shock plate 592a of the first equalizer arm casting 524a is forced against the third portion 696 of the shock absorber 530, thus forcing the first portion 692 of the shock absorber 530 against the upper shock plate 526. Under this force, the shock absorber 530 deforms between the upper and lower shock plates 526, 592a. Upon deformation, the shock absorber 530 absorbs or dampens the harsh shocks or vibrations coming off the rear end 508 of the front leaf spring 510, which would otherwise be transferred through the equalizer to the center frame hangar 516 and, thus, to the frame 760 of the trailer. Therefore, a "softer" ride is achieved by the suspension system 502 including the equalizer 500.

When the rear leaf spring 514 moves upward, the equalizer 500 rotates upwardly and to the right relative to the center hangar 516 about point J such that the front leaf spring 510 moves downward, thus equalizing the weight on both the front and rear axles 504, 506. Further, when the rear leaf spring 514 moves upward, the second equalizer arm casting 524b rotates or pivots upwardly between the first and second base plates 520a, 502b by the third fastening and securing members 750c, 756c about a point S. As the second equalizer arm casting 524b rotates or pivots upwardly, the lower shock plate 592b of the second equalizer arm casting 524b is forced against the fourth portion 698 of the shock absorber 530, thus forcing the first portion 692 of the shock absorber 530 against the upper shock plate 526. Under this force, the shock absorber 530 deforms between the upper and lower shock plates 526, 592b. Upon deformation, the shock absorber 530 absorbs or dampens the harsh shocks or vibrations coming off the front end 512 of the rear leaf spring 514, which would otherwise be transferred through the equalizer to the center frame hangar 516 and, thus, to the frame 760 of the trailer. Therefore, a "softer" ride is achieved by the suspension system 502 including the equalizer 500.

The equalizer 500 is preferably used for tandem axle configurations having a load range of approximately 12,000 pounds to 14,000 pounds. For tandem axle configurations having a load range of approximately 10,000 pounds to 12,000 pounds, the equalizer 500 may be altered by removing the plug members 536a, 536b from within the apertures 706, 708 of the shock absorber 530. For tandem axle configurations having a load range of approximately 8,000 pounds to 10,000 pounds, the equalizer 500 may be altered by removing the plug members 536a, 536b from within the apertures 706, 708 of the shock absorber 530, and by removing the spacer 538 from within the aperture 704 of the shock absorber 530. It has been found that sizing the shock absorber 530 for the load goes hand in hand with performance. If too little or too much material is used in the shock absorber 530, the ride quality will suffer; the two are linked. Thus, other variations of the shock absorber 830 with, partially with, or without the plug members 836a, 836b, can be used as desired for optimum performance.

For tandem axle configurations having a load range of less than approximately 8,000 pounds, use of the equalizer 800, illustrated in FIGS. 77-97, is preferred. The equalizer 800 includes first and second base plates 820a, 820b, first and second secondary base plates 822a, 822b, first and second equalizer arm castings 824a, 824b, an upper shock plate 826, a shock absorber 830, an upper pivot tube 832, first, second, third, fourth and fifth bushings 834a, 834b, 834c, 834d, 834e, and first and second plug members 836a, 836b. It should be noted that the configuration of each of these members as shown and described is a preferred configuration of same such that the members could be configured in any other suitable manner.

The upper shock plate 826 is generally identical to the upper shock plate 826 of the second embodiment of the equalizer 500 and, therefore, the upper shock plate 826 will not be specifically described and/or illustrated with the understanding that like elements in the upper shock plates 526, 826 are denoted with like reference numerals.

The upper pivot tube 832 is generally identical to the upper pivot tube 532 of the second embodiment of the equalizer 500 and, therefore, the upper pivot tube 832 will not be specifically described and/or illustrated with the understanding that like elements in the upper pivot tubes 532, 832 are denoted with like reference numerals.

The bushings 834a, 834b, 834c, 834d, 834e are generally identical to the bushings 534a, 534b, 534c, 534d, 534e of the second embodiment of the equalizer 500 and, therefore, the bushings 834a, 834b, 834c, 834d, 834e will not be specifically described and/or illustrated with the understanding that like elements in the bushings 534a, 534b, 534c, 534d, 534e; 834a, 834b, 834c, 834d, 834e are denoted with like reference numerals.

The plug members 836a, 836b are generally identical to the plug members 536a, 536b of the second embodiment of the equalizer 500 and, therefore, the plug members 836a, 836b will not be specifically described and/or illustrated with the understanding that like elements in the bushings 536a, 536b; 836a, 836b are denoted with like reference numerals.

The first base plate 820a is preferably identical in shape and configuration to the second base plate 820b and, as such, only the first base plate 820a is described with the understanding that the description of the second base plate 820b would be identical. The elements of the first base plate 820a will have reference numerals ending in "a". As such, it is to be understood that the elements of the second base plate 820b will have like reference numerals ending in "b".

Figure 83:
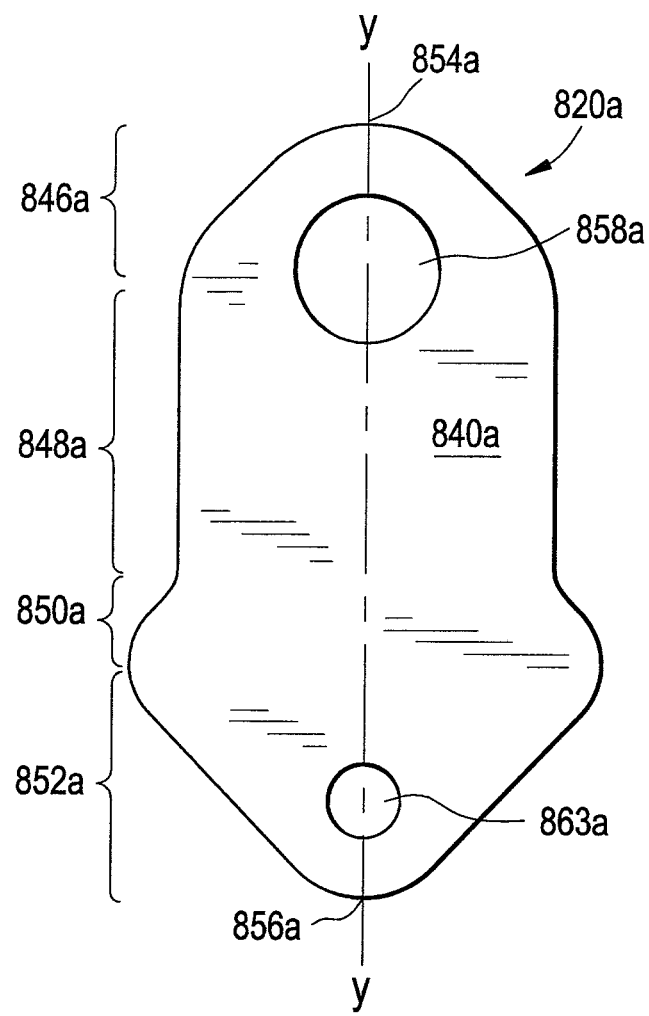
FIG. 83 is a front view of a base plate of the equalizer illustrated in FIG. 78.
Figure 84:
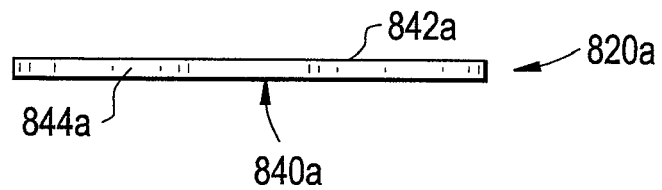
FIG. 84 is a bottom view of the base plate illustrated in FIG. 83.
Figure 86:
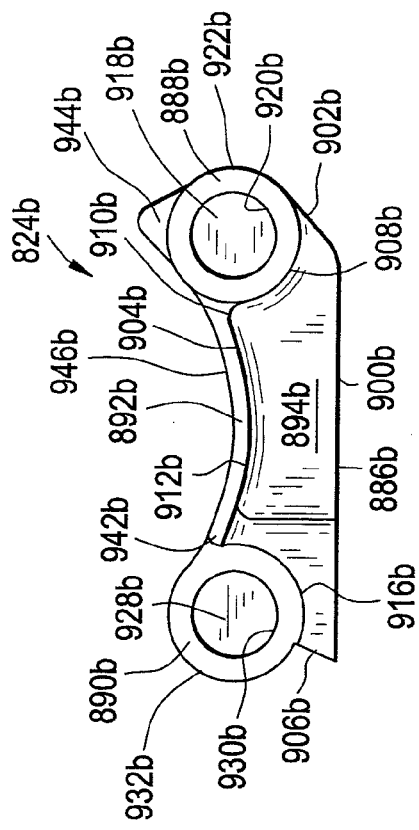
FIG. 86 is a front view of the equalizer arm casting illustrated in FIG. 85.
Figure 88:
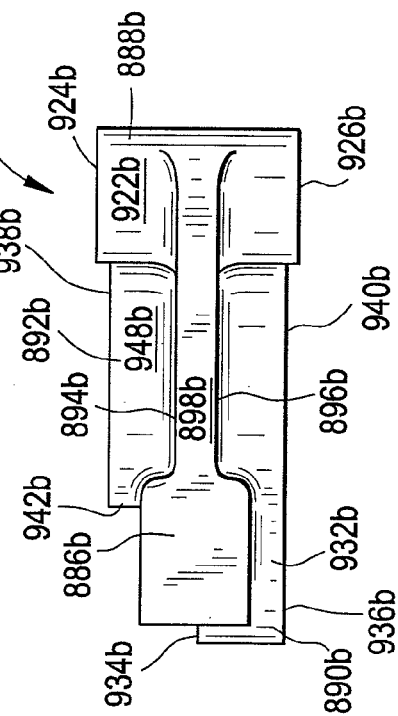
FIG. 88 is a bottom view of the equalizer arm casting illustrated in FIG. 85.
Figure 85:
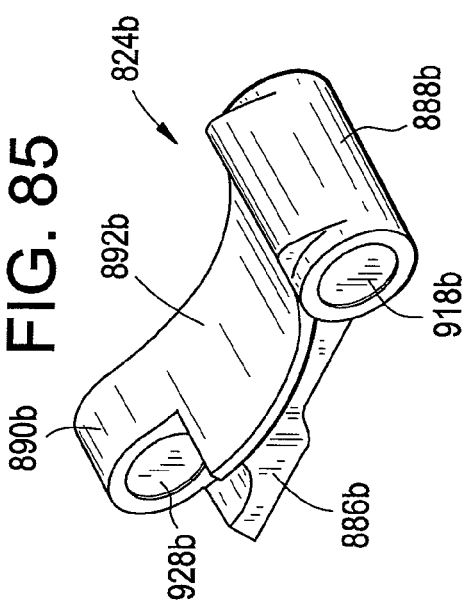
FIG. 85 is a perspective view of an equalizer arm casting of the equalizer illustrated in FIG. 78.
Figure 87:
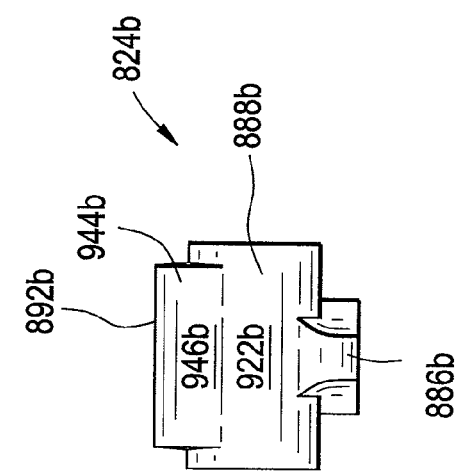
FIG. 87 is a side view of the equalizer arm casting illustrated in FIG. 85.

FIGS. 83 and 84 illustrate the first base plate 820a, which is preferably formed of a forged, cast or fabricated metal. The first base plate 820a has a first planar surface 840a, a second planar surface 842a, and an edge 844a which defines a perimeter of the first base plate 820a. The first base plate 820a generally has first, second, third and fourth portions 846a, 848a, 850a, 852a.

The first portion 846a of the first base plate 820a is generally triangular in configuration such that the edge 844a extends angularly downwardly and outwardly from a top 854a of the first base plate 820a. The edge 844a at the top 854a of the first portion 846a is generally rounded.

The second portion 848a of the first base plate 820a is generally rectangular in configuration such that the edge 844a extends downwardly from the first portion 846a to the third portion 850*a*. The edge 844*a* at the connection of the first and second portions 846*a*, 848*a* is generally rounded.

The third portion 850*a* of the first base plate 820*a* is generally trapezoidal in configuration such that the edge 844*a* extends angularly downwardly and outwardly from the second portion 848*a* to the fourth portion 852*a*. The edge 844*a* at the connection of the second and third portions 848*a*, 850*a* is generally rounded.

The fourth portion 852*a* of the first base plate 820*a* is generally triangular in configuration such that the edge 544*a* extends angularly downwardly and inwardly from the third portion 850*a* to a bottom 856*a* of the first base plate 820*a*. The edge 844*a* at the connection of the third and fourth portions 850*a*, 852*a* is generally rounded and the edge 844*a* at the bottom 856*a* of the fourth portion 852*a* is generally rounded.

A center reference line Y is provided in FIG. 83. An aperture 858*a* extends through the first base plate 820*a*. The aperture 858*a* is generally bisected by the first and second portions 846*a*, 848*a*, and by the center reference line Y. The fourth portion 852*a* of the first base plate 820*a* has an aperture 863*a* extending therethrough proximate to the bottom 856*a*, which is generally bisected by the center reference line Y. Each of the apertures 858*a*, 863*a* are preferably circular/cylindrical. Aperture 858*a* has a diameter which is larger than a diameter of the aperture 863*a*.

The first secondary base plate 822*a* is preferably identical in shape and configuration to the second secondary base plate 822*b* and, as such, only the first secondary base plate 822*a* is described with the understanding that the description of the second secondary base plate 822*b* would be identical. The elements of the first secondary base plate 822*a* will have reference numerals ending in "a". As such, it is to be understood that the elements of the second secondary base plate 822*b* will have like reference numerals ending in "b".

Figure 93:
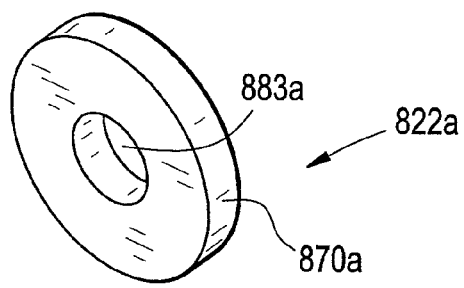
FIG. 93 is a perspective view of a secondary base plate of the equalizer illustrated in FIG. 78.
Figure 94:
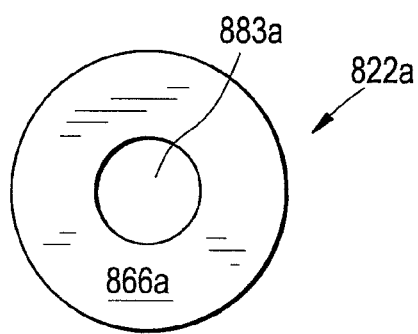
FIG. 94 is a front view of the secondary base plate illustrated in FIG. 93.
Figure 95:
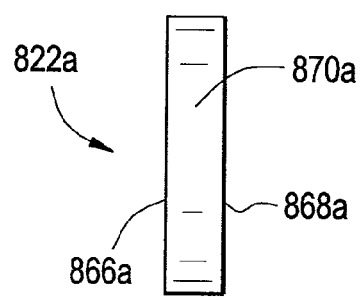
FIG. 95 is a side view of the secondary base plate illustrated in FIG. 93.
Figure 96:
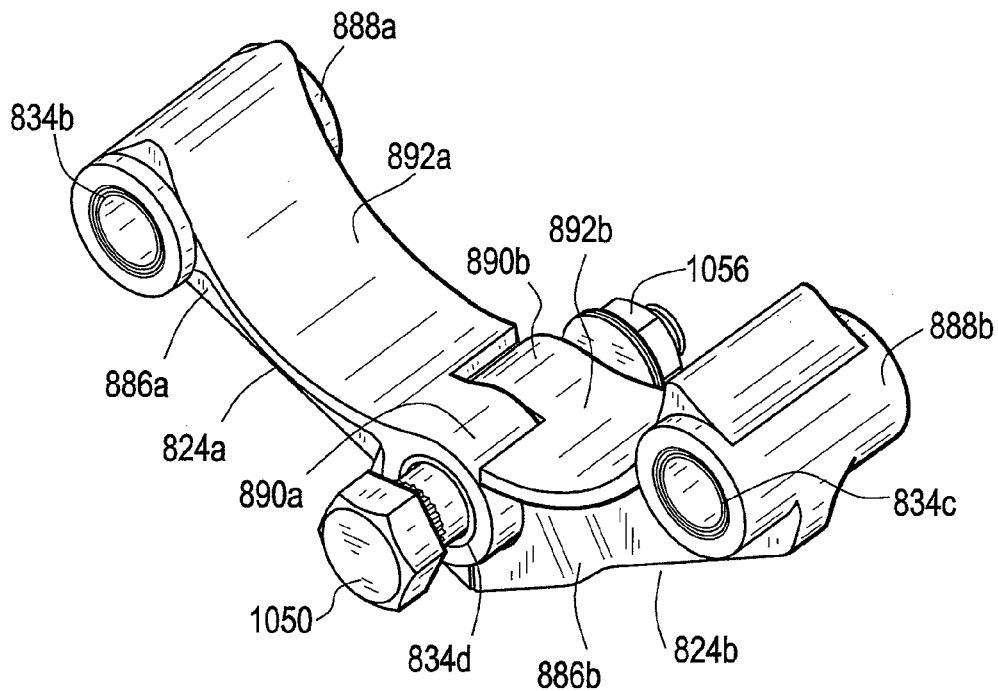
FIG. 96 is a side perspective view of the rotatable securement of the two equalizer arm castings of the equalizer illustrated in FIG. 78.
Figure 97:
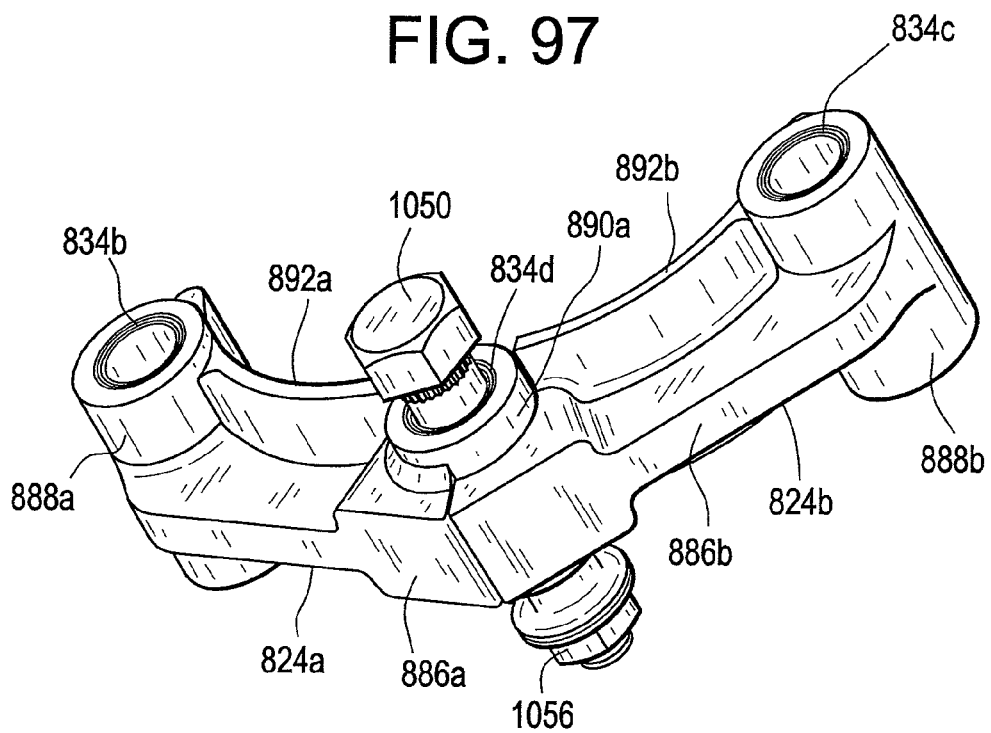
FIG. 97 is a bottom perspective view of the rotatable securement of the two equalizer arm castings of the equalizer illustrated in FIG. 78.

FIGS. 93-95 illustrate the first secondary base plate 822*a*, which is preferably formed of a forged, cast or fabricated metal. The first secondary base plate 822*a* has a first planar surface 866*a*, a second planar surface 868*a*, and an edge 870*a* which defines a perimeter of the first secondary base plate 822*a*. The first secondary base plate 822*a* is generally formed in a shape of a circular disc such that the edge 870*a* is circular/cylindrical.

An aperture 883*a* is provided generally through a center of the first secondary base plate 822*a*. The aperture 883*a* is preferably circular/cylindrical. Aperture 883 preferably has a diameter which is identical to the diameter of aperture 863*a* of the first base plate 820*a*.

The second equalizer arm casting 824*b* is preferably identical in shape and configuration to the first equalizer arm casting 824*a* and, as such, only the second equalizer arm casting 824*b* is described with the understanding that the description of the first equalizer arm casting 824*a* would be identical. The elements of the second equalizer arm casting 824*b* will have reference numerals ending in "b". As such, it is to be understood that the elements of the first equalizer arm casting 824*a* will have like reference numerals ending in "a".

FIGS. 85-88 illustrate the second equalizer arm casting 824*b*, which is preferably formed of a forged, cast or fabricated metal. The second equalizer arm casting 824*b* has an equalizer arm 886*b*, an outer pivot tube 888*b*, an inner pivot tube 890*b*, and a lower shock plate 892*b*, which are all preferably integrally formed.

The equalizer arm 886*b* is an elongated member having a first surface 894*b*, a second surface 896*b*, and an edge 898*b* which defines a perimeter of the equalizer arm 886*b*. As viewed in FIG. 86, the edge 898*b* has a flat bottom 900*b*, an outer side 902*b*, a top 904*b*, and an inner side 906*b*, all of which are defined by the edge 898*b*. The outer side 902*b* curves upwardly and outwardly from the flat bottom 900*b* and then extends straight upwardly and outwardly to the top 904*b*. The inner side 906*b* extends straight upwardly and inwardly from the flat bottom 900*b* to the top 904*b*. From the outer side 902*b*, the top 904*b* has, in series, an outer concave portion 908*b*, a convex portion 910*b*, a middle concave portion 912*b*, and an inner concave portion 916*b* which extends to the inner side 906*b* of the edge 898*b*. A distance from the first surface 894*b* to the second surface 896*b* is larger proximate to the inner side 906*b* than it is proximate to the outer side 902*b*, such that the equalizer arm 886*b* has an increased width portion proximate to the inner side 906*b* and a decreased width portion proximate to the outer side 902*b*. The inner concave portion 916*b* is generally provided in the increased width portion and the outer and middle concave portions 908*b*, 912*b* and the convex portion 910*b* are generally provided in the decreased width portion.

The outer pivot tube 888*b* is a cylindrical member having an aperture 918*b* extending entirely therethrough such that inner and outer surfaces 920*b*, 922*b* of the outer pivot tube 888*b* are defined. The outer pivot tube 888*b* extends from a first end 924*b* thereof to a second end 926*b* thereof. The inner surface 920*b* of the outer pivot tube 888*b* at each of the first and second ends 924*b*, 926*b* is preferably chamfered. The outer pivot tube 888*b* is configured to be positioned on/within and secured to the outer concave portion 910*b* of the equalizer arm 886*b*. The diameter of the outer surface 922*b* of the outer pivot tube 888*b* is commensurate with that at which the outer concave portion 910*b* is curved. The first end 924*b* of the outer pivot tube 888*b* extends a predetermined distance beyond the first surface 894*b* of the equalizer arm 886*b* and the second end 926*b* of the outer pivot tube 888*b* likewise extends the same predetermined distance beyond the second surface 896*b* of the equalizer arm 886*b*.

The inner pivot tube 890*b* is a cylindrical member having an aperture 928*b* extending entirely therethrough such that inner and outer surfaces 930*b*, 932*b* of the inner pivot tube 890*b* are defined. A diameter of the aperture 928*b* is preferably identical to the diameter of the aperture 918*b* of the outer pivot tube 888*b*, which is also preferably larger than the diameter of the aperture 863*a* of the first base plate 820*a* and the diameter of the aperture 883*a* of the first secondary base plate 822*a*. The inner pivot tube 890*b* extends from a first end 934*b* thereof to a second end 936*b* thereof. The inner surface 930*b* of the inner pivot tube 890*b* at each of the first and second ends 934*b*, 936*b* is preferably chamfered. The inner pivot tube 890*b* is configured to be positioned on/within and secured to the inner concave portion 916*b* of the equalizer arm 886*b*. The diameter of the outer surface 932*b* of the inner pivot tube 890*b* is commensurate with that at which the inner concave portion 916*b* is curved. The first end 934*b* of the inner pivot tube 890*b* extends generally to a middle of the first and second surfaces 894*b*, 896*b* of the equalizer arm 886*b*. The second end 936*b* of the inner pivot tube 890 extends beyond the first surface 894*b* of the equalizer arm 886*b*.

The lower shock plate 892*b* has first and second ends 938*b*, 940*b*, inner and outer ends 942*b*, 944*b*, and top and bottom surfaces 946*b*, 948*b*. The lower shock plate 892*b* is curved in a concave manner from the inner end 942*b* thereof to proximate the outer end 944*b* thereof, and then is curved in a convex manner to the outer end 944*b* thereof. The lower shock plate 892*b* is configured to have a majority of the bottom surface 948*b* thereof be positioned on/within and secured to the middle concave portion 912*b* of the equalizer arm 886*b*, and to have a minority of the bottom surface 948*b* thereof be positioned on/and secured to the outer surface 922*b* of the outer pivot tube 888b. The curving of the majority of the bottom surface 948b of the lower shock plate 892b is generally commensurate with that at which the middle concave portion 912a is curved. The first end 938b of the lower shock plate 892b extends a predetermined distance beyond the first planar surface 894b of the equalizer arm 886b and the second end 940b of the lower shock plate 892b likewise extends the same predetermined distance beyond the second planar surface 896b of the equalizer arm 886b. The first end 938b of the convex portion of the lower shock plate 892b at the connection of the lower shock plate 892b to the inner pivot tube 890b, however, does not extend beyond the first end 934b of the inner pivot tube 890b.

Figure 89:
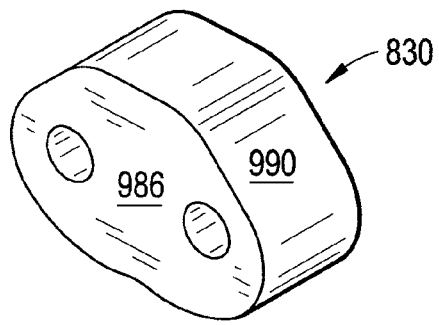
FIG. 89 is a perspective view of a shock absorber of the equalizer illustrated in FIG. 78.
Figure 90:
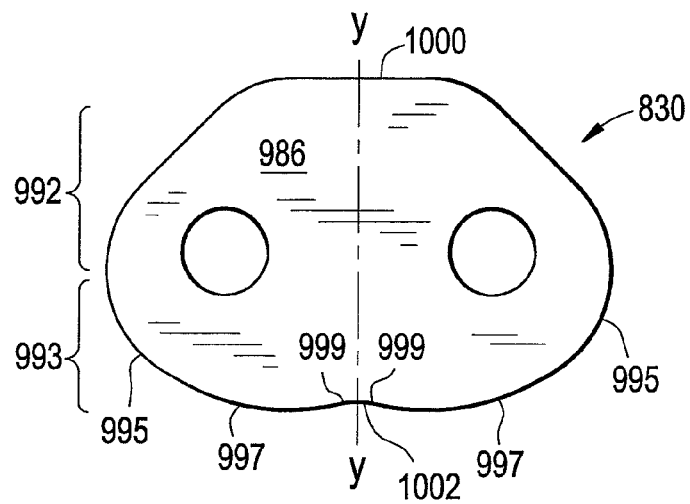
FIG. 90 is a front view of the shock absorber illustrated in FIG. 89.
Figure 91:
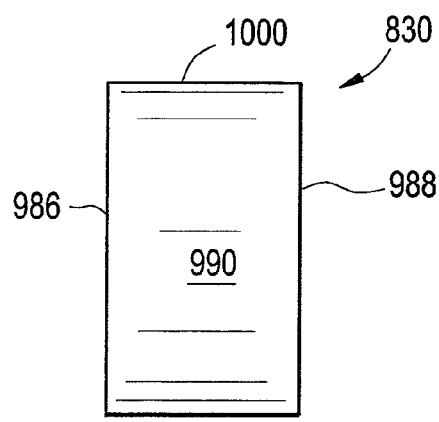
FIG. 91 is a side view of the shock absorber illustrated in FIG. 89.
Figure 92:
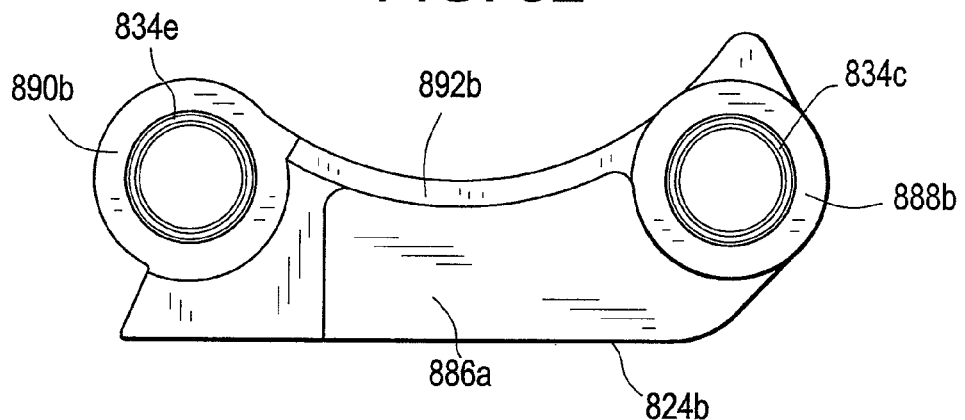
FIG. 92 is a side view of the equalizer arm casting having bushings secured therein.

FIGS. 89-91 illustrate the shock absorber 830, which is preferably formed of an elastomeric material, such as rubber, and preferably TORSILASTIC® rubber. The shock absorber 830 has a first planar surface 986, a second planar surface 988, and an edge 990 which defines a perimeter of the shock absorber 830. The shock absorber 830 generally has first and second portions 992, 993.

The first portion 992 of the shock absorber 830 is generally trapezoidal in configuration such that the edge 990 extends angular downwardly and outwardly from a flat top 1000 of the shock absorber 830. The edge 990 at the connection to the flat top 1000 is generally rounded.

The second portion 993 of the shock absorber 830 is positioned below the first portion 992 of the shock absorber 830, and extends to a bottom 1002 of the shock absorber 830. From the first portion 992, the edge 990 has a first portion 995 which is generally curved/arced in a concave manner at a first radius downwardly and outwardly and then downwardly and inwardly. A second portion 997 of the edge 990 is then generally curved/arced in a concave manner at a second radius downwardly and inwardly and then upwardly and inwardly. A third portion 999 of the edge 990 is then generally curved/arced in a convex manner at a third radius upwardly and inwardly to the bottom 1002. The first radius is larger than the third radius and the second radius is larger than the first radius.

The shock absorber 830 is thus generally formed in the shape of an upside-down heart.

A center reference line Y is provided in FIG. 90. The second portion 993 of the shock absorber 830 has two apertures 1006, 1008 extending therethrough which are planar to one another. Aperture 1006 is provided at a predetermine distance to the left from the center reference line Y, and is preferably provided proximate to the first portion 995 of the edge 990. Aperture 1008 is provided at a predetermined distance to the right from the center reference line Y, and is preferably provided proximate to the first portion 995 of the edge 990. Each of the apertures 1006, 1008 are preferably circular/cylindrical. Apertures 1006, 1008 preferably have identical diameters.

FIGS. 77-82, 92, 96 and 97 illustrate the construction of the equalizer 800 alone and in conjunction with the suspension system 802, as well as the function of the equalizer 800 with the suspension system 802. It should be noted that the order of the construction of the equalizer 800 as described is not the only order in which the equalizer 800 may be constructed.

The fourth and fifth bushings 834d, 834e are inserted and secured within the apertures 928a, 928b of the inner pivot tubes 890a, 890b of the first and second equalizer arm castings 824a, 824b, respectively, in the same manner in which the fourth and fifth bushings 534d, 534e are inserted and secured within the apertures 628a, 628b of the inner pivot tubes 590a, 590b of the first and second equalizer arm castings 524a, 524b, respectively.

The second and third bushings 834b, 834c are inserted and secured within the apertures 918a, 918b of the outer pivot tubes 888a, 888b of the first and second equalizer arm castings 824a, 824b, respectively, in the same manner in which the second and third bushings 534b, 534c are inserted and secured within the apertures 618a, 618b of the outer pivot tubes 588a, 588b of the first and second equalizer arm castings 524a, 524b, respectively.

The first bushing 834a is inserted and secured within the aperture 1010 of the upper pivot tube 832 in the same manner in which the first bushing 534a is inserted into and secured within the aperture 710 of the upper pivot tube 532.

The first and second plug members 836a, 836b are inserted into the apertures 1006, 1008 of the shock absorber 830 in the same manner in which the first and second plug members 536a, 536b are inserted into the apertures 706, 708 of the shock absorber 530.

The upper pivot tube 832 is positioned within the aperture 858b of the second base plate 820b such that the second end 1018 of the upper pivot tube 832 is substantially flush with the second planar surface 842b of the second base plate 820b. The outer surface 1014 of the upper pivot tube 832 is fixedly secured to the second base plate 820b, preferably by welding.

The second side end 952 of the upper shock plate 826 is positioned and secured against, preferably by welding, the first planar surface 840b of the second base plate 820b. The first and second outer ends 954, 956 preferably extend slightly beyond the edge 844b of the second base plate 820b at the second portion 548b thereof. The middle straight portion 966 of the upper shock plate 826 is preferably, thus, positioned below the aperture 858b extending through the second base plate 820b. The top surface 960 of the middle straight portion 966 of the upper shock plate 826 preferably faces and/or abuts against the outer surface 1014 of the upper pivot tube 832.

The second equalizer arm casting 824b is aligned with the second base plate 820b such that the second planar surface 896b of the equalizer arm 886b faces the first planar surface 840b of the second base plate 820b and such that the aperture 1020e of the fifth bushing 834e, and thus the aperture 928b of the inner pivot tube 890b, are in communication with the aperture 863b of the second base plate 820b.

The first equalizer arm casting 584a is aligned in an opposite manner such that the inner sides 906a, 906b of the equalizer arm castings 584a, 584b face and/or abut against one another, such that the first ends 934a, 934b of the inner pivot tubes 890a, 890b face and/or abut against one another, and such that the apertures 1020d, 1020e of the fourth and fifth bushings 834d, 834e are in communication with one another.

The second planar surface 988 of the shock absorber 830 is positioned to face the first planar surface 840b of the second base plate 820b. The flat bottom 1002 of the shock absorber 830 is positioned above the outer surfaces 932a, 932b of the inner pivot tubes 890a, 890b of the first and second equalizer arm castings 824a, 824b.

At least the second portion 997 of the edge 990 of the shock absorber 830 is positioned to rest on the top surfaces 946a, 946b of the lower shock plates 892a, 892b of the first and second equalizer arm castings 824a, 824b, with the curve of the second portion 997 of the edge 990 of the shock absorber 830 generally matching the curve of the top surfaces 946a, 946b of the lower shock plates 892a, 892b.

The bottom surface 960 of the upper shock plate 826 is configured to face and/or abut against the edge 990 of the first portion 992 of the shock absorber 830, with the middle straight portion 966 of the upper shock plate 826 facing and/or abutting against the flat top 1000 of the shock absorber 830.

In this position, the shock absorber 830 is generally encapsulated and secured between the upper shock plate 826 and the first and second equalizer arm castings 824a, 824b.

The first base plate 820a is positioned such that the second planar surface 842a thereof faces the second planar surface 896a of the first equalizer arm 886a and the first planar surface 894b of the second equalizer arm 886b, and such that the second planar surface 842a thereof faces and/or abuts against the first side end 950 of the upper shock plate 826, the first planar surface 986 of the shock absorber 830, the second end 940a of the lower shock plate 892a, the first end 940b of the lower shock plate 892b, the second end 936a of the inner pivot tube 890a, and the first end 934b of the inner pivot tube 890b.

The first end 1016 of the upper pivot tube 832 does not extend into the aperture 858a of the first base plate 820a, but the aperture 1020a of the first bushing 834a is in communication with the aperture 858a of the first base plate 820a. The apertures 1020d, 1020e of the bushings 834d, 834e provided in the apertures 928a, 928b of the inner pivot tubes 890a, 890b are in communication with the aperture 863a of the first base plate 820a.

The first planar surface 868b of the second secondary base plate 822b faces and/or abuts against the second planar surface 842b of the second base plate 820b such that the aperture 883b is in alignment with the aperture 863b.

The second planar surface 866a of the first secondary base plate 822a faces and/or abuts against the first planar surface 840a of the first base plate 820a such that the aperture 883a is in alignment with the aperture 863a.

A fastening member 1050 is inserted through the aperture 883a of the first secondary base plate 822a, through the aperture 863a of the first base plate 820a, through the aperture 1020d of the fourth bushing 834d, through the aperture 1020e of the fifth bushing 834e, through the aperture 863b of the second base plate 820b, and through the aperture 883b of the second secondary base plate 822b such that the enlarged head portion 1052 is positioned against the first planar surface 866a of the first secondary base plate 822a A securing member 1056 is positioned with the elongated shank portion 1054 extending through the aperture 1058 and the securing member 1056 is positioned against the second planar surface 868b of the second secondary base plate 822b.

The equalizer 800 of the invention is thus constructed as illustrated in FIGS. 77-82, 92, 96 and 97. Different fastening members 1050 can be utilized as desired to provide for greasable or non-greasable pivots.

Figure 77:
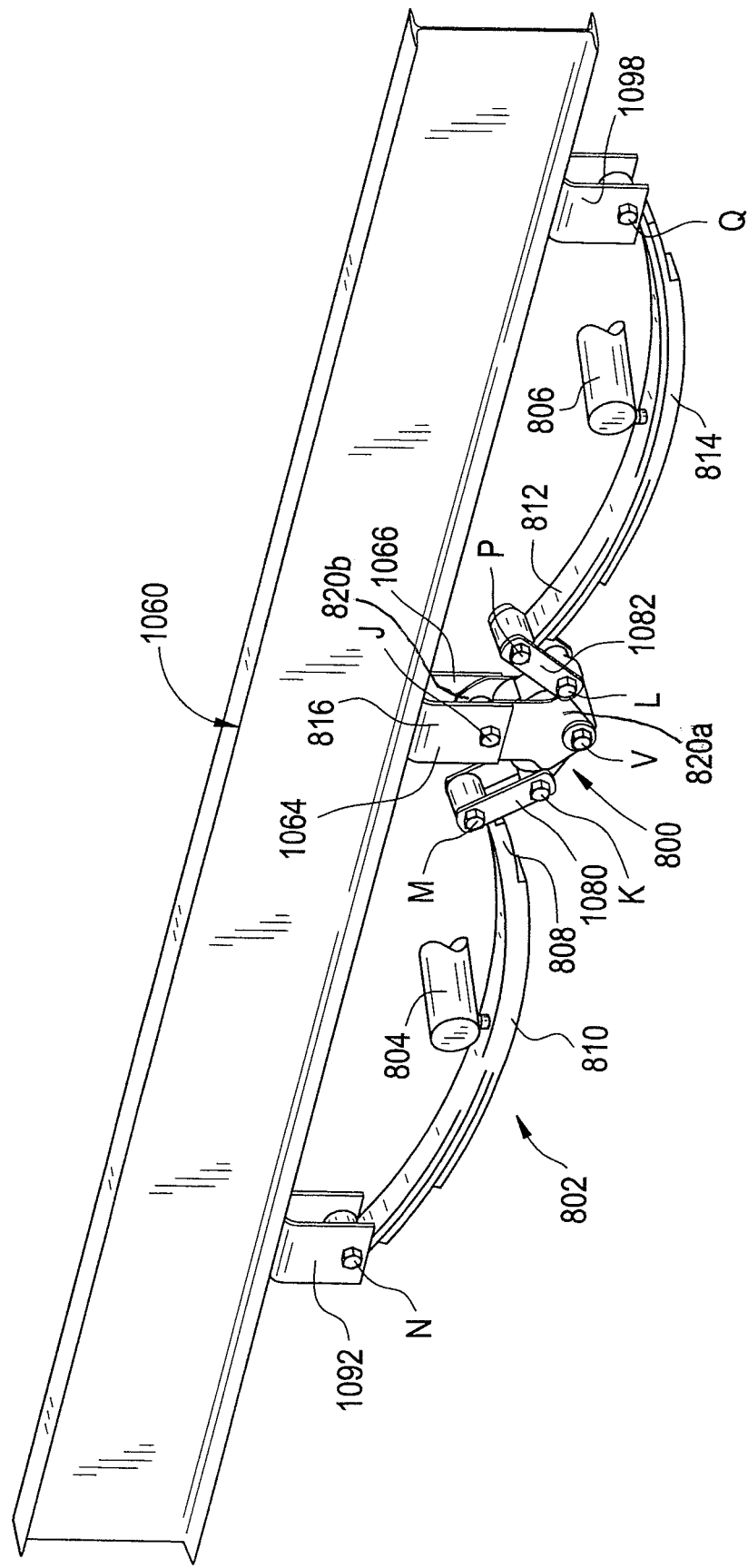
FIG. 77 is a view of a third embodiment of an equalizer which incorporates the features of the present invention incorporated into a suspension system which is mounted on a frame of a trailer.
Figure 78:
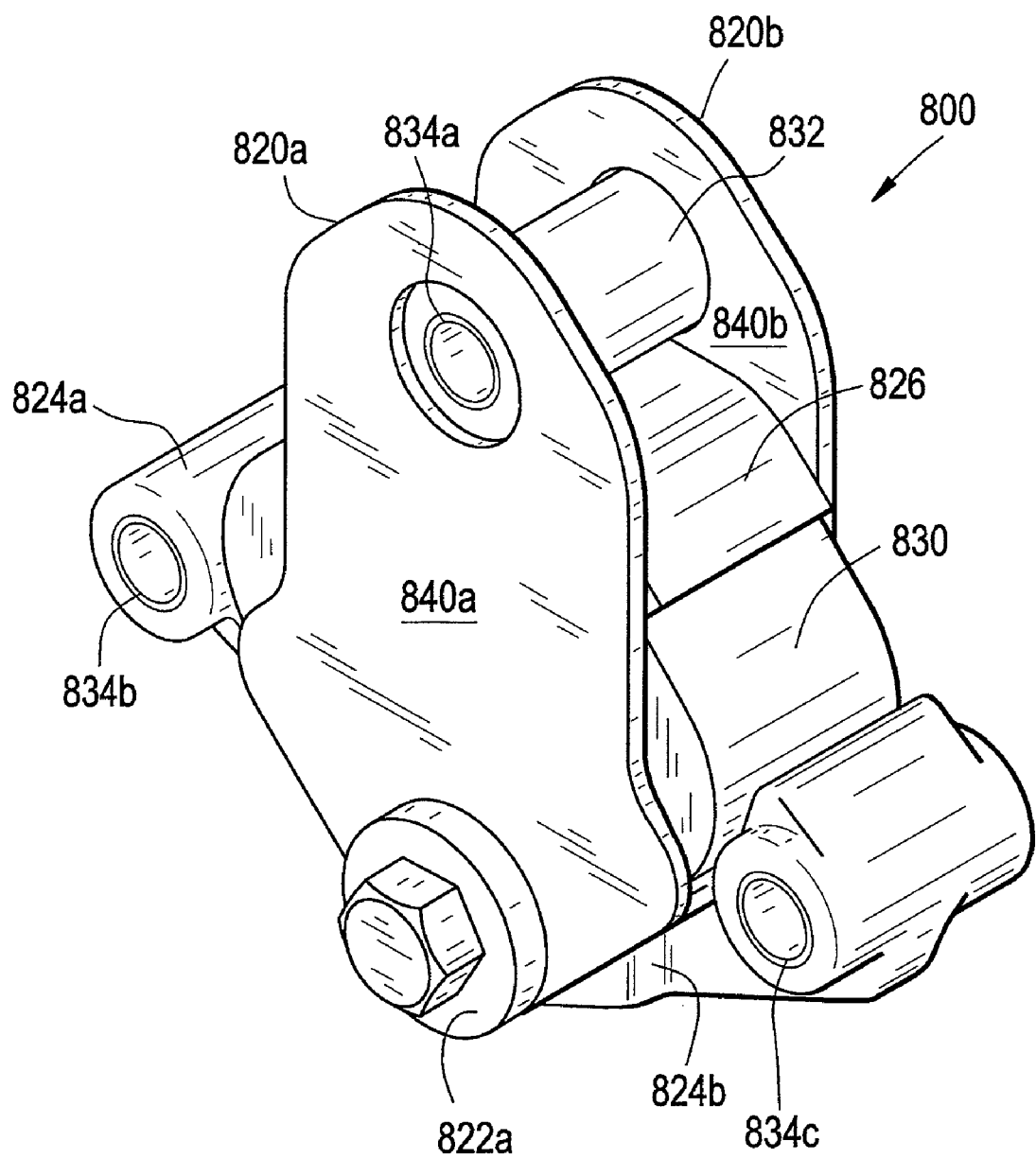
FIG. 78 is a perspective view of the third embodiment of the equalizer which incorporates the features of the present invention.
Figure 82:
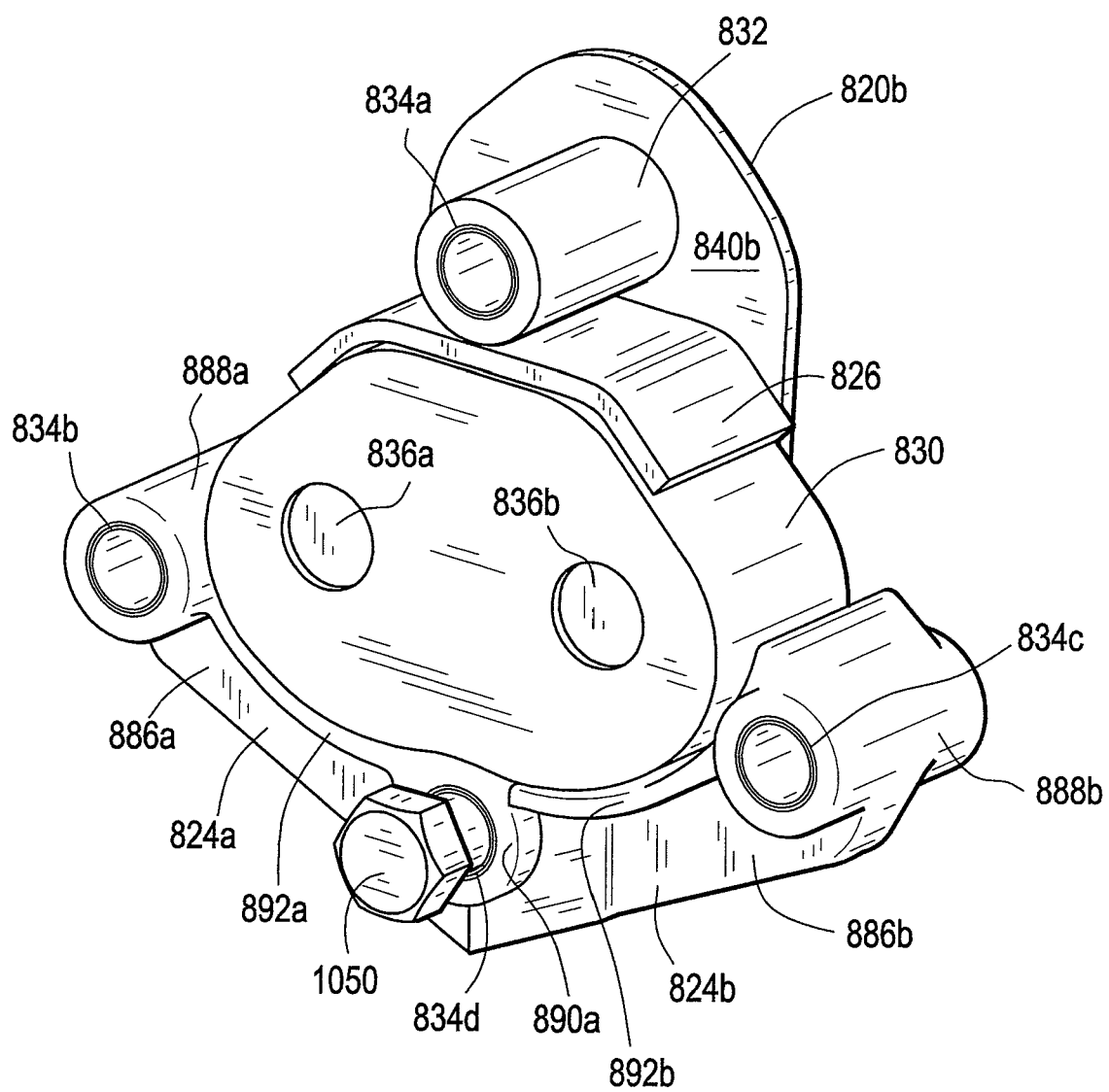
FIG. 82 is a perspective view of the equalizer of FIG. 78 with a first base plate and a first secondary base plate removed therefrom.

As illustrated in FIG. 77, the equalizer 800 is secured to the center frame hangar 816 which depends from a frame 1060 of a trailer (not shown). The center frame hangar 816 is generally U-shaped such that it has a base portion and first and second portions 1064, 1066 which extend downwardly from opposite ends of the base portion. The base portion is fixedly secured to the frame 1060 of the trailer by known means, such as welding. The first extending portion 1064 has an aperture (not shown) extending therethrough proximate to a free end thereof. The second extending portion 1066 has an aperture (not shown) extending therethrough proximate to a free end thereof. The aperture of the extending portions 1064, 1066 are in alignment with one another and the free ends are preferably planar.

As illustrated in FIG. 77, the first and second base plates 820a, 820b are positioned between the first and second extending portions 1064, 1066 of the center frame hangar 816 such that the first planar surface 840a of the first base plate 820a faces the first extending portion 1064, and such that the second planar surface 842b of the second base plate 820b faces the second extending portion 1066. The aperture 858a of the first base plate 820a is in alignment with the aperture of the first extending portion 1064 of the center frame hangar 816. Likewise, the aperture 858b of the second base plate 820b is in alignment with the aperture of the second extending portion 1066 of the center frame hangar 816. A fastening member, which may be identical to or different from the fastening member 1050 can be inserted through the apertures 1068, 858a, 1020a, 858b, 1072. A securing member, which may be identical to or different from the securing member 1056 can then be secured to the fastening member such that the equalizer 800 is rotatably secured or pivotally mounted between the first and second extending portions 1064, 1066 of the center frame hangar 816.

As illustrated in FIG. 77, the suspension system 802 includes the equalizer 800, a front leaf spring 810, a rear leaf spring 814, a front shackle or link 1080, and a rear shackle or link 1082. As discussed, the equalizer 800 is rotatably secured or pivotally mounted to the center frame hangar 816 of the frame 1060 of the trailer, illustrated at a point J. A first end of the front shackle 1080 is rotatably secured or pivotally mounted to the outer pivot tube 888a of the first equalizer arm casting 824a, at a point K, preferably by a fastening member and a securing member. The fastening member extends through apertures of the front shackle 1080 and the aperture 1020b of the second bushing 834b. A first end of the rear shackle 1082 is rotatably secured or pivotally mounted to the outer pivot tube 888b of the second equalizer arm casting 824b, at a point L, preferably by a fastening member and a securing member. The fastening member extends through the apertures of the rear shackle 1082 and the aperture 1020c of the third bushing 834c. The fastening members may be identical to or different from the fastening members 1050. The securing members may be identical or different from the securing members 1056.

A second end of the front shackle 1080 is rotatably secured or pivotally mounted to the rear end 808 of the front leaf spring 810 at a point M. A front end 1090 of the front leaf spring 810 is attached to a front frame hangar 1092 at a point N, or can be directly attached to the frame 1060 itself, depending on the configuration of the frame 1060.

A second end of the rear shackle 1082 is rotatably secured or pivotally mounted to the front end 812 of the rear leaf spring 814 at a point P. A rear end of the rear leaf spring 814 is attached to a rear frame hangar 1098 at a point Q, or can be directly attached to the frame 1060 itself, depending on the configuration of the frame 1060.

The front axle 804 of the trailer is positioned on the forward leaf spring 810 generally equidistantly between point M and point N. The rear axle 806 is positioned on the rear leaf spring 814 generally equidistantly between point P and point Q.

It is to be understood that while only a single suspension system 802 is illustrated and described, it is typical to have one suspension system 802 provided on both a left and a right side of a trailer. If more than two axles are provided on the trailer, it is to be understood that two or more suspension systems 802 can be provided on both a left and a right side of the trailer.

Like the prior art suspension system 20 including the equalizer 20 illustrated in FIG. 1, to the extent possible, road shock and vibrations from tires (not shown) of the trailer, utilizing the suspension system 802 including the equalizer 800 of the present invention, are transferred to the front and rear axles 804, 806, and are absorbed by the front and rear leaf springs 810, 814, respectively. Points J, N and Q are the contact points through which the road shock is passed to the frame 1060. The equalizer 800 is included in the suspension system 802 in order to equalize the weight on both the front and rear axles 804, 806 as the tires pass over uneven terrain. For example, an upward motion of the front leaf spring 804 results in a downward motion of the rear leaf spring 806.

The equalizer 800, like the equalizers 100, 500, and unlike the equalizer 22 of the prior art, is configured to dampen or absorb the harsh shocks or vibrations coming off the rear end 808 of the front leaf spring 810 and the front end 812 of the rear leaf spring 814 proximate to the center frame hangar 816, thereby allowing for a "softer" ride.

When the front leaf spring 810 moves upward, the equalizer 800 rotates upwardly and to the left relative to the center hangar 816 about point J such that the rear leaf spring 814 moves downward, thus equalizing the weight on both the front and rear axles 804, 806. Further, when the front leaf spring 810 moves upward, the first equalizer arm casting 824a rotates or pivots upwardly between the first and second base plates 820a, 820b by the fastening and securing members 1050, 1056 about a point V. As the first equalizer arm casting 824a rotates or pivots upwardly, the lower shock plate 892a of the first equalizer arm casting 824a is forced against the second portion 997 of the edge 990 of the shock absorber 830, thus forcing the first portion 992 of the shock absorber 830 against the upper shock plate 826. Under this force, the shock absorber 830 deforms between the upper and lower shock plates 826, 892a. Upon deformation, the shock absorber 830 absorbs or dampens the harsh shocks or vibrations coming off the rear end 808 of the front leaf spring 810, which would otherwise be transferred through the equalizer to the center frame hangar 816 and, thus, to the frame 1060 of the trailer. Therefore, a "softer" ride is achieved by the suspension system 802 including the equalizer 800 of the present invention.

When the rear leaf spring 814 moves upward, the equalizer 800 rotates upwardly and to the right relative to the center hangar 816 about point J such that the front leaf spring 810 moves downward, thus equalizing the weight on both the front and rear axles 804, 806. Further, when the rear leaf spring 814 moves upward, the second equalizer arm casting 824b rotates or pivots upwardly between the first and second base plates 820a, 820b by the fastening and securing members 1050, 1056 about the point V. As the second equalizer arm casting 824b rotates or pivots upwardly, the lower shock plate 892b of the second equalizer arm casting 824b is forced against the second portion 997 of the edge 990 of the shock absorber 830, thus forcing the first portion 992 of the shock absorber 830 against the upper shock plate 826. Under this force, the shock absorber 830 deforms between the upper and lower shock plates 826, 892b. Upon deformation, the shock absorber 830 absorbs or dampens the harsh shocks or vibrations coming off the front end 812 of the rear leaf spring 814, which would otherwise be transferred through the equalizer to the center frame hangar 816 and, thus, to the frame 1060 of the trailer. Therefore, a "softer" ride is achieved by the suspension system 802 including the equalizer 800 of the present invention.

The equalizer 800 of the invention is preferably used for tandem axle configurations having a load range of approximately 6,000 to 8,000 pounds. For tandem axle configurations having a load range of approximately 4,000 to 6,000 pounds, the equalizer 800 of the invention may be altered by removing the plug members 836a, 836b from within the apertures 1006, 1008 of the shock absorber 830. As stated hereinabove, it has been found that sizing the shock absorber 830 for the load goes hand in hand with performance. It too little or too much material is used in the shock absorber 830, the ride quality will suffer; the two are linked. Thus, other variations of the shock absorber 830 with, partially with, or without the plug members 836a, 836b, can be used as desired for optimum performance.

Figure 98:
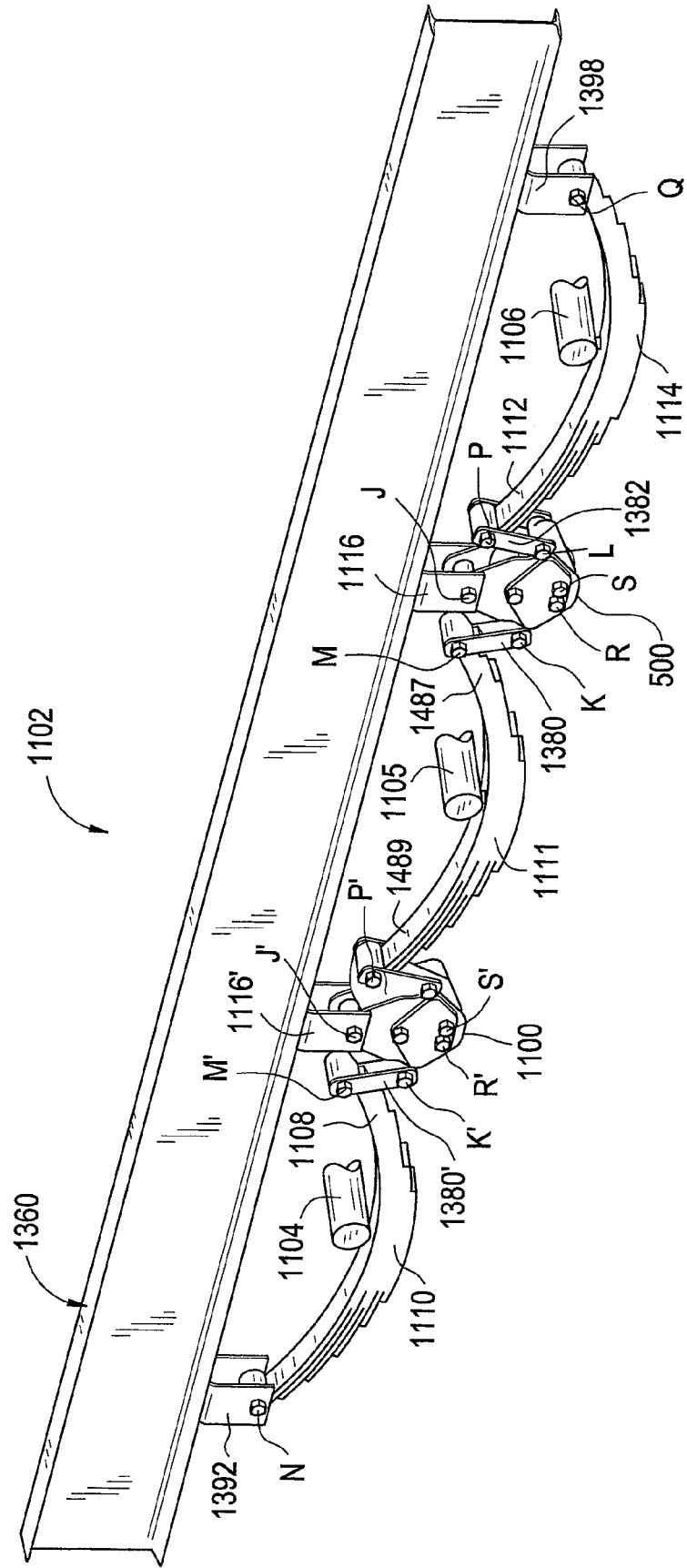
FIG. 98 is a view of a fourth embodiment of an equalizer which incorporates the features of the present invention incorporated into a suspension system which is mounted on a frame of a trailer.

When a tri-axle configuration is utilized, generally having a load range of approximately up to 21,000 pounds, it is preferable to use the equalizer 500 of the second embodiment, along with an equalizer 1100 of the fourth embodiment. The equalizers 500, 1100 are provided for use in a suspension system 1102, as illustrated in FIG. 98, to equalize the weight on the front, middle and rear axles 1104, 1105, 1006 as the tires pass over uneven terrain, as well as to dampen or absorb the harsh shocks or vibrations coming off the rear end 1108 of the front leaf spring 1110, the front and rear ends 1489, 1487 of the middle leaf spring 1105, and the front end 1112 of the rear leaf spring 1114 proximate to the two center frame hangars 1116a, 1116b, thus allowing for a "softer" ride. As best illustrated in FIGS. 98-102, the equalizer 1100 includes first and second base plates 1120a, 1120b, first and second secondary base plates 1122a, 1122b, an equalizer arm casting 1124, an attachment bracket 1125, an upper shock plate 1126, a reinforcement plate 1128, a shock absorber 1130, an upper pivot tube 1132, and first, second and third bushings 1134a, 1134b, 1134c. It should be noted that the configuration of each of these members as shown and described is a preferred configuration of same such that the members could be configured in any other suitable manner.

The first and second base plates 1120a, 1120b are generally identical to the first and second base plates 520a, 520b of the second embodiment of the equalizer 500 and, therefore, the first and second base plates 1120a, 1120b will not be specifically described and/or illustrated with the understanding that like elements in the first and second base plates 520a, 520b; 1120a, 1120b are denoted with like reference numerals.

The first and second secondary base plates 1122a, 1122b are generally identical to the first and second secondary base plates 522a, 522b of the second embodiment of the equalizer 500 and, therefore, the first and second secondary base plates 1122a, 1122b will not be specifically described and/or illustrated with the understanding that like elements in the first and second secondary base plates 522a, 522b; 1122a, 1122b are denoted with like reference numerals.

The equalizer arm casting 1124 is generally identical to the first and second equalizer arm castings 524a, 524b of the second embodiment of the equalizer 500 and, therefore, the equalizer arm casting 1124 will not be specifically described and/or illustrated with the understanding that like elements in the equalizer arm castings 524a, 524b; 1124 are denoted with like reference numerals.

The upper pivot tube 1132 is generally identical to the upper pivot tube 532 of the second embodiment of the equalizer 500 and, therefore, the upper pivot tube 1132 will not be specifically described and/or illustrated with the understanding that like elements in the upper pivot tube 532, 1132 are denoted with like reference numerals.

The first, second and third bushings 1134a, 1134b, 1134c are generally identical to the first, second, third, fourth and fifth bushings 534a, 534b, 534c, 534d, 534e of the second embodiment of the equalizer 500 and, therefore, the first, second and third bushings 1134a, 1134b, 1134c will not be specifically described and/or illustrated with the understanding that like elements in the bushings 534a, 534b, 534c, 534d, 534e; 1134a, 1134b, 1134c are denoted with like reference numerals. In this fourth embodiment of the equalizer 1100, it should be noted that the first and second bushings 1134a, 1134b have a longer length than does the third bushing 1134c.

Figure 106:
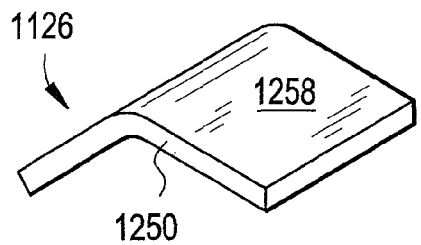
FIG. 106 is a perspective view of an upper shock plate of the equalizer illustrated in FIG. 99.
Figure 107:
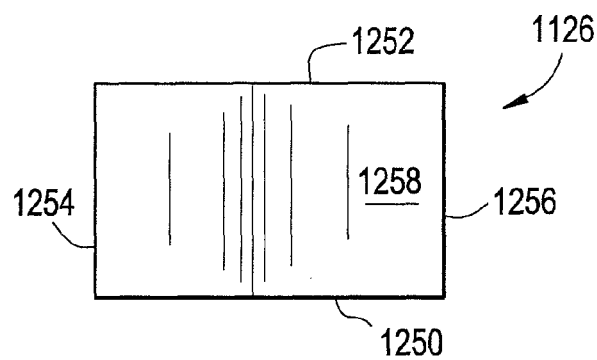
FIG. 107 is a top view of the upper shock plate illustrated in FIG. 106.
Figure 108:
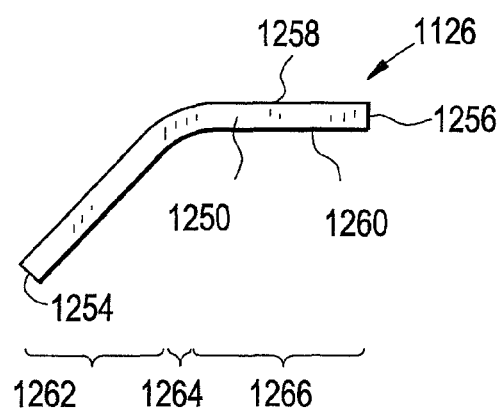
FIG. 108 is a front view of the upper shock plate illustrated in FIG. 106.

The upper shock plate 1126 is illustrated in FIGS. 106-108 and is generally configured as a half of the upper shock plate 526 of the second embodiment of the equalizer 500 with the cut of the upper shock plate 526 occurring through the middle straight portion 666 from the first side end 650 to the second side end 652. The upper shock plate 1126 is a thin plate which has first and second side ends 1250, 1252, first and second outer ends 1254, 1256, and top and bottom surfaces 1258, 1260. The upper shock plate 1126 has, from the first outer end 1254 to the second outer end 1256, in series, a first straight portion 1262, a curved portion 1264, and a second straight portion 1266. The curved portion 1264 is curved downwardly and outwardly from the end of the second straight portion 1266, which is not the second side end 652. The first straight portion 1262 extends downwardly and outwardly from the curved portion 1264, such that it is at an angle relative to the second straight portion 1266.

Figure 109:
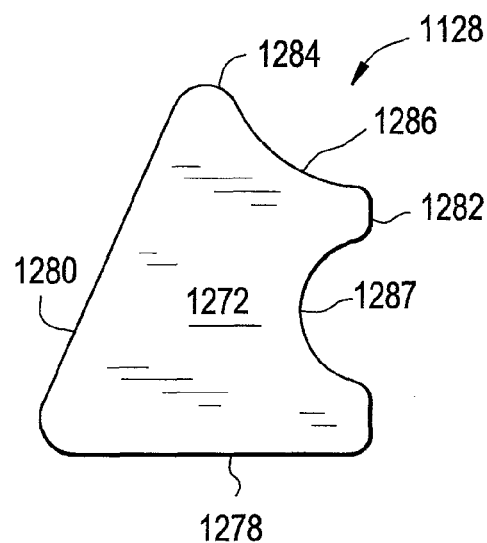
FIG. 109 is a front view of a reinforcement plate of the equalizer illustrated in FIG. 99.
Figure 110:
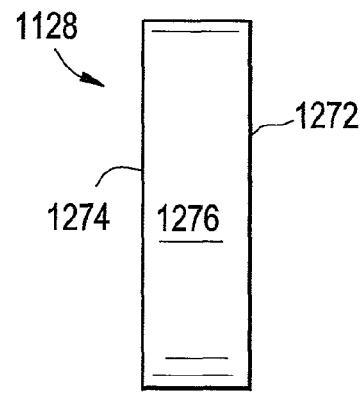
FIG. 110 is a side view of the reinforcement plate illustrated in FIG. 109.

The reinforcement plate 1128 is illustrated in FIGS. 109 and 110 and is generally configured as a half of the reinforcement plate 528 of the second embodiment of the equalizer 500, but with an extra cut-out provided along the edge 1276 thereof, with the cut of the reinforcement plate 528 occurring from a middle of the flat bottom 678 of the edge 676 to a middle of the concave portion 686 of the top 684 of the edge 676. The reinforcement plate 1128 is preferably formed of a forged, cast or fabricated metal. The reinforcement plate 1128 has a first planar surface 1272, a second planar surface 1274, and an edge 1276 which defines a perimeter of the reinforcement plate 1128. The edge 1276 of the reinforcement plate 1128 has a flat bottom 1278, first and second sides 1280, 1282, and a top 1284. The first side 1280 is angled upwardly and inwardly from a first end of the flat bottom 1278 to the top 1284. The second side 1282 extends straight upwardly from a second end of the flat bottom 1278 to the top 1284. The edge 1276 at the connection of the first and second sides 1280, 1282 to the flat bottom 1278 is generally rounded. The edge 1276 at the connection of the first and second sides 1280, 1282 to the top 1284 is also generally rounded. The top 1284 has a concave portion 1286 formed therein which extends from proximate the connection of the first side 1280 to the top 1284 to the connection of the second side 1282 to the top 1284. The second side 1282 has a concave portion 1287 formed therein which extends from proximate the connection of the second side 1282 to the flat bottom 1278 to the connection of the second side 1282 to the top 1284.

Figure 111:
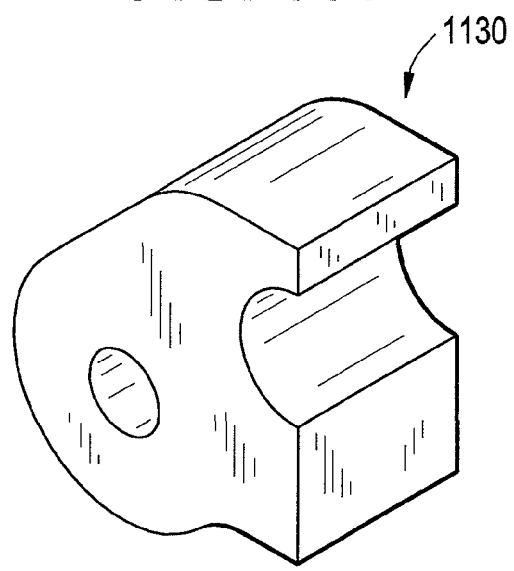
FIG. 111 is a perspective view of a shock absorber of the equalizer illustrated in FIG. 99.
Figure 112:
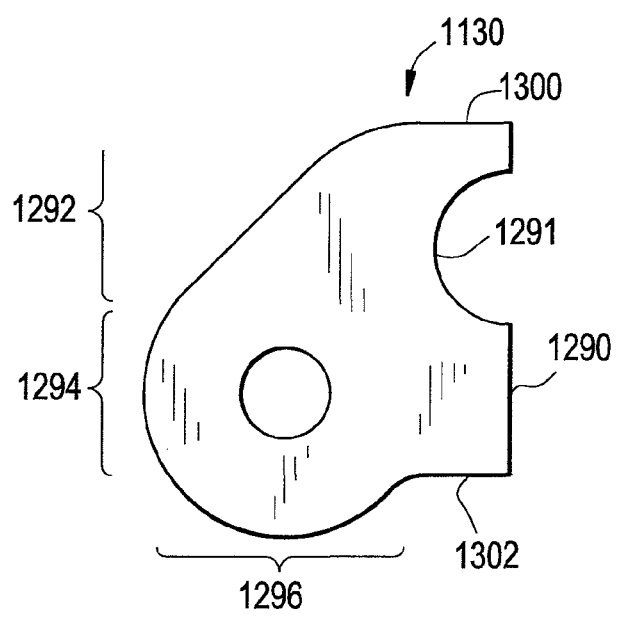
FIG. 112 is a front view of the shock absorber illustrated in FIG. 111.
Figure 113:
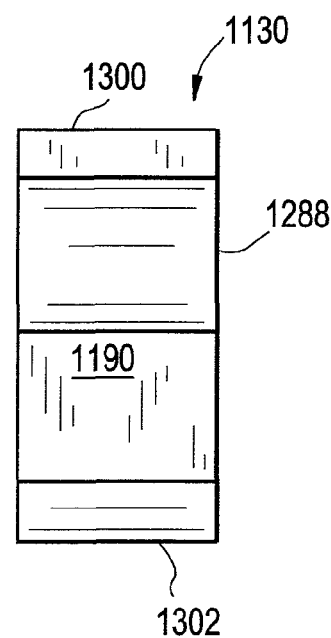
FIG. 113 is a side view of the shock absorber illustrated in FIG. 111.

The shock absorber 1130 is illustrated in FIGS. 111-113 and is generally configured as a half of the shock absorber 530 of the second embodiment of the equalizer with the cut of the shock absorber 530 occurring about the center reference line Y, such that the aperture 704 is bisected and such that what was the left side of the aperture 704 now defines a concave portion 1291 of the edge 1290 of the shock absorber 1130. The shock absorber 1130 is thus generally formed in the shape of half of an upside-down heart.

FIGS. 103-105 illustrate the attachment bracket 1125, which is preferably formed of a forged, cast or fabricated metal. The attachment bracket 1125 has an extension member 1450 and a clevis member 1452 which extends from the extension member 1450.

The extension member 1450 has an interior member 1454 which has first and second planar surfaces 1456, 1458 connected by a edge (not shown). The first extension member 1450 further has an exterior member 1460 which generally surrounds the edge of the interior member 1454. The exterior member 1460 has first and second ends 1462, 1464 and interior and exterior edges 1466, 1468. The interior edge 1466 of the exterior member 1460 is positioned against the edge of the interior member 1454. The first end 1462 of the exterior member 1460 extends beyond the first planar surface 1456 of the interior member 1454, and the second end 1464 of the exterior member 1460 extends beyond the second planar surface 1458 of the interior member 1454.

When viewed in FIG. 104, the extension member 1450 has an aperture 1470 formed through the exterior member 1460 proximate to a lower left end of thereof. The aperture 1470 has a diameter which is preferably identical to the diameters of the apertures 1162a, 1164a of the first and second base plates 1120a, 1120b, and to the diameters of the apertures 1182a, 1184a of the first and second secondary base plates 1122a, 1122b.

When viewed in FIG. 104, the extension member 1450 has an aperture 1472 formed through the exterior member 1460 at a lower end thereof, generally equidistantly between the left and right ends thereof. The aperture 1472 has a diameter which is preferably identical to the diameter of the aperture 1470.

When viewed in FIG. 104, the clevis member 1452 extends upwardly from the top right end of the extension member 1450. The clevis member 1452 has first and second arm portions 1474, 1476 which extend from the extension member 1450. Each arm portion 1474, 1476 has inner and outer surfaces 1478, 1480; 1482, 1484 such that the inner surfaces 1478, 1482 are generally opposite and spaced from one another. The first arm portion 1474 extends proximate to the first end 1462 of the extension member 1450 such that the outer surface 1480 of the first arm portion 1474 is generally planar with the first end 1462 of the extension member 1450. The second arm portion 1476 extends proximate to the second end 1464 of the extension member 1450 such that the outer surface 1484 of the second arm portion 1476 is generally planar with the second end 1464 of the extension member 1450.

The first arm portion 1474 has an aperture 1486 extending therethrough and the second arm portion 1476 has an aperture 1488 extending therethrough, which is planar with the aperture 1486 of the first arm portion 1474. The apertures 1486, 1488 preferably have identical diameters and are preferably identical to the diameters of the apertures 1470, 1472 of the extension member 1450. Each of the apertures 1486, 1488 preferably has a counterbore 1490, 1492 which opens to the outer surfaces 1480, 1484 of the arm portions 1474, 1476, where the counterbores 1490, 1492 define larger diameters of the apertures 1486, 1488.

FIGS. 98-102 illustrate the construction of the equalizer 1100 alone and in conjunction with the suspension system 1102, as well as the function of the equalizer 1100 with the suspension system 1102. It should be noted that the order of the construction of the equalizer 1100 as described is not the only order in which the equalizer 1100 may be constructed.

The third bushing 1134c is inserted and secured within the aperture 1228 of the inner pivot tube 1190 of the first equalizer arm casting 1124 in the same manner that the fourth and fifth bushings 534d, 534e are inserted and secured within the apertures 628a, 628b of the inner pivot tubes 590a, 590b of the first and second equalizer arm castings 590a, 590b, respectively.

The second bushing 1134b is inserted and secured within the aperture 1218 of the outer pivot tube 1188 of the first equalizer arm casting 1124 in the same manner that the second and third bushings 534b, 534c are inserted and secured within the apertures 618a, 618b of the outer pivot tubes 588a, 588b of the first and second equalizer arm castings 524a, 524b, respectively.

The first bushing 1134a is inserted and secured within the aperture 1310 of the upper pivot tube 1132 in the same manner that the first bushing 534a is inserted and secured within the aperture 710 of the upper pivot tube 532.

The upper pivot tube 1132 is positioned within the aperture 1158b of, and fixedly secured to, the second base plate 1120b in the same manner that the upper pivot tube 532 is positioned within the aperture 558b of, and fixedly secured to, the second base plate 520b.

The second side end 1252 of the upper shock plate 1126 is positioned and secured against, preferably by welding, the first planar surface 1140b of the second base plate 1120b. The first end 1254 is preferably flush with the edge 1144b of the second base plate 1120b at the second portion 1148b thereof. The second end 1256 is thus, preferably positioned between the apertures 1148b, 1160b extending through the second base plate 1120b.

The flat bottom 1278 of the edge 1276 of the reinforcement plate 1128 is positioned to rest on the top surface 1258 of the second straight portion 1266 of the upper shock plate 1126 such that the first planar surface 1272 of the reinforcement plate 1128 is preferably flush with the first side end 1250 of the upper shock plate 1126. The outer surface 1314 of the upper pivot tube 1132, proximate to the first end 1316 thereof, partially rests within the concave portion 1286 of the top 1284 of the edge 1276 of the reinforcement plate 1128, such that the first end 1316 of the upper pivot tube 1132 is preferably flush with the first planar surface 1272 of the reinforcement plate 1128.

The equalizer arm casting 1124 is aligned with the second base plate 1120b such that the second planar surface 1196 of the equalizer arm 1186 faces the first planar surface 1140b of the second base plate 1120b and such that the aperture 1320 of the third bushing 1134c, and thus the aperture 1228 of the inner pivot tube 1190, are in communication with the aperture 1162b of the second base plate 1120b.

The second planar surface 1288 of the shock absorber 1130 is positioned to face the first planar surface 1140b of the second base plate 1120b. The flat bottom 1302 of the shock, absorber 1130 is positioned above the outer surface 1232 of the inner pivot tube 1190 of the equalizer arm casting 1124.

The edge 1290 about the third portion 1296 of the shock absorber 1130 is positioned to rest on the top surface 1246 of the lower shock plate 1192 of the equalizer arm casting 1124, with the curve of the edge 1290 about the third portion 1296 of the shock absorber 1130 generally matching the curve of the top surface 1246 of the lower shock plate 1192.

The bottom surface 1260 of the upper shock plate 1126 is configured to face and/or abut against the edge 1290 of the first portion 1292 of the shock absorber 1130, with the second straight portion 1266 of the upper shock plate 1126 facing and/or abutting against the flat top 1300 of the shock absorber 1130.

In this position, the cut-out of the aperture through the shock absorber 1130 which resulted in the concave portion 1291 on the edge 1290 of the shock absorber 1130 is in communication with the aperture 1160b through the second base plate 1120b.

The alignment bracket 1125 is aligned with the second base plate 1120b such that the first planar surface 1456 of the interior member 1454 of the alignment bracket 1125 faces the first planar surface 1140b of the second base plate 1120b, such that the first end 1462 of the exterior member 1460 of the alignment bracket 1126 faces and possibly partially abuts against the first planar surface 1140b of the second base plate 1120b. As such, the aperture 1472 of the alignment bracket 1125 is in communication with the aperture 1160b of the second base plate 1120b, and the aperture 1470 of the alignment bracket 1125 is in communication with the aperture 1164b of the second base plate 1120b. The edge 1290, including the concave portion 1291 thereof, of the shock absorber 1130 abuts against a portion of the outer edge 1468 of the exterior member 1460 of the alignment bracket 1125 and the outer edge 1468 of the exterior member 1460 bends and/or curves around the outer surface of the upper pivot tube 1132.

The first base plate 1120a is positioned such that the second planar surface 1142a thereof faces the first planar surface 1194 of the equalizer arm 1186 and the second planar surface 1458 of the interior member 1454 of the alignment bracket 1125, and such that the second planar surface 1142a thereof faces and/or abuts against the first planar surface 1272 of the reinforcement plate 1128, the first side end 1250 of the upper shock plate 1126, the first planar surface 1286 of the shock absorber 1130, the first end 1238 of the lower shock plate 1192, the first end 1234 of the inner pivot tube 1190, and portions of the second end 1464 of the exterior member 1460 of the alignment bracket 1125.

The first end 1316 of the upper pivot tube 1132 does not extend into the aperture 1158a of the first base plate 1120a, but the aperture 1320a of the first bushing 1134a is in communication with the aperture 1158a of the first base plate 1120a. The aperture 1320c of the bushing 1134c provided in the aperture 1228 of the inner pivot tube 1190 is in communication with the aperture 1162a of the first base plate 1120a.

The first planar surface 1168b of the second secondary base plate 1122b faces and/or abuts against the second planar surface 1142b of the second base plate 1120b such that the aperture 1180b is in alignment with the aperture 1260b, such that the aperture 1182b is in alignment with the aperture 1162b, and such that the aperture 1184b is in alignment with the aperture 1164b.

The second planar surface 1166a of the first secondary base plate 1122a faces and/or abuts against the first planar surface 1140a of the first base plate 1120a such that the aperture 1180a is in alignment with the aperture 1160a, such that the aperture 1182a is in alignment with the aperture 1162a, and such that the aperture 1184a is in alignment with the aperture 1164a.

A first fastening member 1350a is inserted through the aperture 1180a of the first secondary base plate 1122a, through the aperture 1160a of the first base plate 1120a, through the aperture 1472 of the alignment bracket 1125, around the concave portion 1291 of the edge 1290 of the shock absorber 1130, through the aperture 1160b of the second base plate 1120b, and through the aperture 1180b of the second secondary base plate 1122b such that the enlarged head portion 1352a is positioned against the first planar surface 1166a of the first secondary base plate 1122a. A first securing member 1356a is positioned with the elongated shank portion 1354a of the first fastening member 1350a extending through the aperture 1358a of the first securing member 1356a, and the first securing member 1356a is positioned against the second planar surface 1168b of the second secondary base plate 1122b.

A second fastening member 1350b is inserted through the aperture 1182a of the first secondary base plate 1122a, through the aperture 1162a of the first base plate 1120a, through the aperture 1320c of the third bushing 1134c, through the aperture 1162b of the second base plate 1120b, and through the aperture 1182b of the second secondary base plate 1122b such that the enlarged head portion 1352b is positioned against the first planar surface 1166a of the first secondary base plate 1122a. A second fastening member 1356b is positioned with the elongated shank portion 1354b of the second fastening member 1350b extending through the aperture 1358b of the second securing member 1356b, and the second securing member 1356b is positioned against the second planar surface 1168b of the second secondary base plate 1122b.

A third fastening member 1350c is inserted through the aperture 1184a of the first secondary base plate 1122a, through the aperture 1164a of the first base plate 1120a, through the aperture 1470 of the alignment bracket 1125, through the aperture 1164b of the second base plate 1120b, and through the aperture 1184b of the second secondary base plate 1122b such that the enlarged head portion 1352c is positioned against the first planar surface 1166a of the first secondary base plate 1122a. A third fastening member 1356c is positioned with the elongated shank portion 1354c of the third fastening member 1350c extending through the aperture 1358c of the third securing member 1356c, and the third securing member 1356c is positioned against the second planar surface 1168b of the second secondary base plate 1122b.

The equalizer 1100 is thus constructed as illustrated in FIGS. 98-101. Different fastening members 1350a, 1350b, 1350c can be utilized as desired to provide for greasable or non-greasable pivots.

Figure 99:
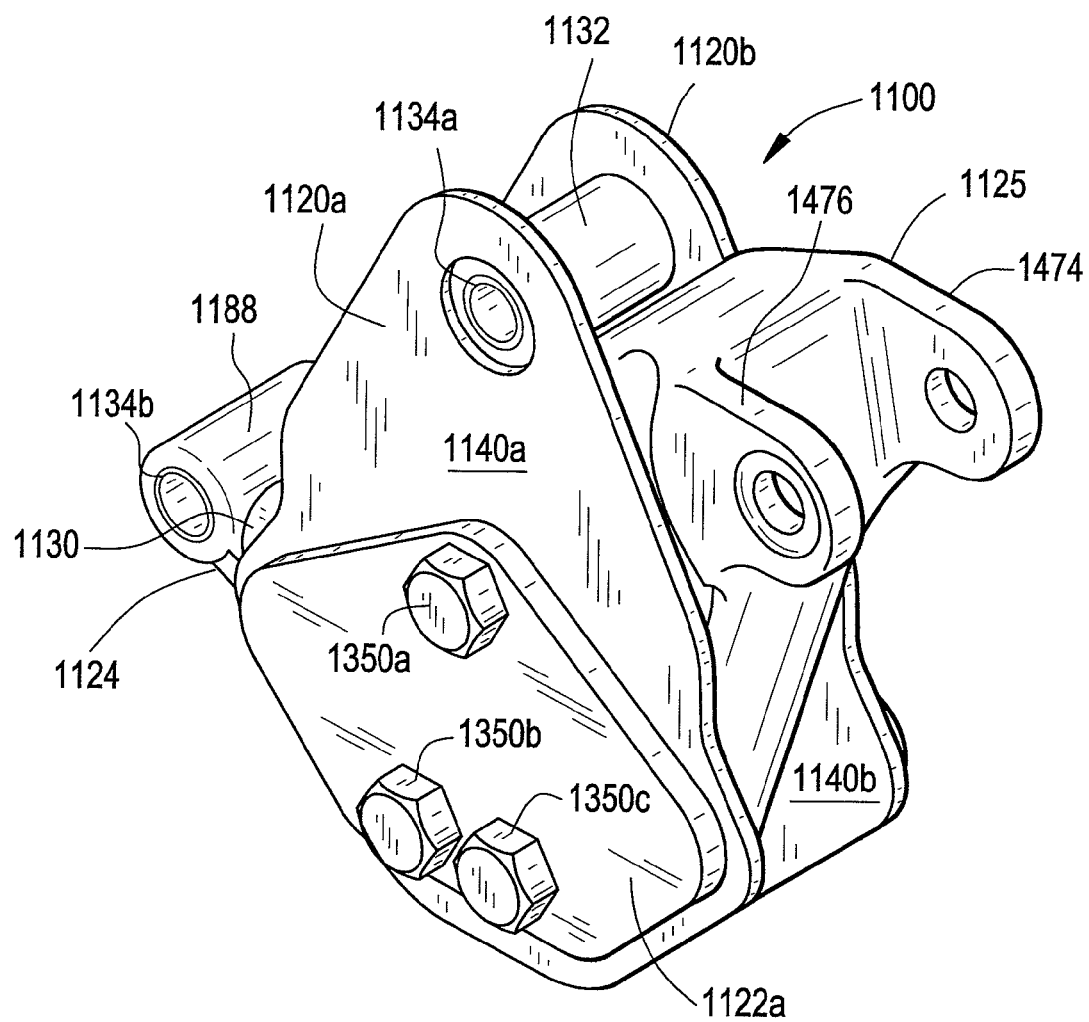
FIG. 99 is a perspective view of the fourth embodiment of the equalizer which incorporates the features of the present invention.
Figure 101:
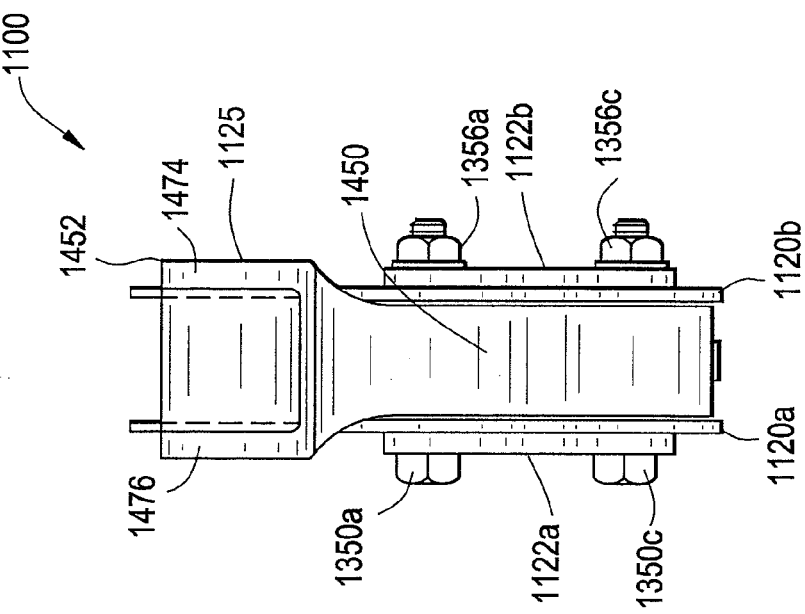
FIG. 101 is a side view of the equalizer illustrated in FIG. 99.
Figure 100:
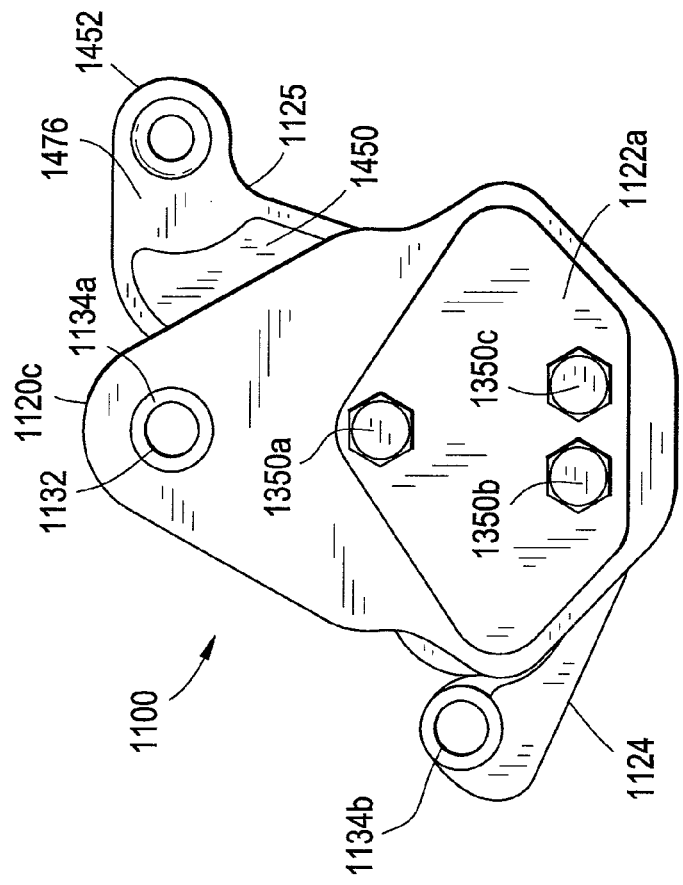
FIG. 100 is a front view of the equalizer illustrated in FIG. 99.
Figure 102:
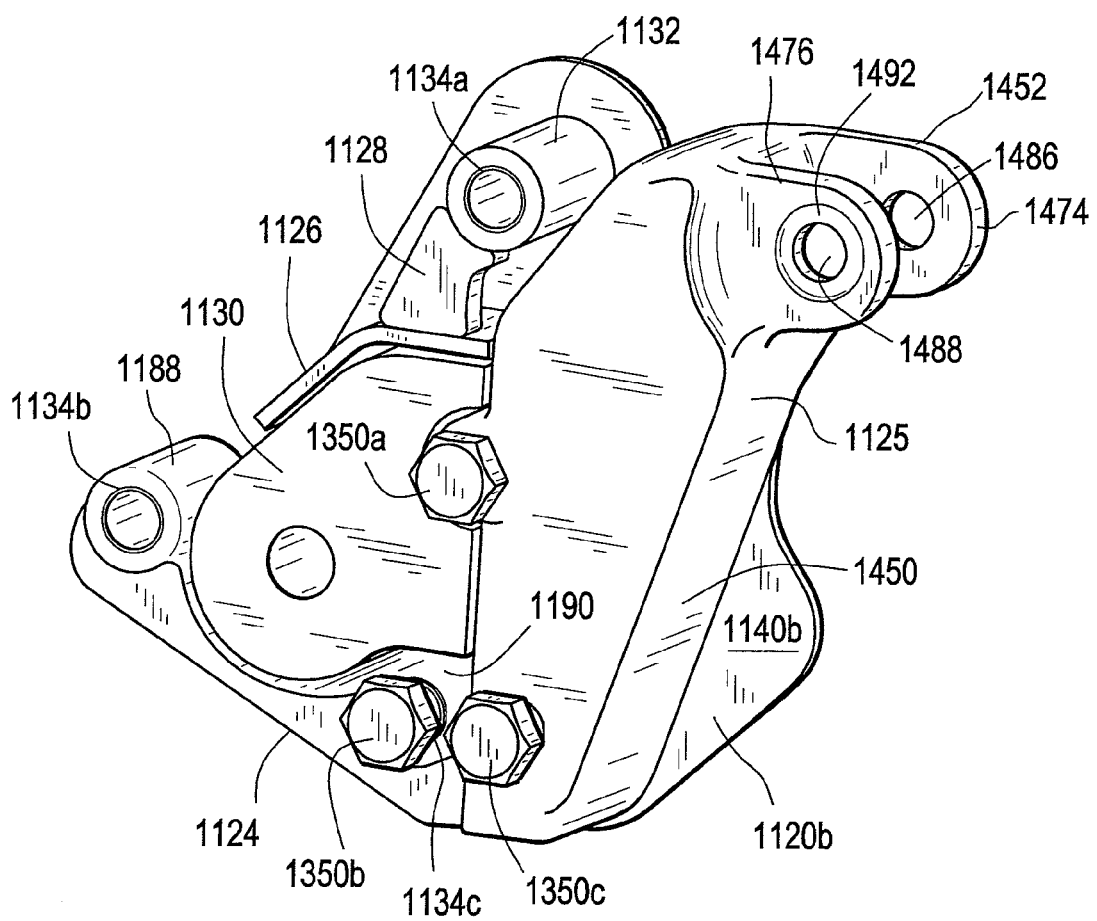
FIG. 102 is a perspective view of the equalizer of FIG. 99 with a first base plate and a first secondary base plate removed therefrom.

As illustrated in FIG. 99, the equalizer 1100 is secured to a first center frame hangar 1116' which depends from a frame 1360 of a trailer (not shown), and the equalizer 500 is secured to a second center frame hangar 1116a. The center frame hangars 1116, 1116' are identical to the center frame hangar 516 described hereinabove in connection the second embodiment of the invention and, therefore, will not be described herein again for brevity purposes. The equalizers 500, 1100 are also rotatably secured or pivotally mounted to the center frame hangars 1116, 1116' in the same manner in which the equalizer 500 is rotatably secured or pivotally mounted to the center frame hangar 516.

The suspension system 1102 includes the equalizers 500, 1100, a front leaf spring 1110, a middle leaf spring 1111, a rear leaf spring 1114, a first front shackle or link 1380, a second front shackle or link 1380', and a rear shackle or link 1382. As discussed, the equalizer 500 is rotatably secured or pivotally mounted to the second frame hangar 1116 of the frame 1360 of the trailer, illustrated at point J. A first end of the first front shackle 1380 is rotatably secured or pivotally mounted to the equalizer 500, as described hereinabove, at a point K. A first end of the rear shackle 1382 is rotatably secured or pivotally mounted to the equalizer 500, as described hereinabove, at a point L.

A second end of the first front shackle 1380 is rotatably secured or pivotally mounted to a rear end 1487 of the middle leaf spring 1111 at a point M. A front end 1489 of the middle leaf spring 1111 is fixedly attached to the clevis member 1452 of the attachment member 1125 of the equalizer 1100 at a point P'.

A second end of the rear shackle 1382 is rotatably secured or pivotally mounted to the front end 1112 of the rear leaf spring 1114 at a point P. A rear end of the rear leaf spring 1114 is attached to a rear frame hangar 1398 at a point Q, or can be directly attached to the frame 1360 itself, depending on the configuration of the frame 1360.

A first end of the second front shackle 1380' is rotatably secured or pivotally mounted to the outer pivot tube 1188 of the equalizer arm casting 1124, at a point K, by a fastening member and a securing member.

A second end of the second front shackle 1380' is rotatably secured or pivotally mounted to the rear end 1108 of the front leaf spring 1110 at a point M'. A front end of the front leaf spring 1110 is attached to a front frame hangar 1392 at a point N, or can be directly attached to the frame 1360 itself, depending on the configuration of the frame 1360.

The front axle 1104 of the trailer is positioned on the forward leaf spring 1110 generally equidistantly between point N and point M'. The middle axle 1105 of the trailer is positioned on the middle leaf spring 1111 generally equidistantly between point P' and point M. The rear axle 1106 of the trailer is positioned on the rear leaf spring 1114 generally equidistantly between point P and point Q.

It is to be understood that while only a single suspension system 1102 is illustrated and described, it is typical to have one suspension system 1102 provided on both a left and a right side of a trailer.

When utilizing the suspension system 1102 including the equalizers 500, 1100 of the present invention, to the extent possible, road shock and vibrations from tires (not shown) of the trailer are transferred to the front, middle and rear axles 1104, 1105, 1106, and are absorbed by the front, middle and rear leaf springs 1110, 1111, 1114 respectively. Points N, J', J, Q are the contact points through which the road shock is passed to the frame 1360. The equalizers 500, 1100 are included in the suspension system 1102 in order to equalize the weight between the front, middle and rear axles 1104, 1105, 1106 as the tires pass over uneven terrain. For example, an upward motion of the front leaf spring 1110 results in a downward motion of the middle leaf spring 1111, which results in an upward motion of the rear leaf spring 1114.

The equalizers 500, 1100 are configured to dampen or absorb the harsh shocks or vibrations coming off the leaf springs 1110, 1111, 1114 proximate to the center hangars 1116, 1116', thereby allowing for a "softer" ride.

Operation of the suspension system 1102 with the equalizers 500, 1100 therein is similar to the operation of the suspension system 502 with the equalizer 500 therein. The equalizer 1100 is configured differently from the equalizer 500, however, in order to provide stabilization to the suspension system 1102, which is necessary because of the tri-axle configuration of the suspension system 1102. The alignment bracket 1125 is not rotatably secured or pivotally mounted, but rather is fixed into position, such that the alignment bracket 1125 permits only stabilized upward or downward movement of the middle leaf spring 1111.

It should be noted that if desired, the equalizer 1100 could also be utilized with the equalizer 800 of the third embodiment, or that the equalizer 1100 could be modified to be similar to the equalizer 800 of the third embodiment, rather than similar to the equalizer 500 of the second embodiment. Plug member and spacers, such that those used in the equalizer 500, could also be included in the shock absorber 1130 of the equalizer 1100 as desired.

The equalizers 100, 500, 800, 1100 and their corresponding suspension systems 102, 502, 802, 1102 which include the equalizers 100, 500, 800, 1100 are advantageous and beneficial for a "softer" ride in comparison to the prior art equalizer 22 and the prior art suspension system 20 which includes the prior art equalizer 22.

While preferred embodiments of the invention are shown and described, it is envisioned that those skilled in the art may devise various modifications without departing from the spirit and scope of the foregoing description and the appended claims.

The invention is claimed as follows:

1. An equalizer as a portion of a suspension system of a vehicle having a frame, said equalizer comprising:
    a first plate which is pivotally mounted to the frame of the vehicle;

a second plate, spaced from said first plate, which is fixedly mounted to the first plate for pivoting therewith, at least one equalizer arm pivotally mounted to said first plate, said at least one equalizer arm being operatively attached to the suspension system; and a shock absorber which is positioned adjacent to and at least partially against said at least one equalizer arm, said shock absorber configured to absorb shock/vibrations transferred to said at least one equalizer arm from the suspension system, said shock absorber being sandwiched between said first and second plates and abutting said at least one equalizer arm.

2. The equalizer as defined in claim 1, wherein said equalizer has first and second equalizer arms.

3. The equalizer as defined in claim 2, wherein said shock absorber is generally heart-shaped.

4. The equalizer as defined in claim 2, wherein said first equalizer arm is pivotally mounted to said second equalizer arm.

5. The equalizer as defined in claim 1, further comprising an alignment bracket which is fixedly mounted to said first plate, said alignment bracket being operatively attached to the suspension system, said shock absorber being at least partially positioned against said alignment bracket.

6. The equalizer as defined in claim 5, wherein said shock absorber is generally shaped like a half of a heart.

7. The equalizer as defined in claim 1, wherein said shock absorber is generally shaped like a half of a heart.

8. The equalizer as defined in claim 1, said shock absorber being at least partially encapsulated between said second plate and said at least one equalizer arm.

9. The equalizer as defined in claim 8, wherein said second plate is configured to conform around at least a portion of said shock absorber.

10. The equalizer as defined in claim 1, wherein said at least one equalizer arm includes a shock plate, said shock plate is configured to conform around at least a portion of said shock absorber.

11. The equalizer as defined in claim 1, wherein said shock absorber is at least partially formed of an elastomeric material.

12. The equalizer as defined in claim 1, wherein said shock absorber has at least one aperture extending therethrough.

13. The equalizer as defined in claim 12, further including a plug member which is positioned within said at least one aperture to at least partially plug said at least one aperture.

14. The equalizer as defined in claim 12, further including a spacer which is positioned within said at least one aperture, and further including a fastening member which extends through said spacer in order to fixedly secure said shock absorber to said first plate.

15. A suspension system as a portion of a vehicle having a frame and front and rear axles, said suspension system comprising:

a front spring member having first and second ends, said first end being attached to the frame of the vehicle, said front spring member supporting the front axle;

a rear spring member having first and second ends, said second end being attached to the frame of the vehicle, said rear spring member supporting the rear axle;

an equalizer pivotally mounted to the frame of the vehicle, said equalizer including:

a first plate, said first plate being pivotally mounted to the frame of the vehicle;

a second plate, spaced from said first plate, which is fixedly mounted to the first plate for pivoting therewith, first and second equalizer arms pivotally mounted to said first plate, said first equalizer arm being operatively attached to said second end of said front spring member, said second equalizer arm being operatively attached to said first end of said rear spring member; and a shock absorber which is at least partially positioned against each of said first and second equalizer arms, said shock absorber configured to absorb shock/vibrations transferred to said first and second equalizer arms from said front and rear spring members when the front and rear axles are moved upwardly and downwardly, said shock absorber being sandwiched between said first and second plates.

16. The suspension system as defined in claim 15, wherein said first equalizer arm is attached to said second end of said front spring member by a first shackle, and wherein said second equalizer arm is attached to said first end of said rear spring member by a second shackle.

17. The suspension system as defined in claim 15, wherein said first equalizer arm is pivotally mounted to said second equalizer arm.

18. The suspension system as defined in claim 15, wherein said front and rear spring members are leaf springs.

19. The suspension system as defined in claim 15, wherein said shock absorber is generally heart-shaped.

20. The suspension system as defined in claim 15, wherein said shock absorber is at least partially formed of an elastomeric material.

\* \* \* \* \*